United States Patent
Onaka et al.

(10) Patent No.: US 7,599,110 B2
(45) Date of Patent: Oct. 6, 2009

(54) RAMAN PUMP POWER CONTROL FOR GAIN FLATTENING

(75) Inventors: Miki Onaka, Kawasaki (JP); Susumu Kinoshita, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/215,395

(22) Filed: Jun. 27, 2008

(65) Prior Publication Data

US 2008/0291529 A1    Nov. 27, 2008

Related U.S. Application Data

(62) Division of application No. 11/509,628, filed on Aug. 25, 2006, now Pat. No. 7,446,934, which is a division of application No. 10/892,121, filed on Jul. 16, 2004, now Pat. No. 7,110,166, which is a division of application No. 09/531,015, filed on Mar. 20, 2000, now Pat. No. 6,785,042.

(30) Foreign Application Priority Data

Apr. 23, 1999 (JP) ............... 11-115971
Dec. 28, 1999 (JP) ............... 11-375092

(51) Int. Cl.
*H04B 10/17* (2006.01)
*H04B 10/12* (2006.01)

(52) U.S. Cl. ..................... 359/334
(58) Field of Classification Search .......... 359/334
See application file for complete search history.

(56) References Cited

U.S. PATENT DOCUMENTS 4,616,898 A   10/1986   Hicks, Jr.
5,083,874 A   1/1992   Aida et al.

(Continued)

FOREIGN PATENT DOCUMENTS

JP    60-236277    11/1985

(Continued)

OTHER PUBLICATIONS

Masuda, H. et al., "Wide-Band and Gain-Flattened Hybrid Fiber Amplifier Consisting of an EDFA and a Multiwavelength Pumped Raman Amplifier", IEEE Photonics Technology Letters, vol. 11, No. 6, pp. 647-649, Jun. 1999.*

(Continued)

*Primary Examiner*—Eric Bolda
(74) *Attorney, Agent, or Firm*—Staas & Halsey LLP

(57) ABSTRACT

The present invention aims at providing a method for controlling wavelength characteristics of optical transmission powers by Raman amplification, in which the wavelength characteristics of optical transmission powers are automatically compensated without giving any losses to channel lights to thereby improve transmission characteristics, and an apparatus adopting the same. To this end, the method for controlling wavelength characteristics of optical transmission powers by Raman amplification according to the present invention supplies Raman pump light to an optical transmission path (Raman amplifying medium); compensates the wavelength characteristics of optical transmission powers caused by transmission of WDM signal light through the optical transmission path, by gain wavelength characteristics of generated Raman amplification; and monitors the wavelength characteristics of optical transmission powers after Raman amplification to thereby control the gain wavelength characteristics of Raman amplification.

7 Claims, 47 Drawing Sheets

U.S. PATENT DOCUMENTS

| | | | |
|---|---|---|---|
| 6,151,160 | A | 11/2000 | Ma et al. |
| 6,292,288 | B1 | 9/2001 | Akasaka et al. |
| 6,307,668 | B1 | 10/2001 | Bastien et al. |
| 6,342,965 | B1 | 1/2002 | Kinoshita |
| 6,344,922 | B1 | 2/2002 | Grubb et al. |
| 6,657,778 | B1 | 12/2003 | Motoshima et al. |
| 6,882,466 | B1 | 4/2005 | Shimojoh et al. |
| 6,891,661 | B2 | 5/2005 | Hayashi et al. |
| 7,110,166 | B2 | 9/2006 | Onaka et al. |

FOREIGN PATENT DOCUMENTS

| | | |
|---|---|---|
| JP | 01230130 A | 9/1989 |
| JP | 6-169122 | 6/1994 |
| JP | 8-248455 | 9/1996 |
| JP | 9-179152 | 7/1997 |
| JP | 9-197452 | 7/1997 |
| JP | 10-073852 | 3/1998 |
| JP | 2000-98433 | 4/2000 |

OTHER PUBLICATIONS

Japanese Office Action mailed Nov. 18, 2003 in Japanese Application H11-375092.

"A Broadband Dispersion Compensating Raman Amplifier Pumped by Multi-Channel WDM Laser Diodes", Emori, et al., Technical Report of IEICE, OCS98-58, 1998-11).

"A High-Performance Optical Spectrum Monitor with High-Speed Measuring Time for WDM Optical Networks", K Otsuka et al., ECOC97, Conference Publication, No. 448.

"Raman Amplification of Dispersion Compensating Fiber for Loss Reduction and Enlargement of WDM Wavelength Range", S. Kinoshita et al., OECC97 Technical Digest, Seoul, Korea.

"Capacity Upgrades of Transmission Systems by Raman Amplification", P.B. Hansen, et al., IEEE Photonics Technology Letters, vol. 9, No. 2.

"Wide-Band and Low Noise Optical Amplification Using Distributed Raman Amplifiers and Erbium-Doped Fiber Amplifiers", Masuda et al., Electronic Information Communication Academy Electronics Society Congress, B10-161.

"Fiber Raman Amplifiers for 1520 nm Band WDM Transmission", Kani et al., Electronic Information Communication Academy Society Congress, B-10-160.

Stimulated Raman Scattering Effects in WDM Transmission Systems Employing Non-zero Dispersion Shifted Fibers, T. Hoshida et al.

Marhic et al. Suppression of fiber nonlinearities in HFC systems by distributed fiber Raman Amplification; 1999 Digest of LEOS Summer Topical Meetings; Jul. 26, 1999-Jul. 30, 1999; pp. IV53-IV54.

Takeda et al., Active Gain-Tilt Equalization by Preferentially 1.43 microns or 1.48 microns Pumped Raman Amplification; OSA Tops. vol. 30, Optical Amplifiers and Their Applications; Jun. 9-11, 1999; pp. 101-105.

U.S. Appl. No. 11/509,628, filed Aug. 25, 2006 Onaka et al.

* cited by examiner

FIG.7
(a) SMF
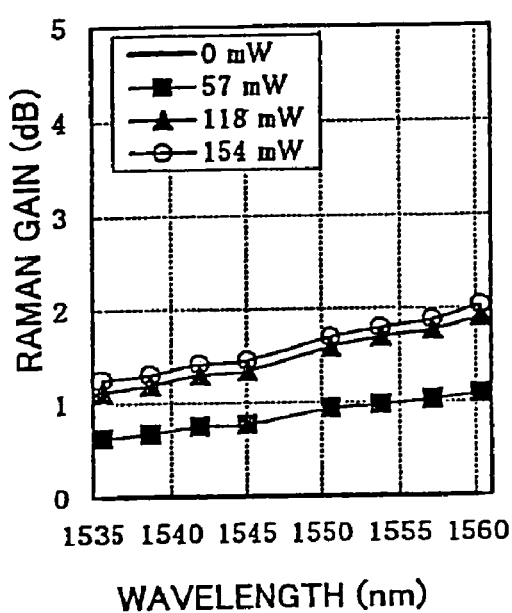
(b) NZ-DSF
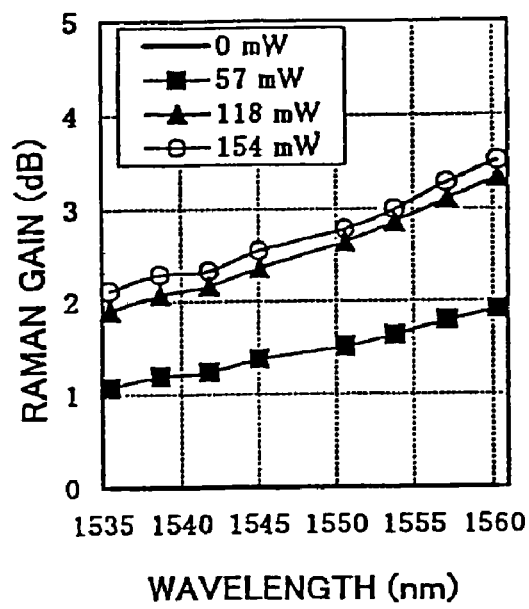

FIG.24
(a)
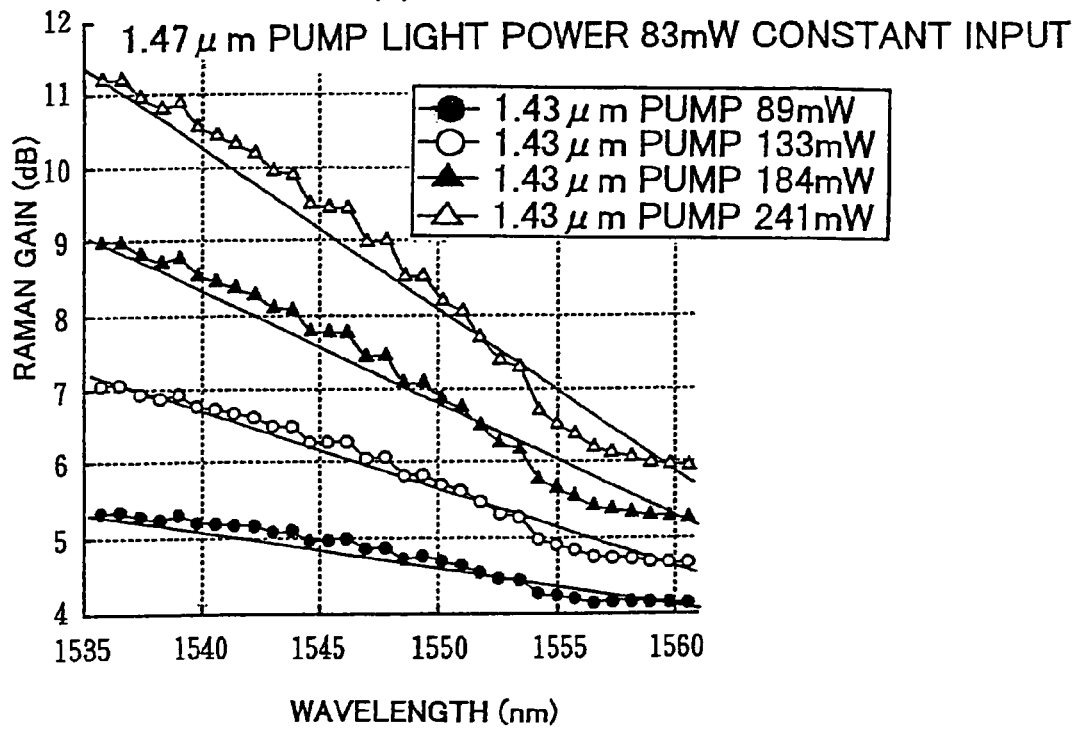
(b)
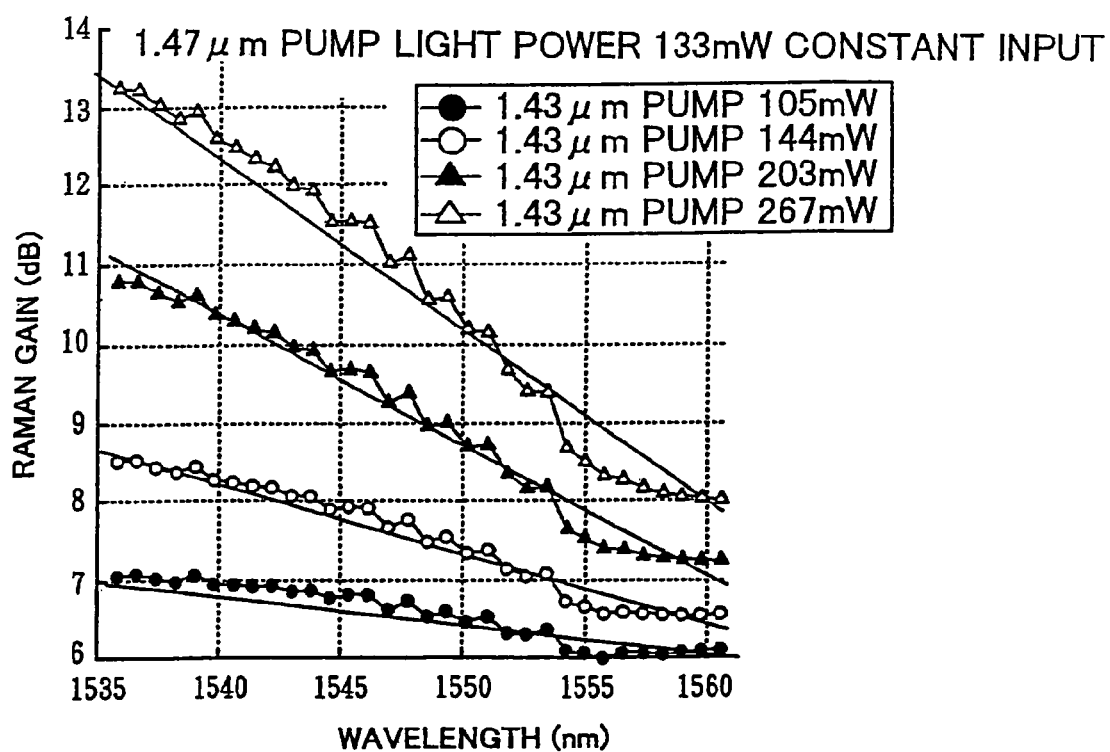

FIG.39
(a)
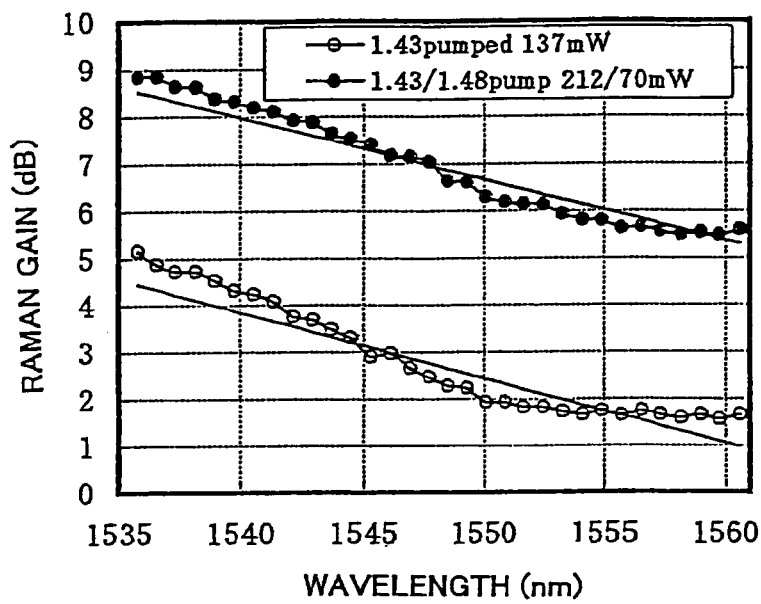
(b)
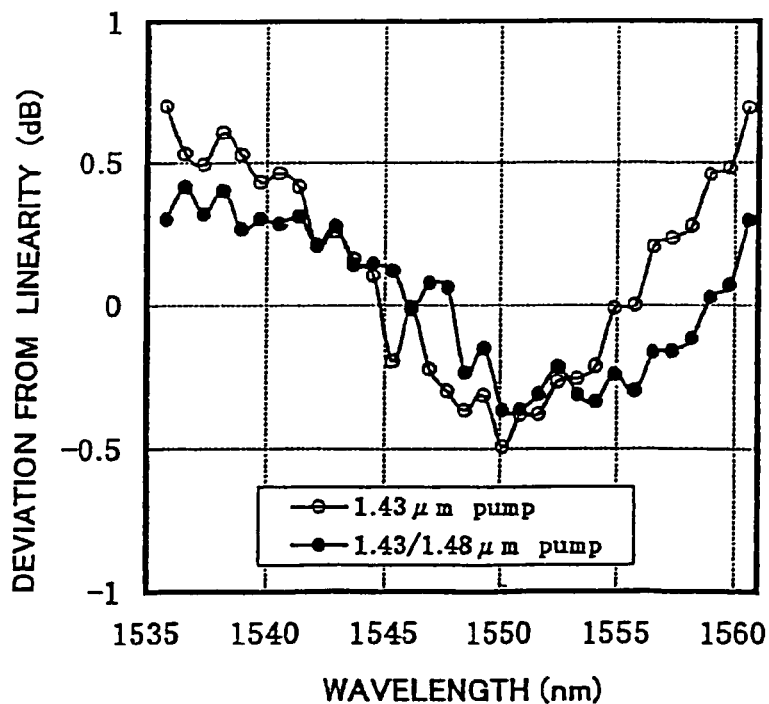

FIG. 41
(a)
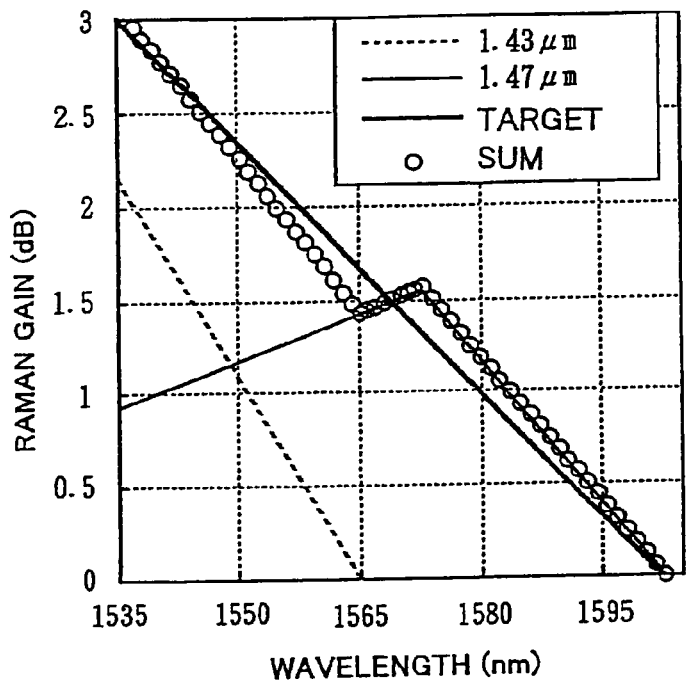
(b)
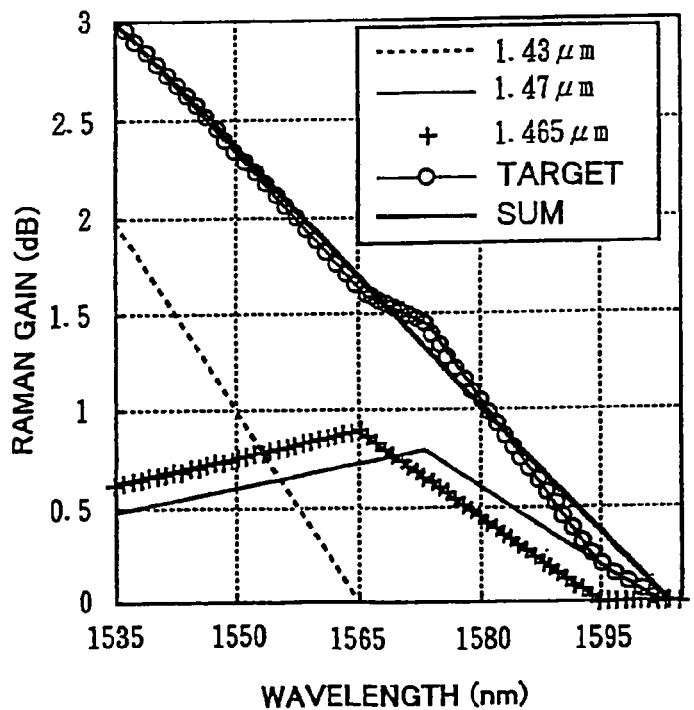

FIG.42
(a)
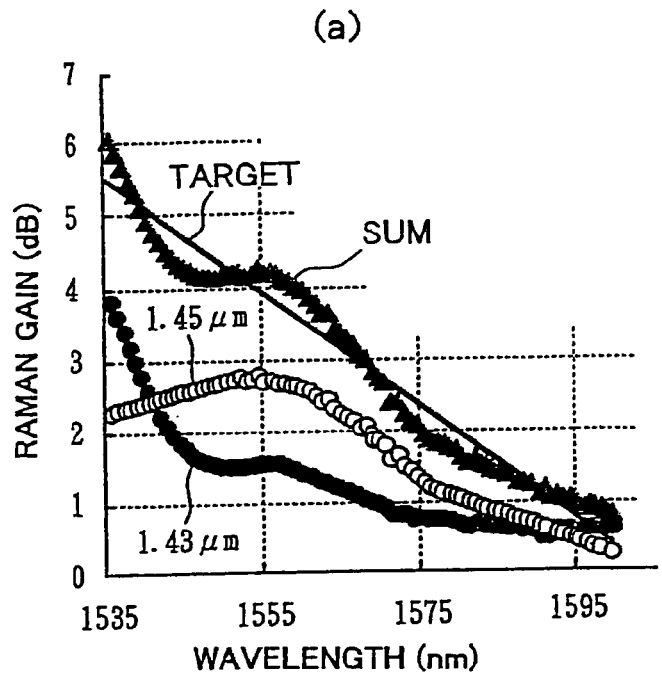
(b)
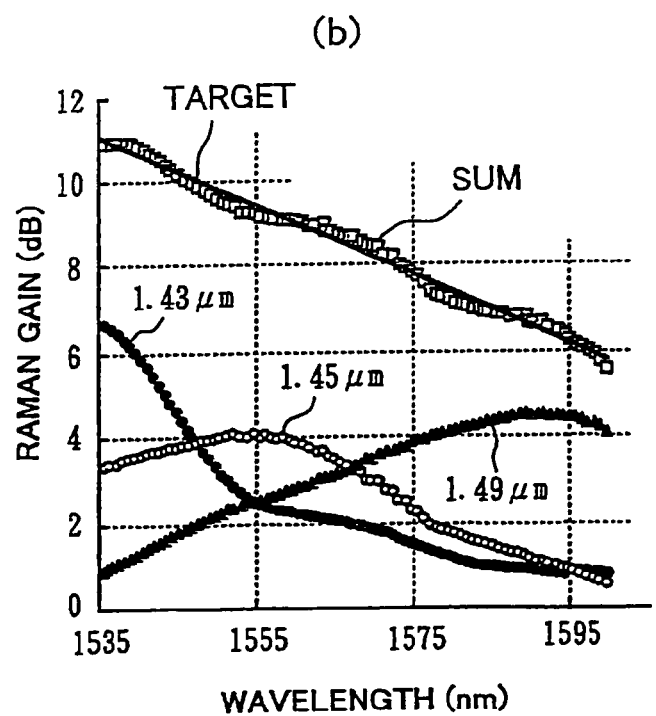

RAMAN PUMP POWER CONTROL FOR GAIN FLATTENING

This application is a divisional of allowed application Ser. No. 11/509,628 filed Aug. 25, 2006 now U.S. Pat. No. 7,446,934 which is a divisional of application Ser. No. 10/892,121 filed Jul. 16, 2004, now U.S. Pat. No. 7,110,166, which is a divisional of application Ser. No. 09/531,015 filed Mar. 20, 2000 now U.S. Pat. No. 6,785,042 the disclosure of which is herein incorporated in its entirety by reference.

This application claims the priority benefit of Japanese Application No. 11-115971, filed Apr. 23, 1999, and Japanese Application No. 11-375092 filed Dec. 28, 1999, the disclosures of which are herein incorporated in their entirety by reference.

BACKGROUND OF THE INVENTION

1. Field of the Invention

The present invention relates to a technique for controlling wavelength characteristics of optical transmission powers caused in wavelength division multiplexed signal light to be transmitted through an optical transmission path, and particularly to a method for compensating the wavelength characteristics of optical transmission powers making use of Raman amplification, as well as to a wavelength division multiplexing optical communication system and an optical amplifier to which the controlling method is applied.

2. Related Art

Wavelength division multiplexing (WDM) optical transmission system, such as making use of a wide gain band of an Erbium doped fiber amplifier, is capable of increasing a communication capacity by transmitting an optical signal including a plurality of wavelengths through a single optical fiber. This type of WDM optical communication system has such advantages that the system can be inexpensively introduced by utilizing existing optical fibers, and its transmission path is made to be bit-rate free by utilizing such as optical amplifier thereby facilitating future upgrade.

To obtain required transmission characteristics in a WDM optical communication system, it is necessary to restrict dispersions of light powers between channels to 1.0 dB or less at respective optical repeating stages. This is because an upper limit of light power is restricted by nonlinear effect of a transmission path, and a lower limit thereof is restricted by a receiving S/N due to spontaneous emission light of an optical amplifier. As such, it is required to diminish wavelength loss characteristics such as of transmission path and dispersion compensation fiber constituting a WDM optical communication system. Particularly, for an optical amplifier which collectively amplifies multi-wavelength optical signals and serves as a key component of a system, it is strongly desired that output deviations among channels be low in addition to that the optical amplifier transmits a predetermined output level with a low noise characteristic.

In an actual WDM optical communication system, there are caused wavelength characteristics of optical transmission powers among respective channels, such as due to the following matters:

① wavelength loss characteristic of transmission path, due to Rayleigh scattering;

② wavelength loss characteristic of dispersion compensator;

③ wavelength loss characteristic of transmission path due to induced Raman scattering;

④ wavelength characteristic of gain of optical amplifier; and

⑤ temperature characteristics of transmission path, of dispersion compensator and of optical amplifier.

Concretely, such as in case of adopting a 1.3 μm zero-dispersion single mode fiber (SMF) of a length of 80 km provided that a wavelength band of signal light is between 1530 to 1560 nm, deviations of optical transmission powers caused due to the matters ① and ③ are approximately 0.5 dB and approximately 1 dB, respectively. Deviation to be caused by the matter ② is approximately 0.5 dB when a general dispersion compensation fiber (DCF) is adopted as a dispersion compensator, while deviation to be caused by the matter ④ is approximately 1 dB when a general Erbium doped optical fiber amplifier (EDFA) is adopted. Further, deviation to be caused by the matter ⑤ can be evaluated as being approximately 0.3 dB when adopting the aforementioned optical devices.

The thus caused wavelength characteristics have different magnitudes depending on transmission conditions (such as number of channels, channel separations, input power, transmission path length). As such, it is necessary to newly or additionally apply a means capable of compensating the variably caused wavelength characteristics, to a WDM optical communication system. When wavelength characteristics of optical transmission powers among channels are to be compensated at each of optical amplifying and repeating stages provided in a WDM optical communication system, a width or magnitude of wavelength characteristic to be compensated at one optical amplifying and repeating stage is approximately 3 dB.

Conventionally, there has been proposed a method in which such as variable gain equalizers capable of varying wavelength loss characteristics are newly applied to an optical communication system, as a scheme for compensating wavelength characteristics of optical transmission powers as described above. According to such a method, optical transmission powers among channels are equalized by controlling wavelength loss characteristics of variable gain equalizers corresponding to respective wavelength characteristics of optical transmission powers caused in the system.

However, in the aforementioned conventional method for controlling wavelength characteristic of optical transmission powers, the optical transmission powers are equalized by giving losses to respective channels other than a channel having a minimum power in a manner matching to the minimum power channel. As such, there is a possibility that an optical S/N ratio is degraded and transmission characteristics are thereby deteriorated, as compared to the time such as before insertion of variable gain equalizers.

As one method for compensating wavelength characteristics of optical transmission powers while restraining loss to a smaller value, it is effective to utilize Raman amplification. This method is adapted to compensate wavelength characteristics of optical transmission powers, by preferentially amplifying channels of lower powers.

As techniques utilizing Raman amplification, there are known articles of, for example, S. Kinoshita et al., OECC, 10B2-3, July, 1997; and Emori et al. entitled "A broadband dispersion compensating Raman amplifier pumped by multi-channel WDM laser diodes", Technical Report of IEICE, OCS98-58, pp. 7-12, 1998. The techniques described in these articles have contemplated realizing lower loss of dispersion compensation fiber and broader band of optical amplifier, by Raman amplifying a dispersion compensation fiber within an optical amplifier by utilizing a pump light source such as at 1,480 nm band. Further, in Japanese Unexamined Patent Publication No. 10-73852, there is described an optical amplifying transmission system which has contemplated realizing a broader band of signal transmission, making use of Raman amplification.

However, in these known techniques utilizing Raman amplification, Raman amplification is generated by supplying fixed pump light of which wavelength band and power have been previously set, such as to a dispersion compensation fiber. Thus, when fluctuation has occurred in wavelength characteristics of optical transmission powers such as caused in a transmission path, it is difficult to flexibly change a gain wavelength characteristic of Raman amplification corresponding to such fluctuation. In a WDM optical communication system, since it is considered that such as the number of channels of WDM signal light to be transmitted and wavelengths to be used are changed variously, and that wavelength characteristics of optical transmission powers fluctuate, it is accordingly desired to flexibly compensate wavelength characteristics corresponding to such fluctuation.

SUMMARY OF THE INVENTION

The present invention has been carried out in view of the points as described above, and it is therefore an object of the present invention to provide a method for controlling wavelength characteristics of optical transmission powers utilizing Raman amplification, in which wavelength characteristics of optical transmission powers are automatically compensated without giving loss to each channel light, and transmission characteristics are improved by compensating a loss of transmission path making use of Raman amplification, and a wavelength division multiplexing optical communication system and an optical amplifier adopting the method.

To achieve the above object, the present invention provides a method for controlling wavelength characteristics of optical transmission powers caused in WDM signal light transmitted through an optical transmission path by Raman amplification, comprising: a Raman amplification generating step for supplying Raman pump light at a wavelength band set corresponding to the wavelength characteristics of optical transmission powers, to a Raman amplifying medium forming at least a part of the optical transmission path, so as to generate Raman amplification having gain wavelength characteristics capable of compensating the wavelength characteristics of optical transmission powers, for WDM signal light propagated through the Raman amplifying medium; a wavelength characteristic monitoring step for monitoring wavelength characteristics of optical transmission powers, for WDM signal light passed through the Raman amplifying medium; and a Raman amplification controlling step for adjusting a generating condition of the Raman pump light based on a result of the wavelength characteristic monitoring step, to thereby control the gain wavelength characteristics of Raman amplification such that the wavelength characteristics of optical transmission powers are flattened.

According to such a wavelength characteristic controlling method, the WDM signal light, transmitted through the optical transmission path and thereby caused with the wavelength characteristics of optical transmission powers (tilt), is Raman amplified by passing through the Raman amplifying medium supplied with the Raman pump light by the Raman amplification generating step. In this Raman amplification, the wavelength band of the Raman pump light is set to have the gain wavelength characteristics capable of compensating the wavelength characteristics of optical transmission powers, so that dispersions of optical transmission powers in the WDM signal light after Raman amplification are flattened. For this WDM signal light, the wavelength characteristics of optical transmission powers are monitored at the wavelength characteristic monitoring step, to thereby monitor as to whether the compensation of wavelength characteristics at the Raman amplification generating step is being effectively performed. Then, at the Raman amplification controlling step, the monitored result of the wavelength characteristic monitoring step is fed back so that the generating condition of Raman pump light is adjusted (for example, power of Raman pump light or controlling temperature of a pump light source is adjusted) such that the wavelength characteristics of optical transmission powers are flattened, to thereby control the gain wavelength characteristics of Raman amplification.

In this way, for WDM signal light caused with dispersions in its optical transmission powers, the wavelength characteristics of optical transmission powers thereof can be compensated by applying the present tilt compensation making use of the gain wavelength characteristics of Raman amplification basically without any losses, since an optical element to be newly inserted in the transmission path is only a pump light multiplexer. In addition, the wavelength characteristics of optical transmission powers after Raman amplification are monitored to thereby control the gain wavelength characteristics of Raman amplification. Thus, even when the number of channels of WDM signal light to be transmitted and wavelengths to be used are changed variously such that wavelength characteristics of optical transmission powers are varied, there can be realized flexible compensation of wavelength characteristics corresponding to such variation.

In the above wavelength-characteristic controlling method, the Raman amplification generating step may supply Raman pump lights at a plurality of wavelength bands to the Raman amplifying medium, and the Raman amplification controlling step may adjust proportions of Raman pump lights at the respective wavelength bands to thereby control gain wavelength characteristics of Raman amplification. Further, it is preferable that the Raman pump lights at the plurality of wavelength bands include Raman pump lights at such wavelength bands generating Raman amplifications having mutually different inclined directions of gain wavelength characteristics within a signal light band. As a specific adjusting method of the Raman pump lights, it is possible to fix a generating condition of the Raman pump light of at least one wavelength band among the Raman pump lights at the plurality of wavelength bands, and to adjust generating conditions of the Raman pump lights of the remaining wavelength bands.

In this way, the gain wavelength characteristics of Raman amplification are varied corresponding to the proportions of the pump lights at respective wavelength bands, so that the gain wavelength characteristics of Raman amplification can be controlled with excellent precision.

Moreover, the wavelength characteristic controlling method may further comprise: a power monitoring step for monitoring an output light power of the Raman amplifying medium; and in which the Raman amplification controlling step may adjust proportions of the Raman pump lights at the respective wavelength bands, based on a result of the wavelength characteristic monitoring step and based on a result of the power monitoring step, such that the output light power of the Raman amplifying medium is kept constant and the wavelength characteristics of optical transmission powers are flattened.

In this way, there can be obtained wavelength division multiplexed signal light having a constant light power and flattened wavelength characteristics.

Moreover, as a specific Raman amplification generating step of the wavelength characteristic controlling method, the Raman pump lights may be supplied, by utilizing the optical transmission path formed of a dispersion-shifted fiber as the Raman amplifying medium. Alternatively, the Raman pump lights may be supplied, by utilizing a dispersion compensation fiber provided on the optical transmission path as the Raman amplifying medium.

In this way, by utilizing a dispersion-shifted fiber or a dispersion compensation fiber having a relatively small mode field diameter as the Raman amplifying medium, there can be generated a required Raman amplification by a smaller power of Raman pump light.

The aforementioned method for controlling wavelength characteristics of optical transmission powers by Raman amplification, can be applied to various devices such as WDM optical communication system and optical amplifier to be described later, to thereby realize improvement of transmission characteristics of WDM signal light.

Further objects, features and advantages of the present invention will become more apparent from the following description of preferred embodiments when read in conjunction with the accompanying drawings.

BRIEF DESCRIPTION OF THE DRAWINGS

FIG. 7 is a graph showing gain wavelength characteristics of Raman amplification adopting a pump wavelength at 1,485 nm, in which (a) and (b) show situations where Raman amplifying mediums are SMF and dispersion-shifted fiber, respectively;

FIG. 24 is a graph showing wavelength characteristics of Raman gains where a pump light power of 1.43 µm is varied while fixing a pump light power of 1.47 µm, in which (a) is a measured result where the pump light power of 1.47 µm is fixed at 83 mW and (b) is a measured result where the pump light power of 1.47 µm is fixed at 133 mW;

FIG. 39 is a graph showing a linearity of gain wavelength characteristic of Raman amplification, in which (a) shows fluctuation of the gain wavelength characteristic and (b) shows deviations from the linearity;

FIG. 41 is a graph showing a gain wavelength characteristic of Raman amplification in case of conducting tilt compensations for C and L-bands, in which (a) shows a situation of combining two wavelengths and (b) shows a situation of combining three wavelengths;

FIG. 42 is a graph showing a gain wavelength characteristic of another Raman amplification in case of conducting tilt compensations for C and L-bands, in which (a) shows a situation of combining two wavelengths and (b) shows a situation of combining three wavelengths;

DETAILED DESCRIPTION OF THE PREFERRED EMBODIMENT

There will be described hereinafter the embodiments according the present invention, with reference to the accompanying drawings.

Figure 1:
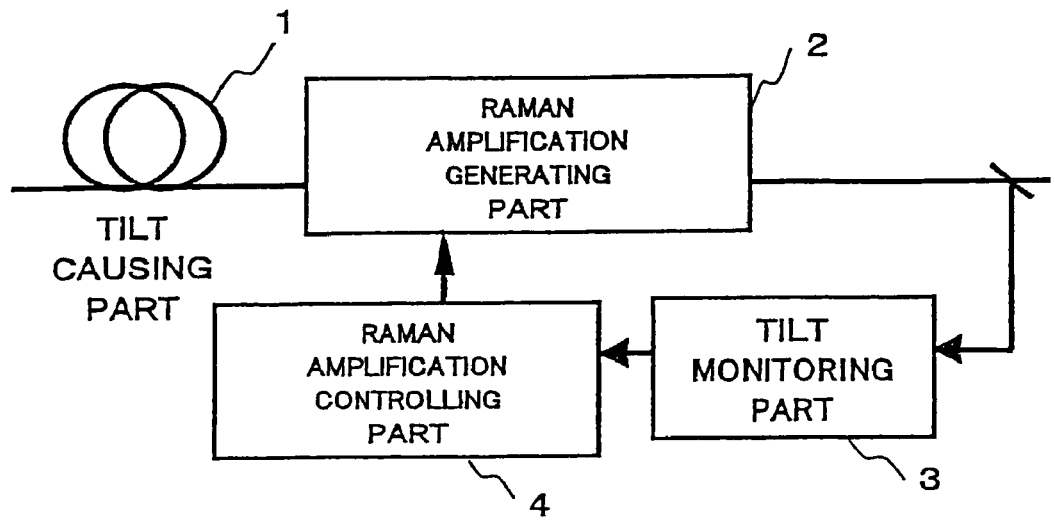
FIG. 1 is a block diagram showing a basic constitution of an apparatus adopting a method for controlling wavelength characteristics of optical transmission powers utilizing Raman amplification according to the present invention.

FIG. 1 is a block diagram showing a basic constitution of an apparatus applied with a method for controlling wavelength characteristics of optical transmission powers utilizing Raman amplification according to the present invention.

In FIG. 1, the basic constitution of this apparatus includes a tilt causing part 1, a Raman amplification generating part 2 connected to the tilt causing part 1, a tilt monitoring part 3 input with a part of output light from the Raman amplification generating part 2, and a Raman amplification controlling part 4 for receiving a monitored result of the tilt monitoring part 3 to thereby control an operation of the Raman amplification generating part 2.

The tilt causing part 1 causes wavelength characteristics (i.e., tilt) in optical transmission powers among respective channels, relative to WDM signal light to be transmitted. Concretely, this part 1 corresponds to various optical devices constituting an optical transmission path, such as optical fiber transmission path, dispersion compensator or optical amplifier.

The Raman amplification generating part 2 Raman amplifies the WDM signal light from the tilt causing part 1, so as to compensate the tilt caused at the tilt causing part 1 to thereby equalizes optical transmission powers among respective channels. Raman amplification is a phenomenon in which an optical signal propagated within a Raman amplifying medium is amplified by supplying predetermined pump light to the Raman amplifying medium. There will be later described features of Raman amplification, as well as a specific constitution of the Raman amplification generating part 2.

The tilt monitoring part 3 monitors wavelength characteristics of optical transmission powers making use of a part of WDM signal light output from the Raman amplification generating part 2, and outputs the monitored result to the Raman amplification controlling part 4. There will be also described later a specific constitution of this tilt monitoring part 3.

In response to the monitored result of the tilt monitoring part 3, the Raman amplification controlling part 4 adjusts such as power of Raman pump light at the Raman amplification generating part 2, to thereby control gain wavelength characteristics of Raman amplification such that the wavelength characteristics of optical transmission powers are flattened.

There will be explained hereinafter features of Raman amplification.

It is known that Raman amplification has, as a basic characteristic, a gain wavelength characteristic which varies corresponding to pump wavelengths, and that a gain characteristic per unit wavelength at a wavelength region excluding a gain peak has a relatively excellent linearity. It is noted that a wavelength, at which a gain of Raman amplification becomes maximum, is located at a frequency which is lower than a frequency of Raman pump light by 13.2 THz.

Figure 2:
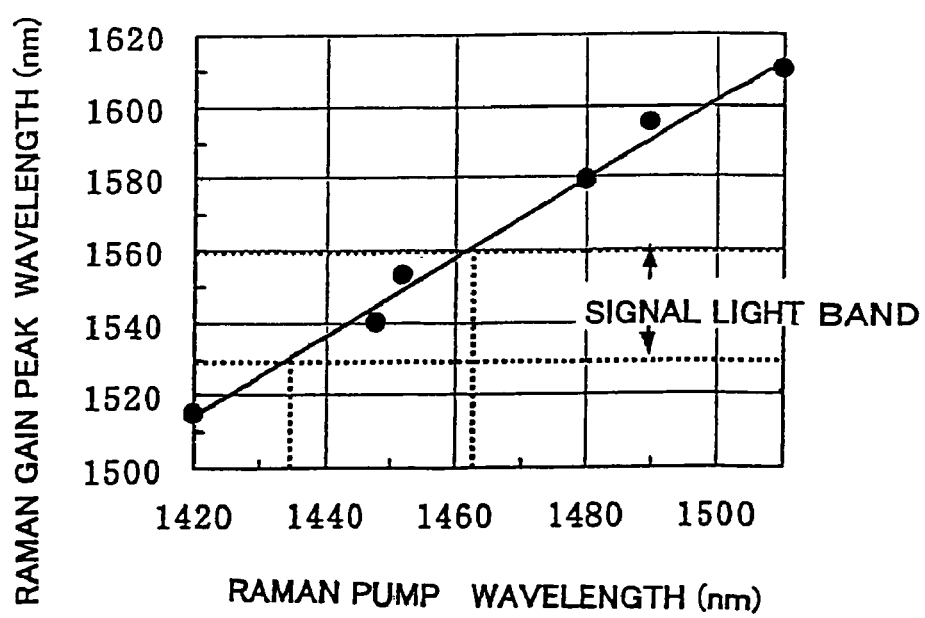
FIG. 2 is a graph showing a gain peak wavelength relative to a pump wavelength in Raman amplification.
Figure 3:
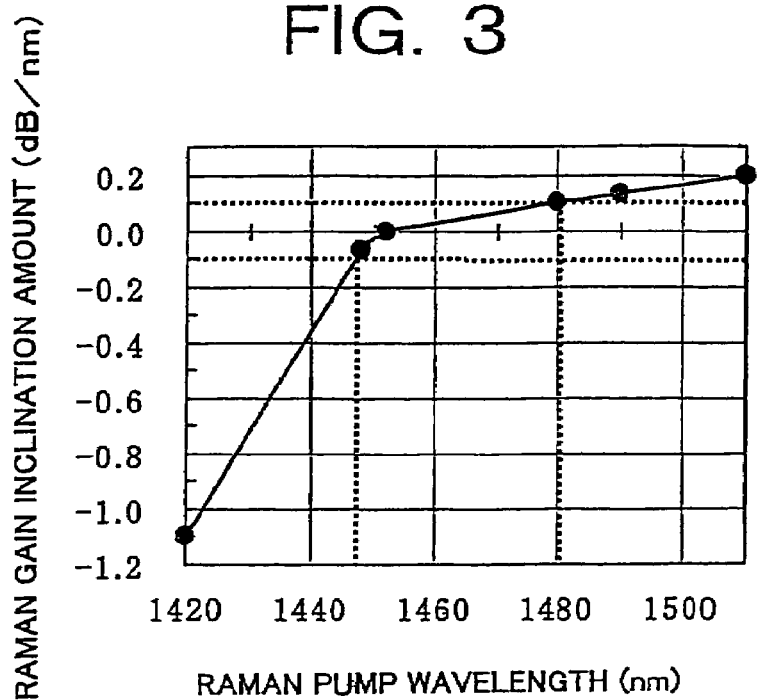
FIG. 3 is a graph showing a gain inclination amount within a signal light band relative to a pump wavelength in Raman amplification.

FIG. 2 is a graph showing a Raman gain peak wavelength relative to a Raman pump wavelength, and FIG. 3 is a graph showing a gain inclination amount of signal light band relative to a Raman pump wavelength. Here, the signal light band is supposed to be such as from 1,530 to 1,560 nm (hereinafter called "C-band"), and respective points in the figures are obtained by plotting those data shown in the known articles. It is noted that a sign of the gain inclination amount is indicated as being "+ (plus)" where a gain increases as a wavelength of signal light is lengthened (gain is slanting rightwardly upward relative to wavelength), and as being "– (minus)" where a gain decreases as a wavelength of signal light is shortened (gain is slanting rightwardly downward relative to wavelength).

As shown in FIGS. 2 and 3, it is assumed that gain peak wavelengths relative to pump wavelengths can be represented by a first approximation curve, for Raman amplification. It is also assumed that the gain inclination amount of Raman amplification within the aforementioned signal light band becomes "– (minus)" where the pump wavelength is shorter than 1,450 nm, and becomes "+ (plus)" where longer than the same, and that the absolute value of the gain inclination amount becomes larger as the pump wavelength deviates further from 1,450 nm.

For a WDM optical communication system having the C-band as its signal light band, the compensation wavelength characteristic necessary for compensating wavelength characteristics of optical transmission powers caused at the tilt causing part 1 is required to have a linearity relative to wavelengths and to have an absolute value of its inclination amount equal to or more than 0.1 dB/nm. The reason why the absolute value of inclination amount of compensation wavelength characteristic is to be more than 0.1 dB/nm is that: the tilt to be caused by the matters ① to ⑤ is in the order of ±3 dB as described above and the bandwidth of signal light is 30 nm, so that the inclination amount of wavelength characteristic can be evaluated as being ±3 dB/30 nm=±0.1 dB/nm.

There will be now discussed conditions for realizing the aforementioned compensation wavelength characteristic, making use of Raman amplification.

In order that the compensation wavelength characteristic has a linearity, a gain peak wavelength of Raman amplification is required to be outside the signal light band. In the aforementioned FIG. 2, the condition required for the gain peak wavelength to be outside the C-band is that the pump wavelength is at a side shorter than 1,435 nm and at a side longer than 1,462 nm. Further, in order that the absolute value of compensation wavelength characteristic is equal to or more than 0.1 dB/nm, pump wavelength shown in the aforementioned FIG. 3 is required to be at a side shorter than 1,447 nm and at a side longer than 1,480 nm. Based on the above consideration, the condition required for realizing the compensation wavelength characteristic making use of Raman amplification is judged to be that: pump wavelength is at a side shorter than 1,435 nm (where a "–" gain inclination is required for tilt compensation) and at a side longer than 1,480 nm (where a "+" gain inclination is required for tilt compensation).

There will be described hereinafter an example of specific constitution of the Raman amplification generating part 2.

Figure 4:
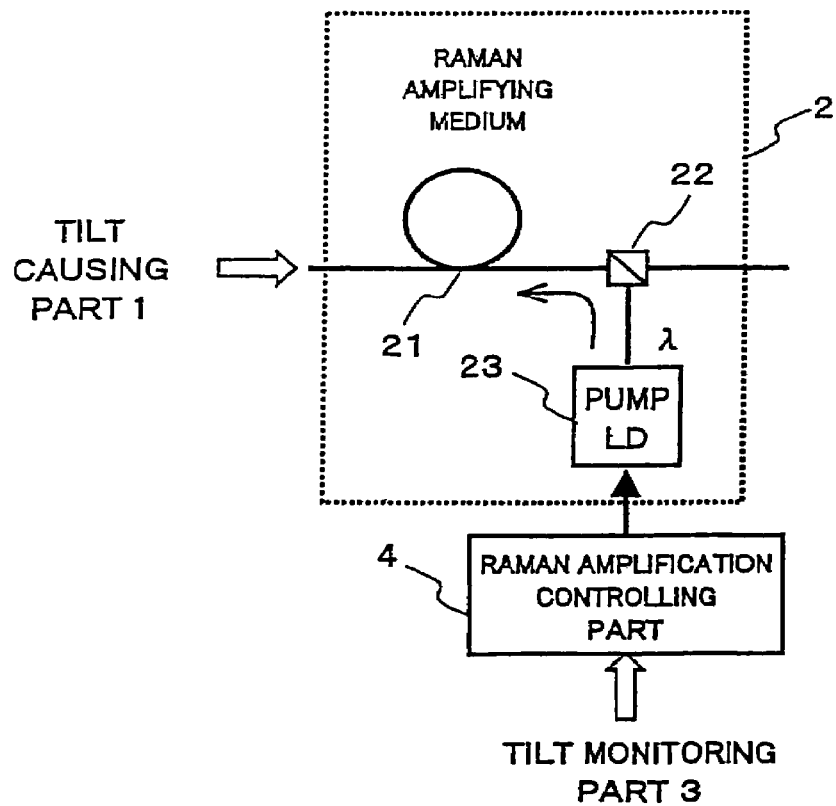
FIG. 4 is a diagram showing an example of specific constitution of a backward pumping type in which pump light including one wavelength is supplied, for a Raman amplification generating part of the basic constitution of FIG. 1.

FIG. 4 is a diagram showing an example of specific constitution of the Raman amplification generating part 2 in which pump light including one wavelength is adopted.

In the constitution of FIG. 4, Raman pump light of wavelength λ generated by a pump LD 23 is supplied, via a WDM coupler 22, from a backward side of a Raman amplifying medium 21 connected to the tilt causing part 1. A driving condition of the pump LD 23 is controlled by a signal output from the Raman amplification controlling part 4 in response to a monitored result of the tilt monitoring part 3. The wavelength λ of Raman pump light has been previously set, in accordance with the above discussed result and corresponding to the wavelength characteristics of optical transmission powers caused at the tilt causing part 1. There is shown herein a situation where the pump light is supplied from the backward side of the Raman amplifying medium 21. However, the pump light may be also supplied from a forward side of the Raman amplifying medium 21.

Figure 5:
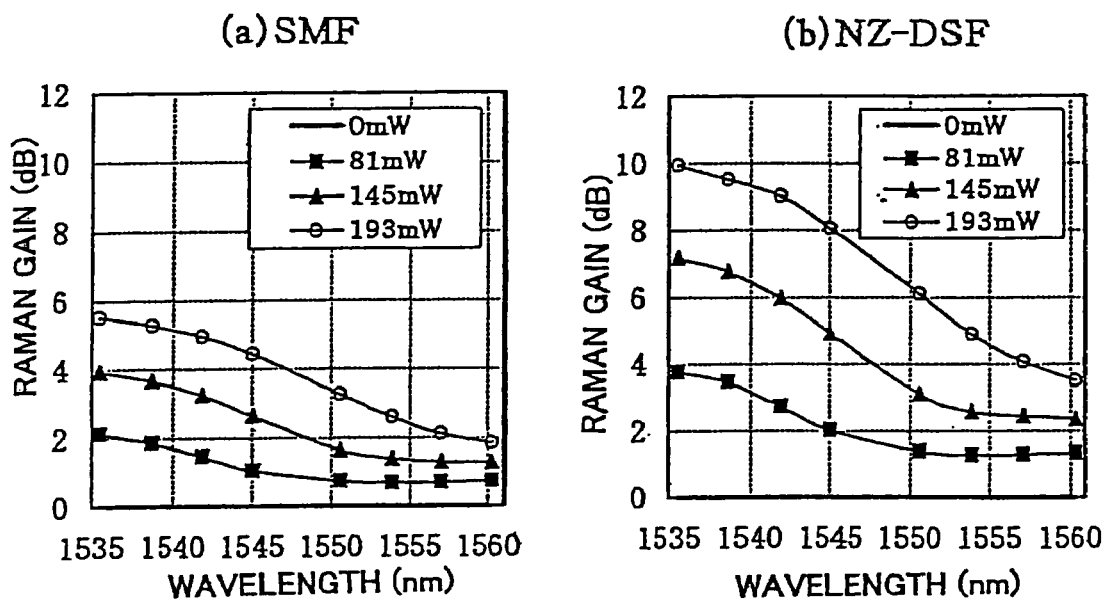
FIG. 5 is a graph showing gain wavelength characteristics of Raman amplification adopting a pump wavelength at 1,430 nm, in which (a) and (b) show situations where Raman amplifying mediums are SMF and dispersion-shifted fiber, respectively.

FIG. 5 is a graph showing gain wavelength characteristics of Raman amplification where the pump wavelength λ is set at a value such as 1,430 nm, and (a) and (b) show situations where the Raman amplifying mediums 21 are SMF and dispersion-shifted fiber (NZ-DSF), respectively.

As understood from FIG. 5, in the respective Raman amplifying mediums 21, it is understood that the Raman amplification wavelength characteristics adopting the pump wavelength λ at 1,430 nm have smaller gains at a longer wavelength, and the gains become larger as the pump light power is increased. It is also understood that the pumping efficiency of Raman amplification becomes higher, as the mode field diameter of Raman amplifying medium 21 becomes smaller (the magnitude correlation is SMF>NZ-DSF, here).

Figure 6:
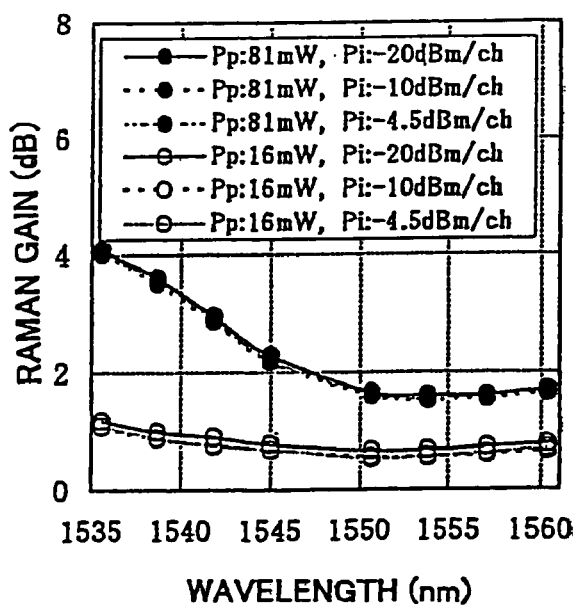
FIG. 6 is a graph showing an example where a Raman pump light power and an input power are varied, in relation to gain wavelength characteristics of Raman amplification.

FIG. 6 is a graph showing an example of gain wavelength characteristics of Raman amplification where an input power of WDM signal light is varied over three stages, for each of Raman pump light powers at 81 mW and 16 mW.

As understood from FIG. 6, the gain wavelength characteristics of Raman amplification do not depend on a power of WDM signal light to be input into the Raman amplifying medium 21, so that the Raman amplification has a wider input range for operating at a non-saturated condition.

Further, FIG. 7 is a graph showing gain wavelength characteristics of Raman amplification in which the pump wavelength λ is set at a value such as 1,485 nm, in which (a) and (b) show situations where the Raman amplifying mediums 21 are SMF and dispersion-shifted fiber (NZ-DSF), respectively.

As understood from FIG. 7, in the respective Raman amplifying mediums 21, it is understood that the Raman amplification wavelength characteristics adopting the pump wavelength λ at 1,485 nm have larger gains at a longer wavelength, and the gains become larger as the pump light power is increased. It is also understood that the pumping efficiency of Raman amplification becomes higher, as the mode field diameter of Raman amplifying medium 21 becomes smaller.

Thus, it becomes possible to suitably perform compensation of wavelength characteristics of optical transmission powers, such as by suitably selecting a wavelength λ of the pump LD 23 corresponding to the amount of tilt to be caused at the tilt causing part 1, by controlling the output powers of the pump LD 23 corresponding to the caused amount of tilt, and by duly setting the length of various Raman amplifying mediums 21.

The aforementioned consideration of compensation wavelength characteristics by Raman amplification as well as a specific constitution of the Raman amplification generating part 2 are related to a situation where the Raman amplification is generated in the Raman amplifying medium by pump light including one wavelength. However, the Raman amplification can be also generated by pump lights including a plurality of wavelengths. In case of generating the Raman amplification by pump lights including a plurality of wavelengths, gain wavelength characteristics of Raman amplification relative to signal light will vary corresponding to the adopted pump wavelengths and the proportions of pump lights of respective wavelengths. Thus, it is possible to control the gain wavelength characteristics of Raman amplification in a more advanced manner, by duly adjusting supplying conditions of respective pump lights to the Raman amplifying mediums.

Figure 8:
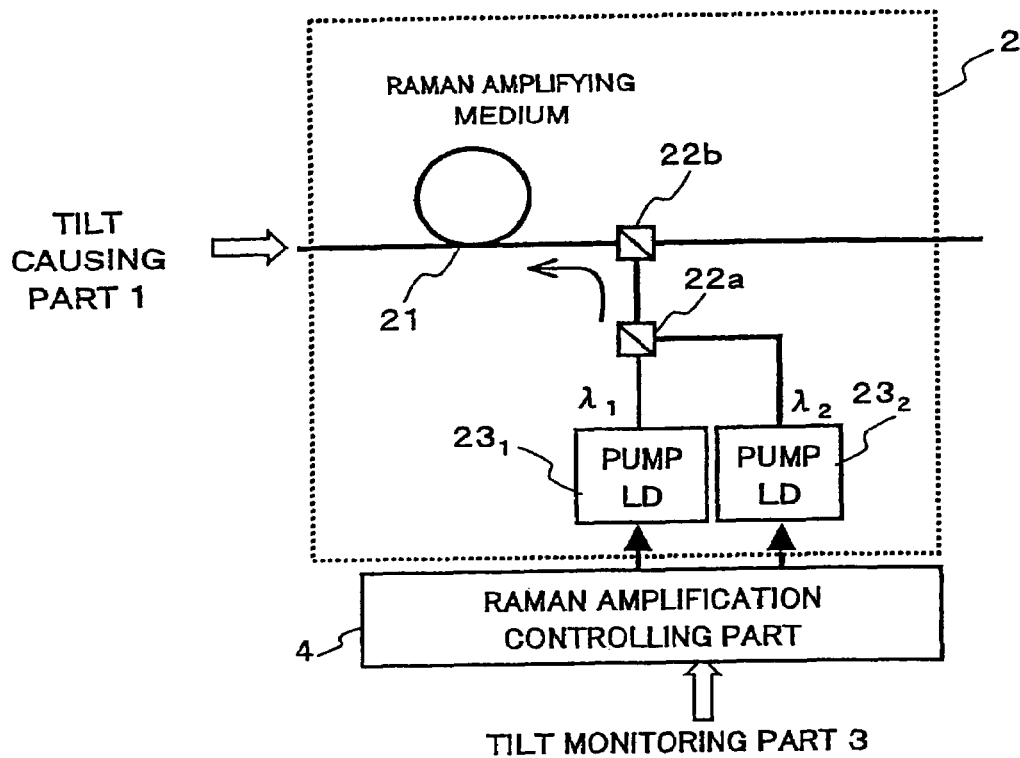
FIG. 8 is a diagram showing an example of specific constitution in which pump light including two wavelengths is supplied from backward, for the Raman amplification generating part.

FIG. 8 is a diagram showing an example of specific constitution of the Raman amplification generating part 2 adopting two kinds of pump wavelengths $\lambda_1$ and $\lambda_2$.

In the constitution of FIG. 8, Raman pump light of pump wavelength $\lambda_1$ generated by a pump LD $23_1$ and Raman pump light of pump wavelength $\lambda_2$ generated by a pump LD $23_2$ are multiplexed by a WDM coupler 22a and then supplied from the backward side of the Raman amplifying medium 21 via a WDM coupler 22b. The driving conditions of the pump LD's $23_1$ and $23_2$ are controlled by signals, respectively, output by the Raman amplification controlling part 4 in response to the monitored result of the tilt monitoring part 3.

Figure 9:
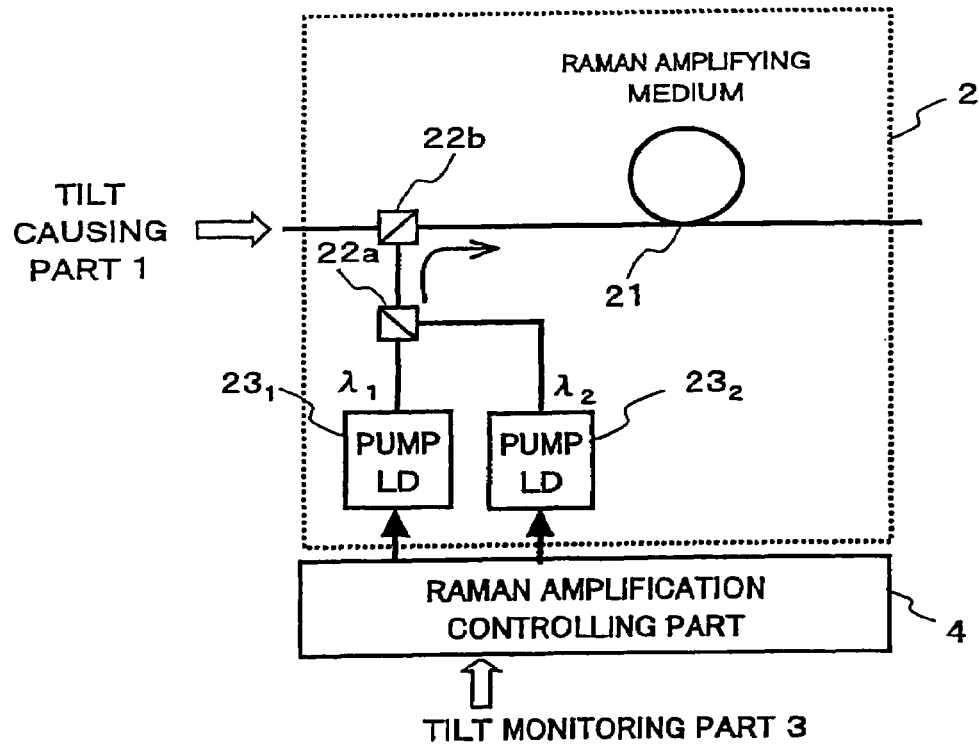
FIG. 9 is a diagram showing an example of specific constitution of a forward pumping type in which pump light including two wavelengths is supplied, for the Raman amplification generating part.
Figure 10:
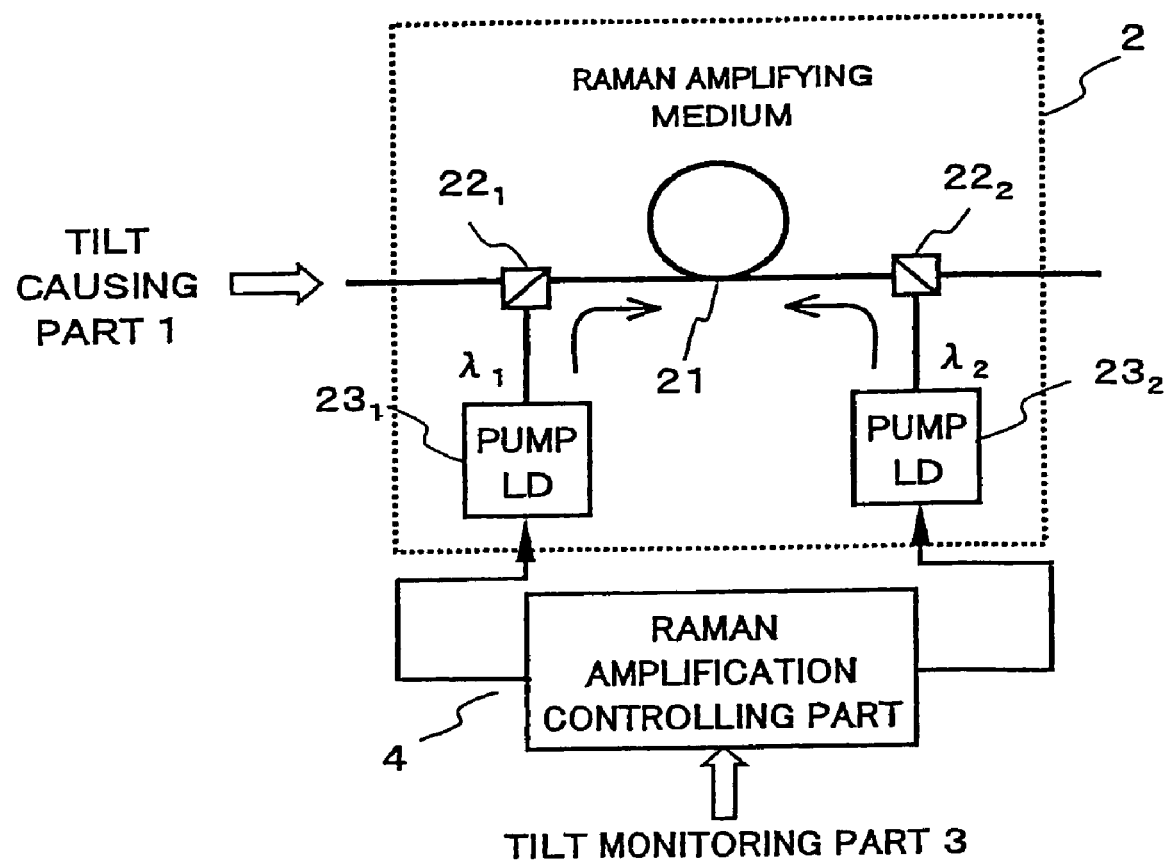
FIG. 10 is a diagram showing an example of specific constitution of a bidirectional pumping type in which pump light including two wavelengths is supplied, for the Raman amplification generating part.

There is shown here a situation where the pump lights of respective wavelengths are supplied from the backward side of the Raman amplifying medium 21. However, it is possible to adopt a constitution such as shown in FIG. 9 in which respective pump lights are supplied from the forward side of the Raman amplifying medium 21. It is also possible to adopt a constitution such as shown in FIG. 10 in which respective pump lights are supplied from both directions of the Raman amplifying medium 21, via WDM couplers $22_1$ and $22_2$.

Figure 11:
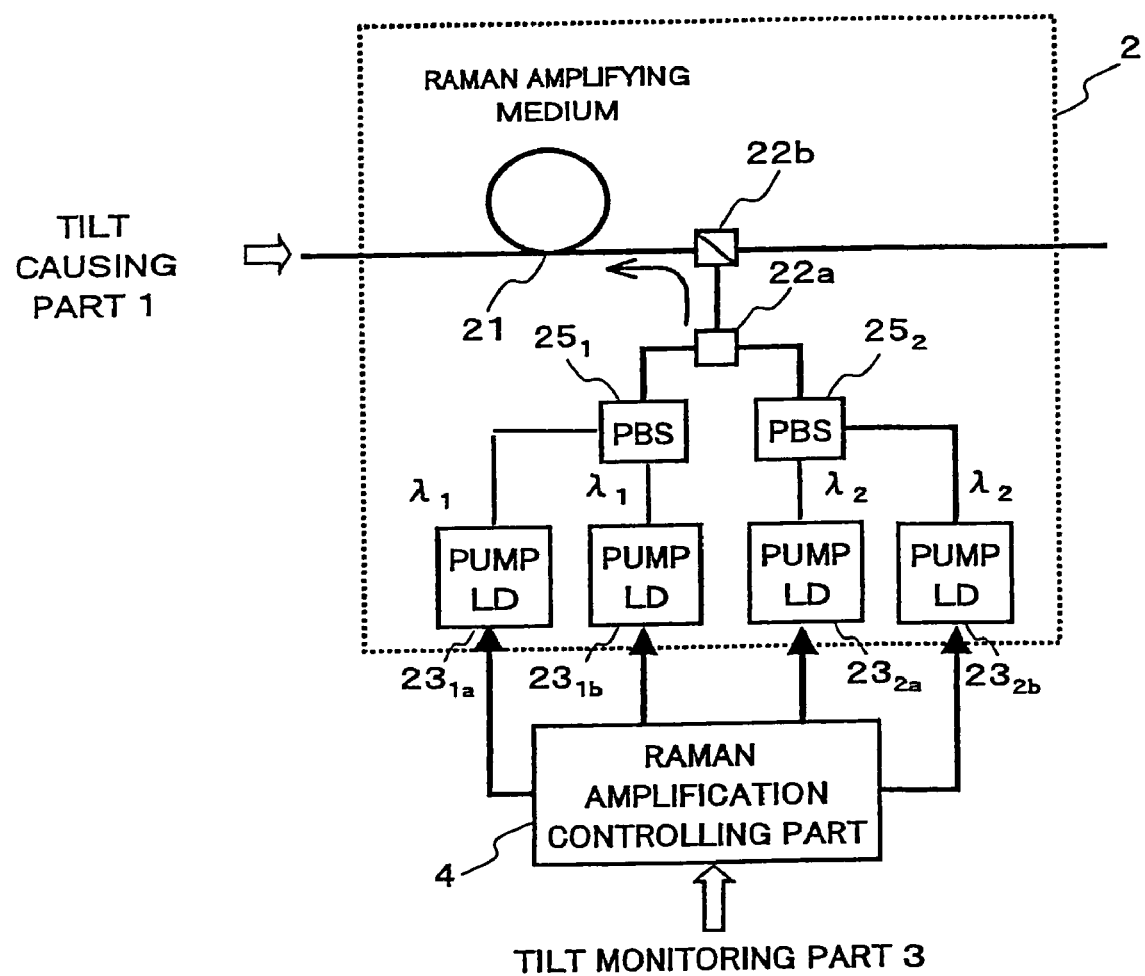
FIG. 11 is a diagram showing an example of specific constitution of a backward pumping type in which pump light including two wavelengths generated by a plurality of pump LD's is supplied, for the Raman amplification generating part.
Figure 12:
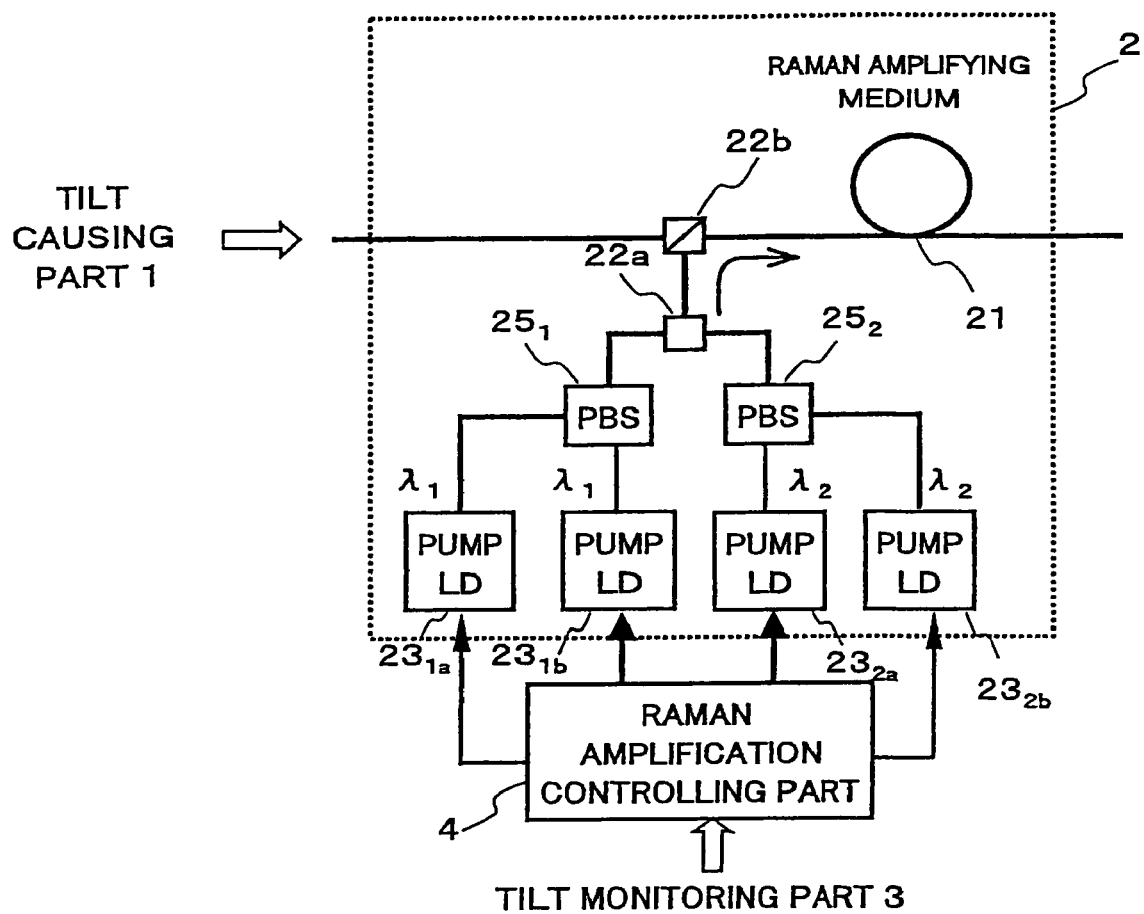
FIG. 12 is a diagram showing an example of specific constitution of a forward pumping type in which pump light including two wavelengths generated by a plurality of pump LD's is supplied, for the Raman amplification generating part.
Figure 13:
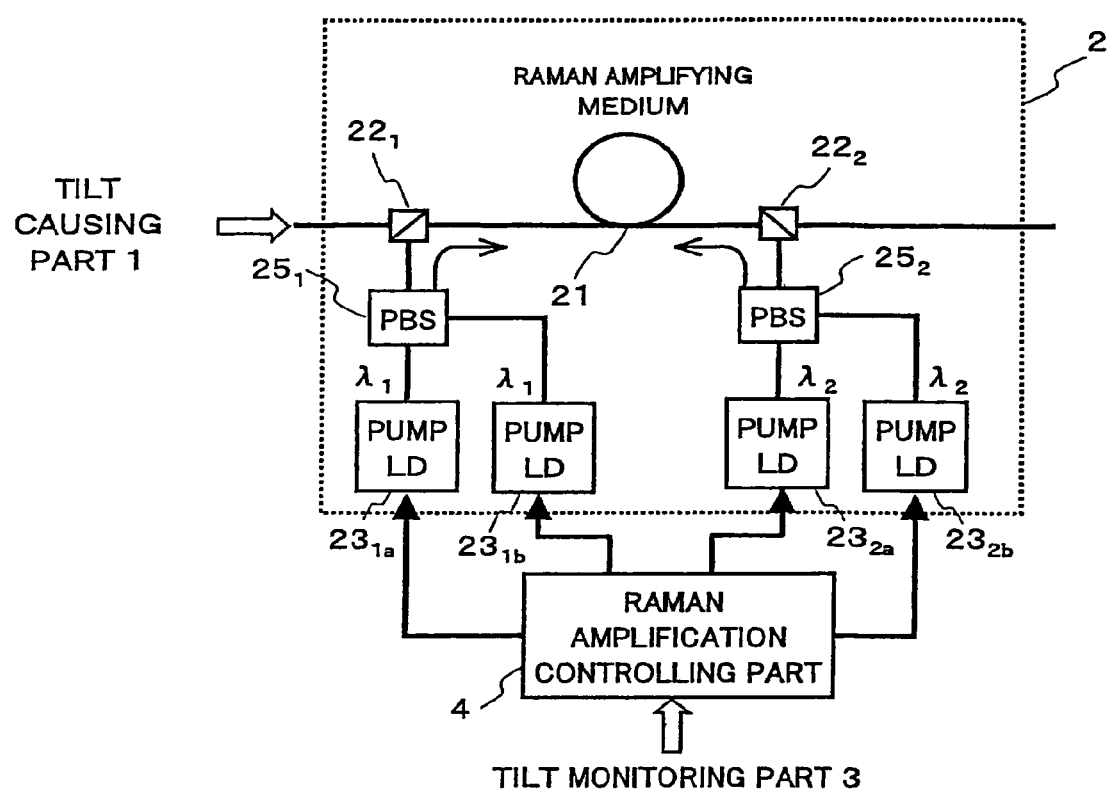
FIG. 13 is a diagram showing an example of specific constitution of a bidirectional pumping type in which pump light including two wavelengths generated by a plurality of pump LD's is supplied, for the Raman amplification generating part.

In the above, there have been shown constitutions in which pump lights of respective wavelengths are output from independent pump LD's, respectively. However, in a situation where an output light power of an independent pump LD is insufficient, it is possible to adopt a plurality of pump LD's so as to generate pump lights of respective wavelengths. FIGS. 11 through 13 show constitutional examples, respectively, in which two pump LD's are adopted to generate each of pump lights of pump wavelengths $\lambda_1$ and $\lambda_2$.

In each of the constitutions of a backward pumping type shown in FIG. 11 and a forward pumping type shown in FIG. 12, respective Raman pump lights of pump wavelength $\lambda_1$ generated by pump LD's $23_{1a}$, $23_{1b}$ are multiplexed by an cross polarization multiplexer (PBS) $25_1$ via polarization-preserving fibers, and respective Raman pump lights of pump wavelength $\lambda_2$ generated by pump LD's $23_{2a}$, $23_{2b}$ are multiplexed by a cross polarization multiplexer (PBS) $25_2$ via polarization-preserving fibers. Further, the pump lights of wavelengths $\lambda_1$ and $\lambda_2$ are multiplexed by the WDM coupler 22a, and then supplied to the Raman amplifying medium 21 via the WDM coupler 22b. In the constitution of a bidirectional pumping type of FIG. 13, the pump lights of wavelengths $\lambda_1$ and $\lambda_2$ multiplexed by the cross polarization multiplexers $25_1$, $25_2$ are supplied to the Raman amplifying medium 21 via the WDM couplers $22_1$, and $22_2$, respectively.

Figure 14:
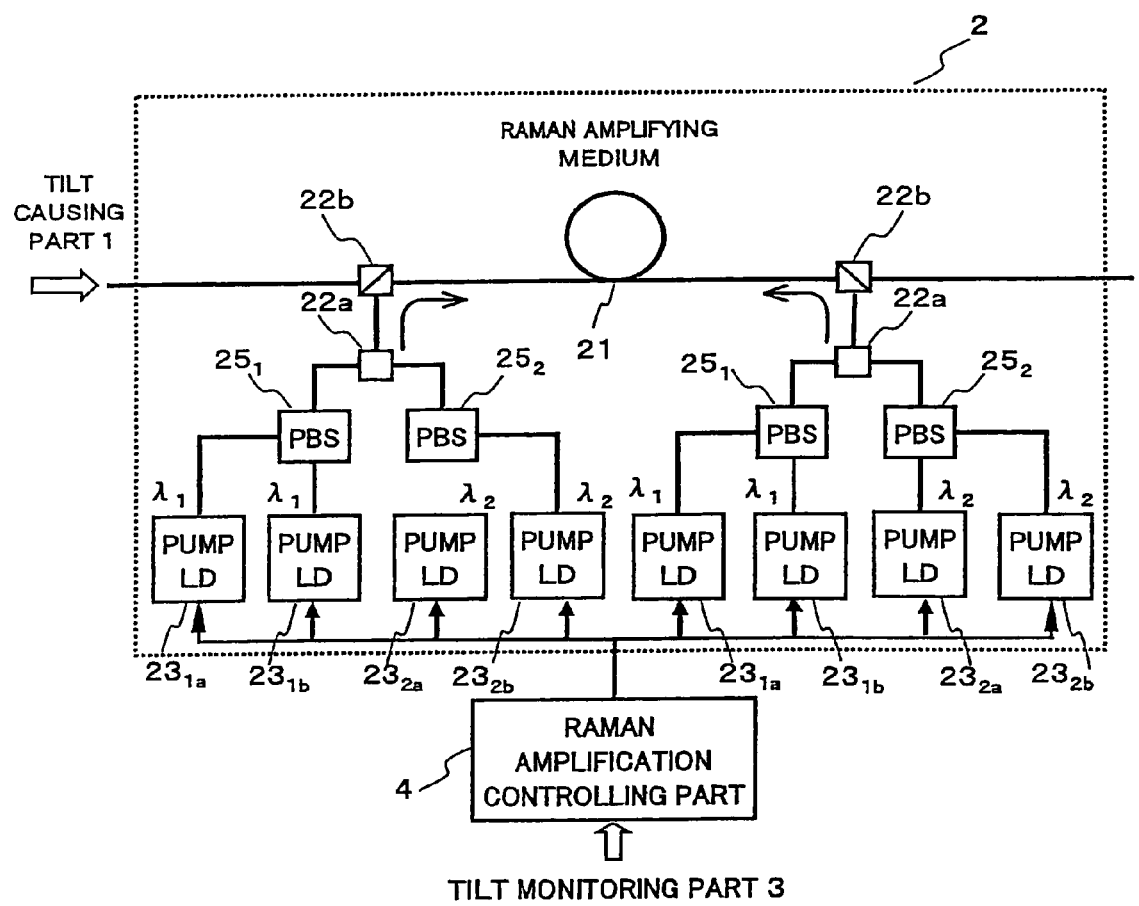
FIG. 14 is a diagram showing an example of constitution of a bidirectional pumping type, obtained by combining the backward pumping type of FIG. 11 and the forward pumping type of FIG. 12.

Further, as shown in FIG. 14, it is also possible to adopt a constitution of a bidirectional pumping type which combines the backward pumping type of FIG. 11 and the forward pumping type of FIG. 12.

Figure 15:
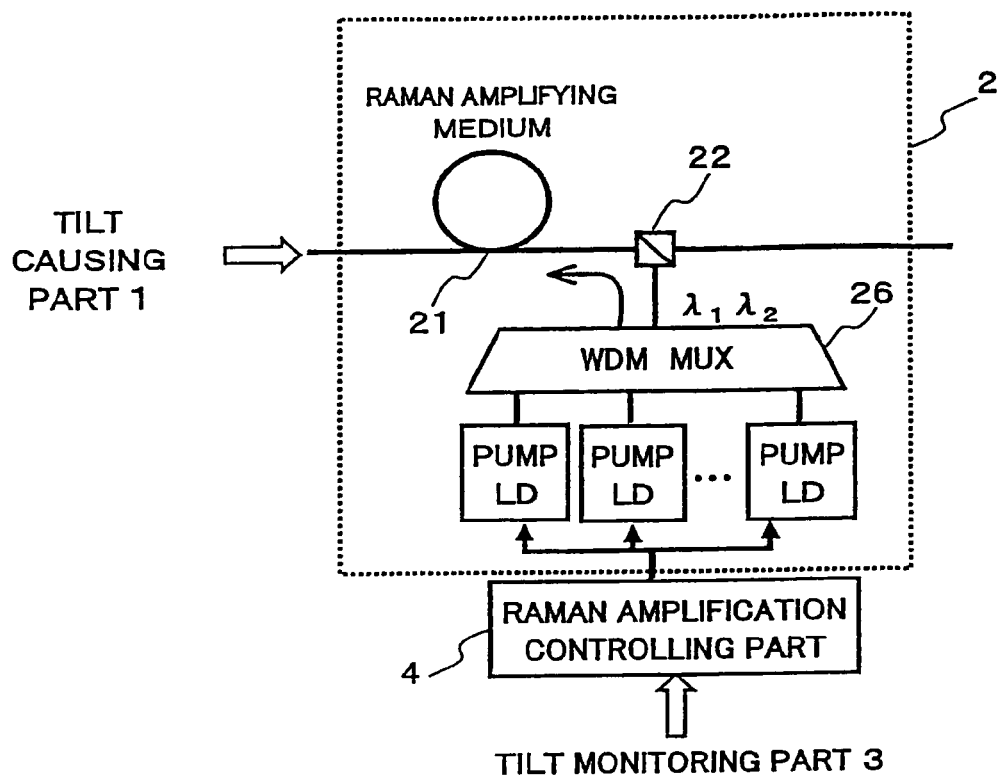
FIG. 15 is a diagram showing an example of specific constitution of a backward pumping type in which pump light including two wavelengths is supplied via a WDM multiplexer, for the Raman amplification generating part.
Figure 16:
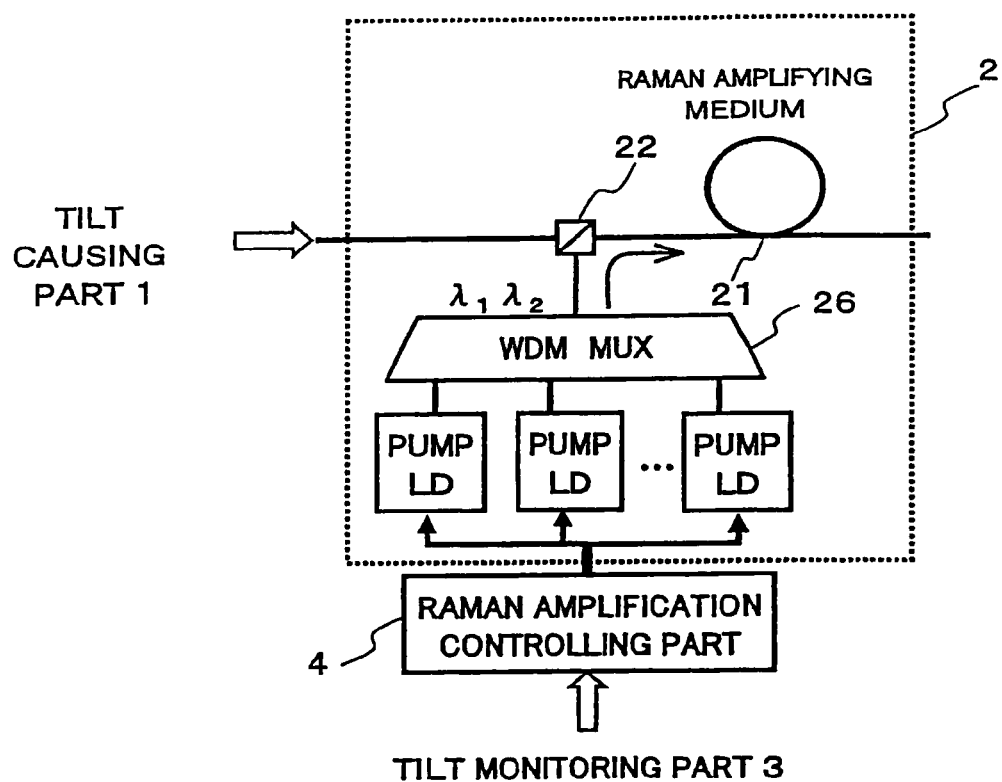
FIG. 16 is a diagram showing an example of specific constitution of a forward pumping type in which pump light including two wavelengths is supplied via a WDM multiplexer, for the Raman amplification generating part.
Figure 17:
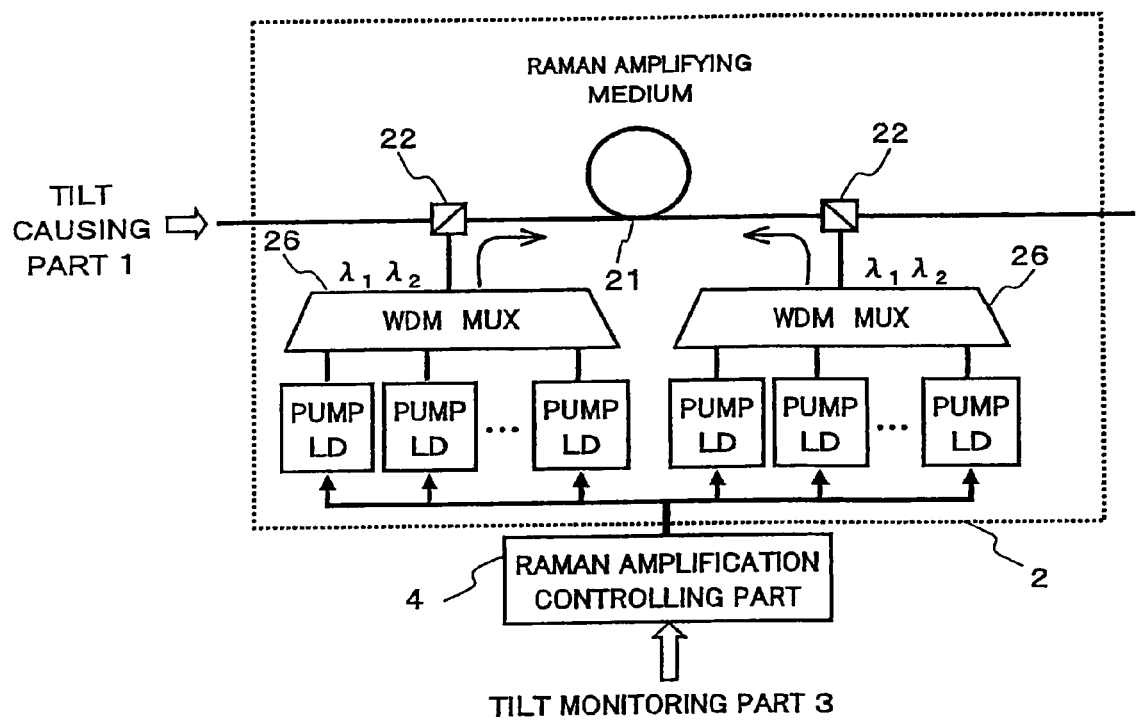
FIG. 17 is a diagram showing an example of specific constitution of a bidirectional pumping type in which pump light including two wavelengths is supplied via a WDM multiplexer, for the Raman amplification generating part.

In the aforementioned constitutional examples, the pump lights to be output from the respective pump LD's are multiplexed such as by WDM couplers and cross polarization multiplexers. However, it is also possible to adopt a WDM multiplexer having input ports corresponding to a plurality of pump LD's. FIGS. 15 through 17 show constitutional examples adopting WDM multiplexers.

In each of the constitutions of backward pumping type of FIG. 15, forward pumping type of FIG. 16, and bidirectional pumping type of FIG. 17, pump lights of respective pump wavelengths $\lambda_1$ and $\lambda_2$ generated by pump LD's $23_a$, $23_b$, ... are multiplexed by a WDM multiplexer 26, and then supplied to the Raman amplifying medium 21 via the WDM coupler 22.

There will be now briefly explained Raman amplification where pump lights of two wavelengths are adopted.

Figure 18:
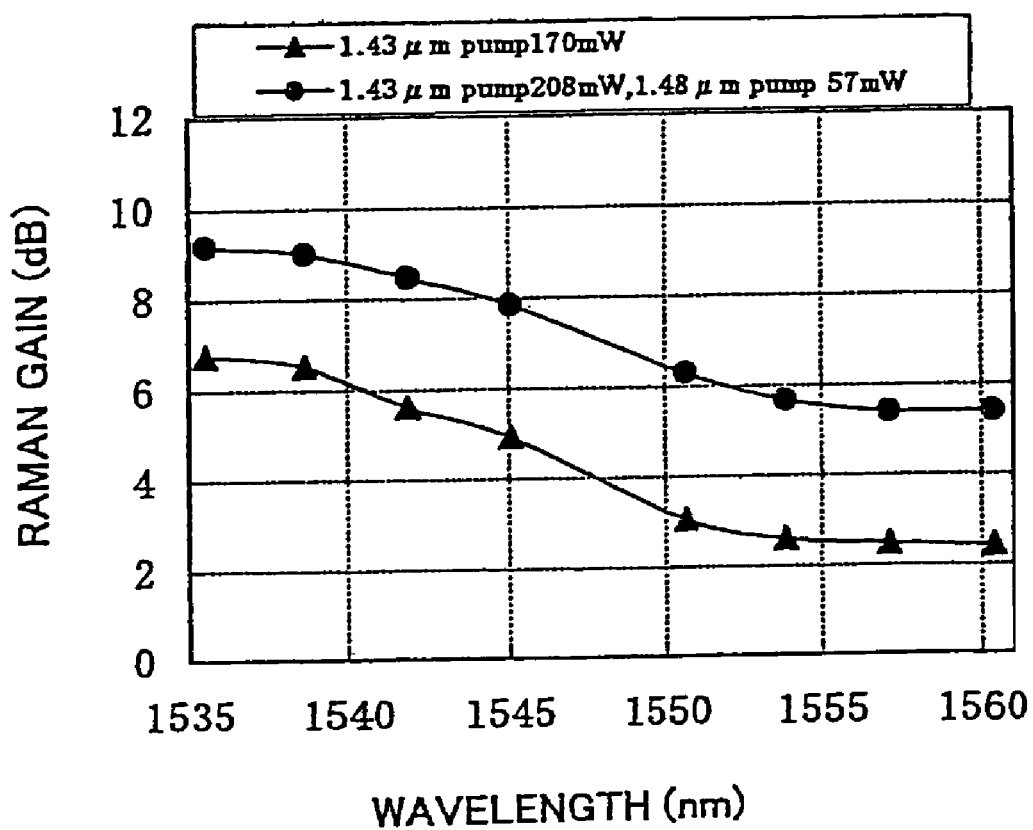
FIG. 18 is a graph showing an example of gain wavelength characteristics of Raman amplification to be obtained by setting pump wavelengths at 1,430 nm and 1,485 nm, respectively.

FIG. 18 is a graph showing an example of gain wavelength characteristics of Raman amplification to be obtained by setting pump wavelengths $\lambda_1$ and $\lambda_2$ at 1,430 nm and 1,485 nm, respectively.

As shown in FIG. 18, when pump lights including two wavelengths $\lambda_1$ and $\lambda_2$ having gain wavelength characteristic inclination signs (inclination directions) opposing to each other are supplied to the Raman amplifying medium 21 at a required ratio (in this figure, 208 mW: 57 mW), as compared to a gain wavelength characteristic of Raman amplification to be obtained only when pump light of one wavelength $\lambda_1$ is supplied at a required power (170 mW, in the figure), it becomes possible to realize a gain wavelength characteristic having a similar inclination and a gain increased over a whole of signal light band. In this way, improvement of an optical S/N ratio can be attained, by increasing the gain of the whole of signal light band while maintaining the inclination corresponding to the caused tilt.

There will be described hereinafter a specific constitution of the tilt monitoring part 3.

At the tilt monitoring part 3, wavelength characteristics of optical transmission powers are monitored with respect to output light of the Raman amplification generating part 2 as mentioned above. This monitoring of wavelength characteristics of optical transmission powers are performed in general by measuring an optical spectrum of output light, and various techniques have been proposed for specific measuring procedures therefor (for example, refer to an earlier Japanese Patent Application No. 11-54374 of the present applicant, and an article by K. Otsuka et al., ECOC'97, Vol. 2, pp. 147-150 (1997)). There will be mentioned hereinafter one example of the aforementioned method, and its overview will be explained.

Figure 19:
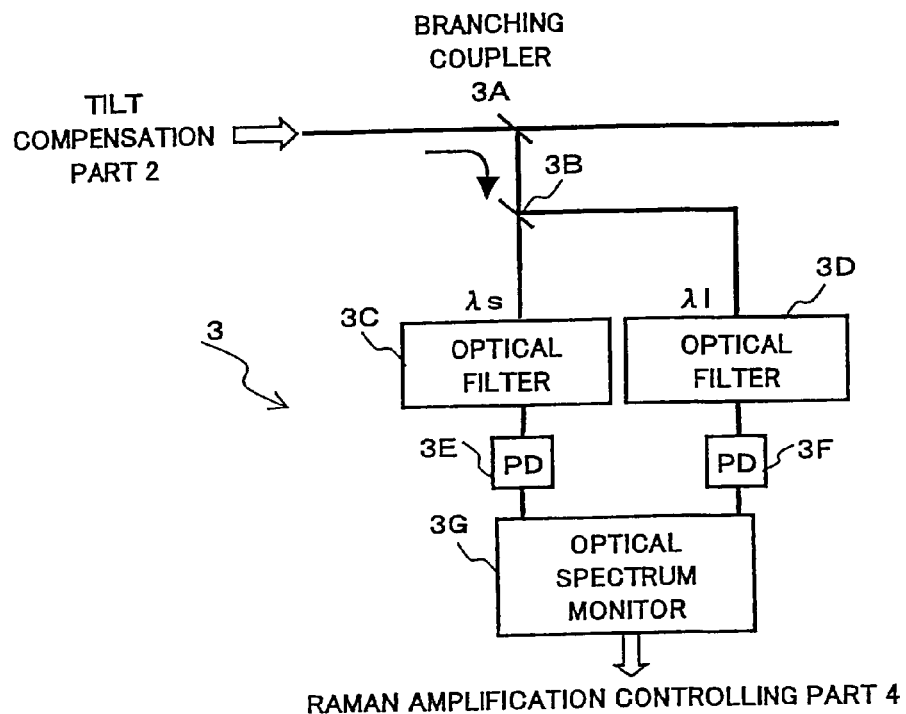
FIG. 19 is a diagram showing an example of specific constitution, for a tilt monitoring part of the basic constitution of FIG. 1.

FIG. 19 is a block diagram showing an example of specific constitution of the tilt monitoring part 3.

The tilt monitoring part 3 of FIG. 19 includes: an optical coupler 3B for further branching into two, a part of WDM signal light from the Raman amplification generating part 2 branched by an optical coupler 3A; optical filters 3C, 3D having transmission bands different from each other; photodetectors (PD) 3E, 3F for converting light passed through the optical filters 3C, 3D into electric signals; and an optical spectrum monitor 3G for obtaining wavelength characteristics of optical transmission power, based on the signals from respective photodetectors 3E, 3F. It is supposed here that the optical signal to be sent to the tilt monitoring part 3 has been amplified such as by an optical fiber amplifier on the way of its transmission.

From one of the optical signals branched by the optical coupler 3B, the optical filter 3C extracts amplified spontaneous emission (ASE) light of a narrow wavelength band near a shortest signal light wavelength within the maximum number of input signals. Further, from the other of the optical signals branched by the optical coupler 3B, the optical filter 3D extracts ASE light of a narrow wavelength band near a longest signal light wavelength within the maximum number of input signals.

Figure 20:
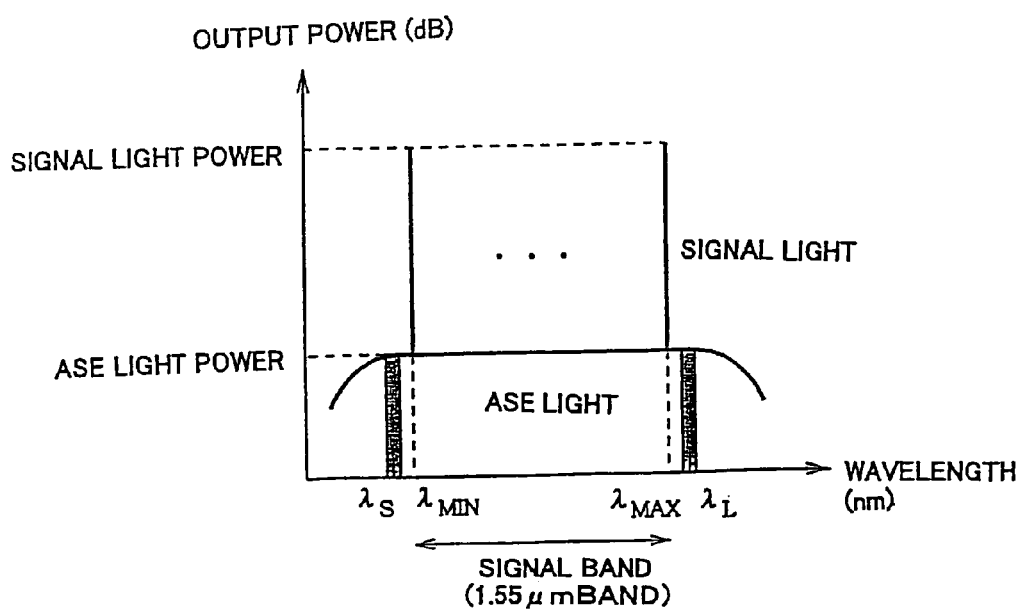
FIG. 20 is a graph showing an overview of ASE light to be extracted by the tilt monitoring part of FIG. 19.

FIG. 20 is a graph showing an overview of ASE light to be extracted by the optical filters 3C, 3D.

As shown in FIG. 20, central wavelength $\lambda_S$ of transmission band of the optical filter 3C is set near a shorter wavelength side of a shortest signal wavelength $\lambda_{MIN}$, and central wavelength $\lambda_L$ of transmission band of the optical filter 3D is set near a longer wavelength side of a longest signal wavelength $\lambda_{MAX}$. Wavelength widths from central wavelengths $\lambda_S$, $\lambda_L$ to the signal wavelengths $\lambda_{MIN}$, $\lambda_{MAX}$ are determined corresponding to transmission band widths of optical filters 3C, 3D, respectively, and shall be decreased as narrow as possible insofar as the transmission bands of the optical filters do not touch the signal light wavelength. As an optical filter having this type of steep transmission characteristic, such as a fiber Bragg grating is preferable and its transmission band width has been realized at an order of 0.1 nm. In case of adopting such an optical filter, widths from central wavelengths $\lambda_S$, $\lambda_L$ to signal wavelengths $\lambda_{MIN}$, $\lambda_{MAX}$ may be set at an order of 1 nm, respectively.)

The optical spectrum monitor 3G obtains an ASE light power near the shortest wavelength based on the signal which is extracted by the optical filter 3C and photoelectrically converted by the photodetector 3E, obtains an ASE light power near the longest wavelength based on the signal which is extracted by the optical filter 3D and photoelectrically converted by the photodetector 3F, calculates output deviations among channels in the output light of the Raman amplification generating part 2 based on the deviations of the respective ASE light powers, and feeds back the values to the Raman amplification generating part 2. The reason why the deviations of ASE light powers can be used for obtaining the output deviations in the signal light is that a ratio between a signal light and an ASE light is supposed to be constant to a wavelength. By monitoring ASE light powers in this way, it becomes possible to monitor deviations of optical transmission powers among channels, such as irrespectively of the number of signal lights to be transmitted and irrespectively of variation of signal light wavelengths.

The method to monitor wavelength characteristics of optical transmission powers is not limited to the aforementioned one which utilizes ASE light. For example, it is also possible to measure signal light powers of a shortest wavelength and a longest wavelength included in WDM signal light, to thereby monitor wavelength characteristics of optical transmission powers. In such a case: the tilt monitoring part 3 is required to obtain information concerning a shortest wavelength and a longest wavelength of input signal light, from the outside; and it is also required to apply a tunable filter capable of changing a transmission band, as an optical filter for extracting signal lights at the shortest wavelength and the longest wavelength.

Figure 21:
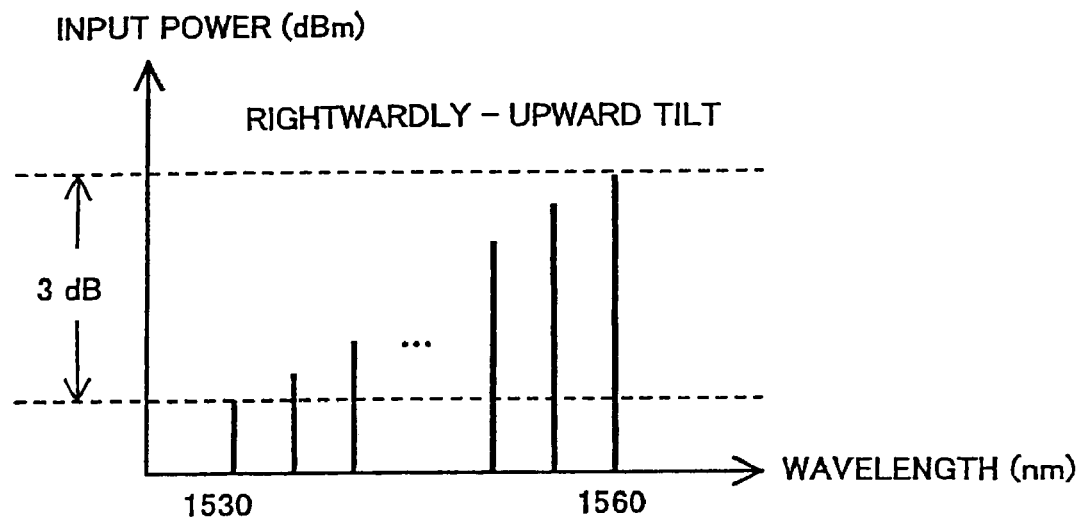
FIG. 21 is a graph showing wavelength characteristics of optical transmission powers generated at a tilt causing part.

In the apparatus having the aforementioned basic constitution (FIG. 1), WDM signal light such as in the C-band is propagated through the tilt causing part 1 to thereby cause a rightwardly-upward tilt such as shown in FIG. 21 in which optical transmission powers of respective channels increase with growth of wavelength. This kind of WDM signal light having such a tilt is transmitted to the Raman amplification generating part 2.

Figure 22:
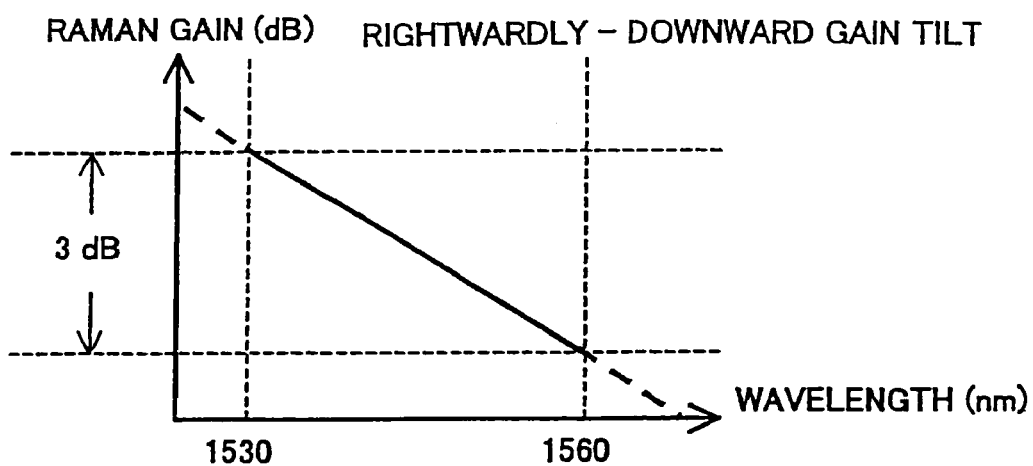
FIG. 22 is a graph showing gain wavelength characteristics of Raman amplification for compensating the tilt shown in FIG. 21.
Figure 23:
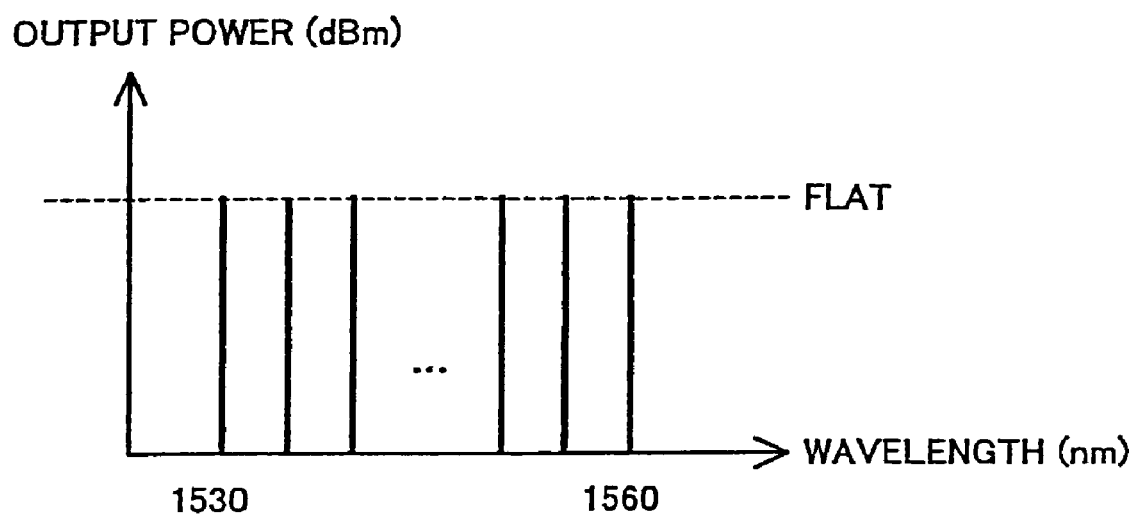
FIG. 23 is a graph showing wavelength characteristics of WDM signal light powers which have passed the Raman amplification generating part.

At the Raman amplification generating part 2, the Raman amplifying medium 21 is supplied with required pump light which is set corresponding to the aforementioned rightwardly-upward tilt, and the WDM signal light from the tilt causing part 1 is input into the Raman amplifying medium 21. WDM signal light propagated through the Raman amplifying medium 21 is amplified in accordance with a gain wavelength characteristic of Raman amplification such as shown in FIG. 22. In this way, the wavelength characteristics of optical transmission powers caused at the tilt causing part 1 are compensated by Raman amplification at the Raman amplification generating part 2, so that this part 2 outputs WDM signal light in which dispersions of optical transmission powers among respective channels have been flattened as shown in FIG. 23.

A part of output light of the Raman amplification generating part 2 is sent to the tilt monitoring part 3 which monitors the wavelength characteristics of the optical transmission powers, to thereby monitor as to whether the compensating operation at the Raman amplification generating part 2 is effectively functioning.

The Raman amplification controlling part 4 which has received the monitored result of the tilt monitoring part 3, generates a signal for controlling a driving condition of a pump LD to be sent to the pump LD such that output deviations among channels of the Raman amplified WDM signal light are compensated.

Concretely, in case of supplying pump light including a single wavelength to the Raman amplifying medium 21 as shown in FIG. 4, the output power of the pump LD 23 is controlled. In case of supplying pump light including a plurality of wavelengths to the Raman amplifying medium 21 as shown in FIGS. 8 through 17, driving conditions of respective pump LD's are adjusted to thereby control the supplying powers of pump lights at respective wavelengths and the ratios among the supplying powers.

For example, in case of Raman amplifying signal light at the C-band making use of pump light including two wavelengths $\lambda_1$, $\lambda_2$ ($\lambda_1 < \lambda_2$), it is a desirable controlling method, to fix a pump light power of pump wavelength $\lambda_2$ at a longer wavelength side, and to adjust a pump light power of wavelength $\lambda_1$ at a shorter wavelength side in response to a controlling signal from the Raman amplification controlling part 4.

FIG. 24 is a graph showing wavelength characteristics of Raman gains where a pump light power of wavelength $\lambda_2 = 1.47$ µm is fixed and a pump light power of wavelength $\lambda_1 = 1.43$ µm is varied, in which (a) is a measured result where the pump light power of 1.47 µm is fixed at 83 mW such that a minimum Raman gain becomes 4 dB, and (b) is a measured result where the pump light power of 1.47 µm is fixed at 133 mW such that a minimum Raman gain becomes 6 dB.

As understood from FIG. 24, the larger the pump light power of 1.43 µm, the steeper the rightwardly-downward inclination of the wavelength characteristics of Raman gain. Thus, should the Raman amplification controlling part 4 generate a controlling signal for adjusting a pump light power of 1.47 µm corresponding to the interchannel output deviation monitored by the tilt monitoring part 3, there can be automatically performed a suitable compensating operation corresponding to an actual Raman amplifying state.

According to the apparatus having the aforementioned basic constitution, WDM signal light caused with dispersions in its optical transmission powers of respective channels are not given with "loss" differently from the conventional, but given with compensation for the wavelength characteristics of optical transmission powers by preferentially increasing channels of lower powers making use of gain wavelength characteristics of Raman amplification. Thus, there can be avoided degradation of an optical S/N ratio. Further, optical S/N ratio can be rather improved, if compensation is performed by Raman amplification by an amount equal to or greater than an insertion loss at the Raman amplification generating part 2. The gain wavelength characteristics of Raman amplification at the Raman amplification generating part 2 are controlled by providing the tilt monitoring part 3, so that the wavelength characteristics of optical transmission powers can be compensated more assuredly. It is particularly effective to automatically control the gain wavelength characteristics of Raman amplification, for a system in which a number of channel lights to be used and wavelengths are variously changed.

There will be now described a specific embodiment applied with the aforementioned basic constitution.

Figure 25:
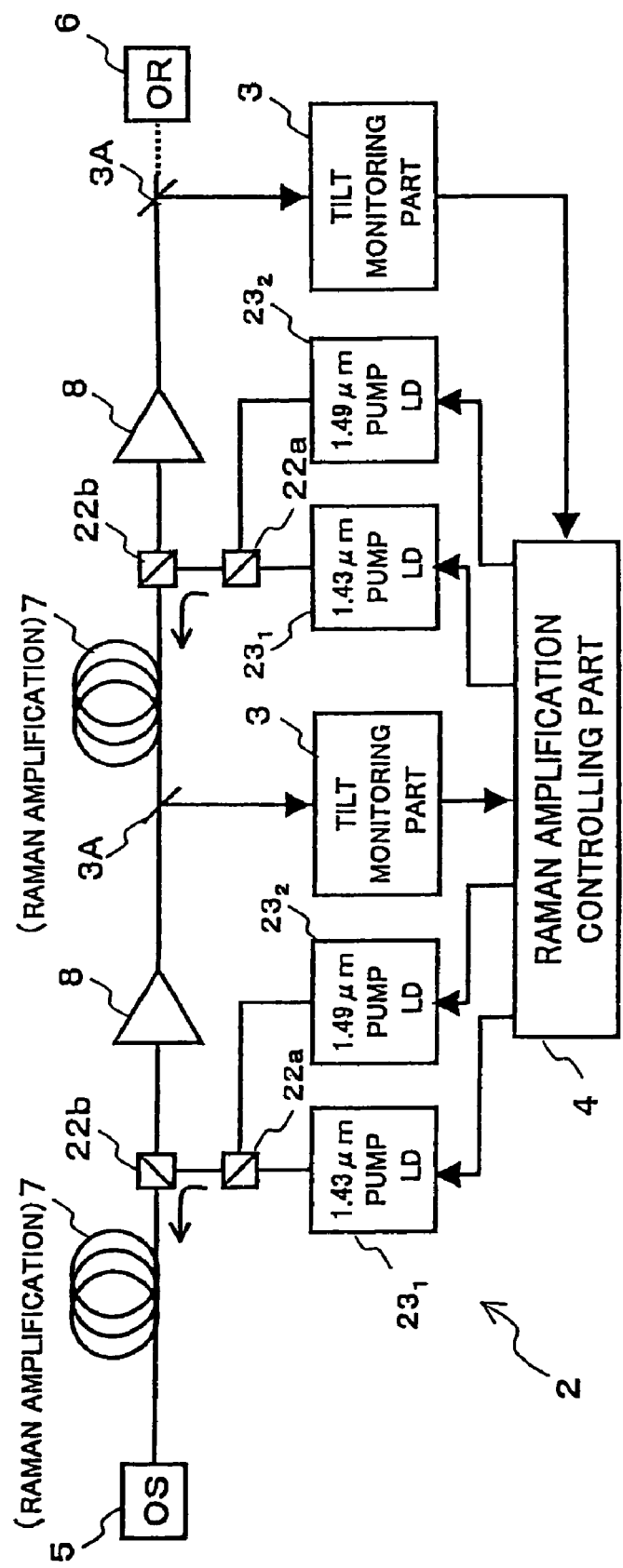
FIG. 25 is a block diagram showing an entire constitution of a WDM optical communication system according to a first embodiment of the present invention.

FIG. 25 is a block diagram showing an entire constitution of a WDM optical communication system according to a first embodiment applied with the aforementioned basic constitution.

The system of FIG. 25 is applied with the aforementioned basic constitution by utilizing optical transmission paths 7 of respective repeater sections as Raman amplifying mediums, for a common WDM optical communication system which repeatingly transmits WDM signal light such as by interconnecting an optical sender (OS) 5 and an optical receiver (OR) 6 through the optical transmission paths 7 and by arranging optical amplifiers 8 on the way of the optical transmission paths 7, respectively.

Concretely, WDM couplers 22b are provided between output ends of optical transmission paths 7 and input ends of optical amplifiers 8 of repeater sections, respectively. Supplied from a backward side of each optical transmission path 7 via the WDM coupler 22b is pump light obtained by multiplexing by WDM couplers 22a pump light of 1,430 nm to be output from the pump LD $23_1$ and pump light of 1,485 nm to be output from a pump LD $23_2$. An optical coupler 3A is arranged at an output end of each optical amplifier 8, and there is provided a tilt monitoring part 3 for monitoring wavelength characteristics of optical transmission powers making use of branched light from the optical coupler 3A. A monitored result of this tilt monitoring part 3 is sent to a Raman amplification controlling part 4 from which controlling signals are transmitted to respective pump LD's corresponding to respective repeater sections.

As the optical transmission path 7, there are used such as 1.3 µm zero-dispersion SMF and dispersion-shifted fiber (DSF, NZ-DSF) having a length for one repeater section such as in the order of 40 to 100 km. The optical amplifier 8 may include a known optical amplifier such as Erbium doped optical fiber amplifier (EDFA).

In the first embodiment as described above, the Raman amplification generating part 2 shown in FIG. 8 is applied to each of repeater sections in a manner corresponding thereto, such that the optical transmission path 7 of each repeater section corresponds to the tilt causing part 1 and to the Raman amplifying medium 21 of Raman amplification generating part 2. Further, the pump LD's $23_1$ and $23_2$ correspond to pump light generating parts, while the WDM couplers 22a, 22b correspond to pump light supplying parts. It is noted that the optical amplifier 8 becomes a part of tilt causing part 1 in the repeater section at second stage and so forth.

In the first embodiment having such a constitution, WDM signal light having equalized channel light powers is transmitted from the optical sender 5 to the optical transmission path 7 of a first repeater section. Then, the wavelength loss characteristics specific to this optical transmission path 7 are compensated by gain wavelength characteristics by virtue of Raman amplification, since this optical transmission path 7 is supplied with pump light of wavelength 1,430 nm and pump light of wavelength 1,485 nm at required powers and a ratio therebetween. Thus, WDM signal light having passed through the optical transmission path 7 includes equalized optical transmission powers of respective channels.

The WDM signal light having passed through the optical transmission path 7 and the WDM coupler 22b of the first repeater section is amplified by the optical amplifier 8 up to a required level, and then sent to the optical transmission path 7 at the next repeater section. Thereafter, operations identical with that at the first repeater section are repeated.

On the other hand, a part of WDM signal light output from each optical amplifier 8 is branched by the optical coupler 3A and then sent to the tilt monitoring part 3. At the tilt monitoring part 3, there are monitored wavelength characteristics of optical transmission powers for the WDM signal light being repeatingly transmitted, and the monitored result is fed back to the Raman amplification controlling part 4.

By the Raman amplification controlling part 4 which has received such a monitored result that the optical transmission power at the shorter wavelength side is smaller than that at the longer wavelength side with respect to the C-band WDM signal light, driving conditions of respective pump LD's are controlled such that the proportion of pump light power of wavelength 1,430 nm is increased in a sequence from a transmission side repeater section toward a receiving side repeater section. Conversely, when the Raman amplification controlling part 4 has received such a monitored result that the optical transmission power at the shorter wavelength side is larger than that at the longer wavelength side, driving conditions of respective pump LD's are controlled such that the proportion of pump light power of wavelength 1,430 nm is decreased in the sequence from a transmission side toward a receiving side.

Namely, the Raman amplification controlling part 4 takes into consideration the transmission characteristics of the optical communication system as a whole, and compensates the tilts in the sequence from a transmission side toward a receiving side, giving priority to the monitored result at the transmission side. Basically, tilt compensations are not performed simultaneously at a plurality of Raman amplifying parts at this time, and those Raman amplifying parts which are not performing tilt compensation are to hold the present situations for generating conditions of pump lights, respectively.

In this way, the WDM signal light, the wavelength characteristics of optical transmission powers of which have been compensated by Raman amplification, is sent to the optical receiver 6 and then demultiplexed into signal lights of respective wavelengths for execution of receiving procedures.

There will be now mentioned a result of a transmission experiment conducted for the aforementioned WDM optical communication system. Only, this transmission experiment has been conducted for transmission characteristics in a single repeater section. Namely, there have been measured transmission characteristics of WDM signal light passed through the optical transmission path 7 and optical amplifier

8 of the first repeater section. Further, there has been adopted WDM signal light including 8 (eight) waves of optical signals within the C-band.

Figure 26:
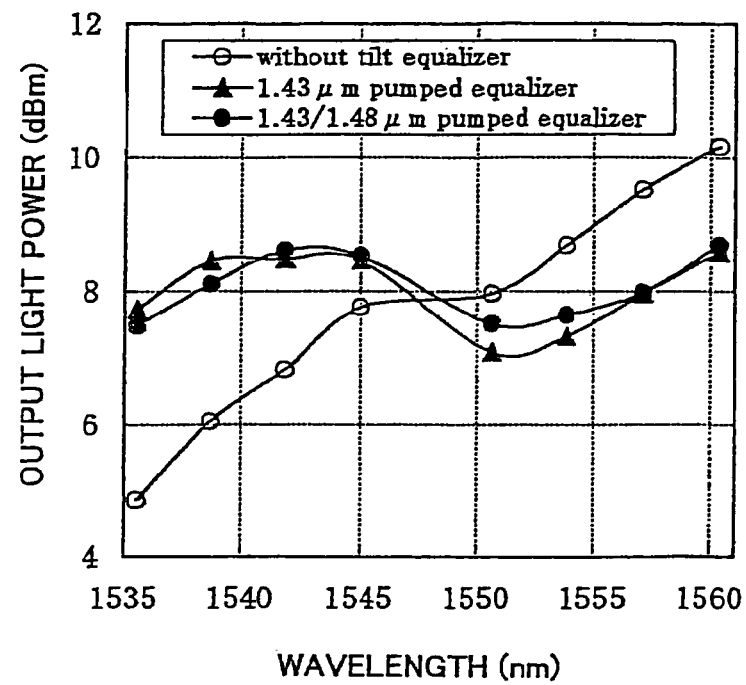
FIG. 26 is a graph showing wavelength characteristics of WDM signal light powers to be output from an optical amplifier in the first embodiment.

FIG. 26 is a graph showing wavelength characteristics of WDM signal light powers to be output from the optical amplifier 8. FIG. 26 shows situations of: absence of Raman pump light supply to the optical transmission path 7; presence of pump light supply at wavelength 1,430 nm only; and presence of pump light supply at wavelength 1,430 nm and wavelength 1,485 nm in a required ratio.

As shown in FIG. 26, the optical transmission power increases as the wavelength of signal light lengthens, in the absence of Raman pump light supply, thereby causing a rightwardly-upward tilt. Contrary, in the presence of compensation by Raman amplification by supplying pump light, the wavelength characteristics of optical transmission powers are improved to be relatively flat.

Figure 27:
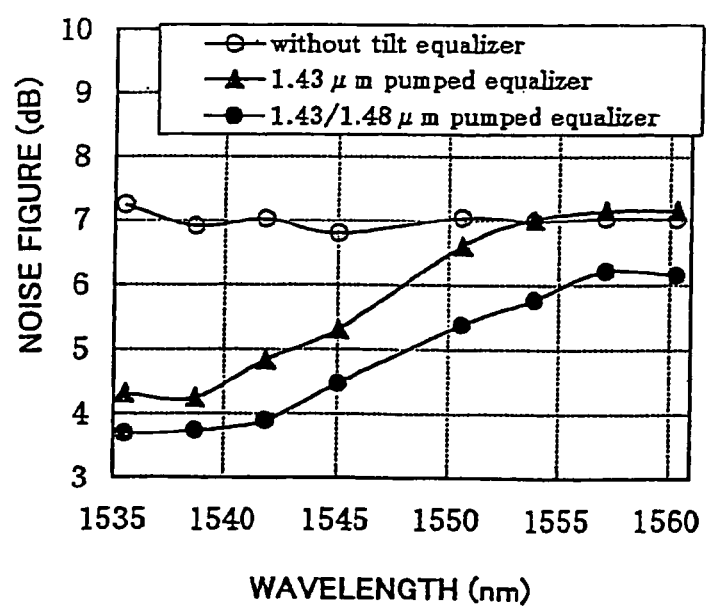
FIG. 27 is a graph showing wavelength characteristics of noise figures measured at an output end of the optical amplifier in the first embodiment.

FIG. 27 is a graph showing wavelength characteristics of noise figures (NF) measured at the output end of the optical amplifier 8. There are also shown the respective wavelength characteristics of noise figures, corresponding to supply conditions of Raman pump light.

As understood from FIG. 27, noise figure is about 7 dB over an entire region of C-band in the absence of Raman pump light supply, while noise figure is remarkably improved at a shorter wavelength side in case of pump light supply at 1,430 nm. Noise figure at a longer wavelength side is not improved by supplying pump light at 1,430 nm only, and is conversely degraded to a slight degree corresponding to the insertion loss of the WDM coupler 22b.

To improve the transmission characteristic at the longer wavelength side, it is advisable to supply pump lights including both of 1,430 nm and 1,485 nm with required proportions, respectively, in the aforementioned manner shown in FIG. 18. In this way, there can be realized a wavelength characteristic having: an inclination similar to that of gain wavelength characteristic of Raman amplification which is obtained when pump light at 1,430 nm only is supplied; and a gain increased over the whole of signal light band. Thus, the compensation is performed up to a degree equal to or more than the insertion loss of WDM coupler 22b, thereby realizing reduction of noise figure over the entire region of C-band as shown in FIG. 27.

In this way, according to the WDM optical communication system of the first embodiment, Raman amplification is generated at the optical transmission path 7 of each repeater section by supplying pump light, and the gain wavelength characteristics of the Raman amplification are controlled by providing the tilt monitoring part 3, so that the wavelength characteristics of optical transmission powers can be automatically compensated to thereby enable realization of a WDM optical communication system having superior transmission characteristics.

Figure 28:
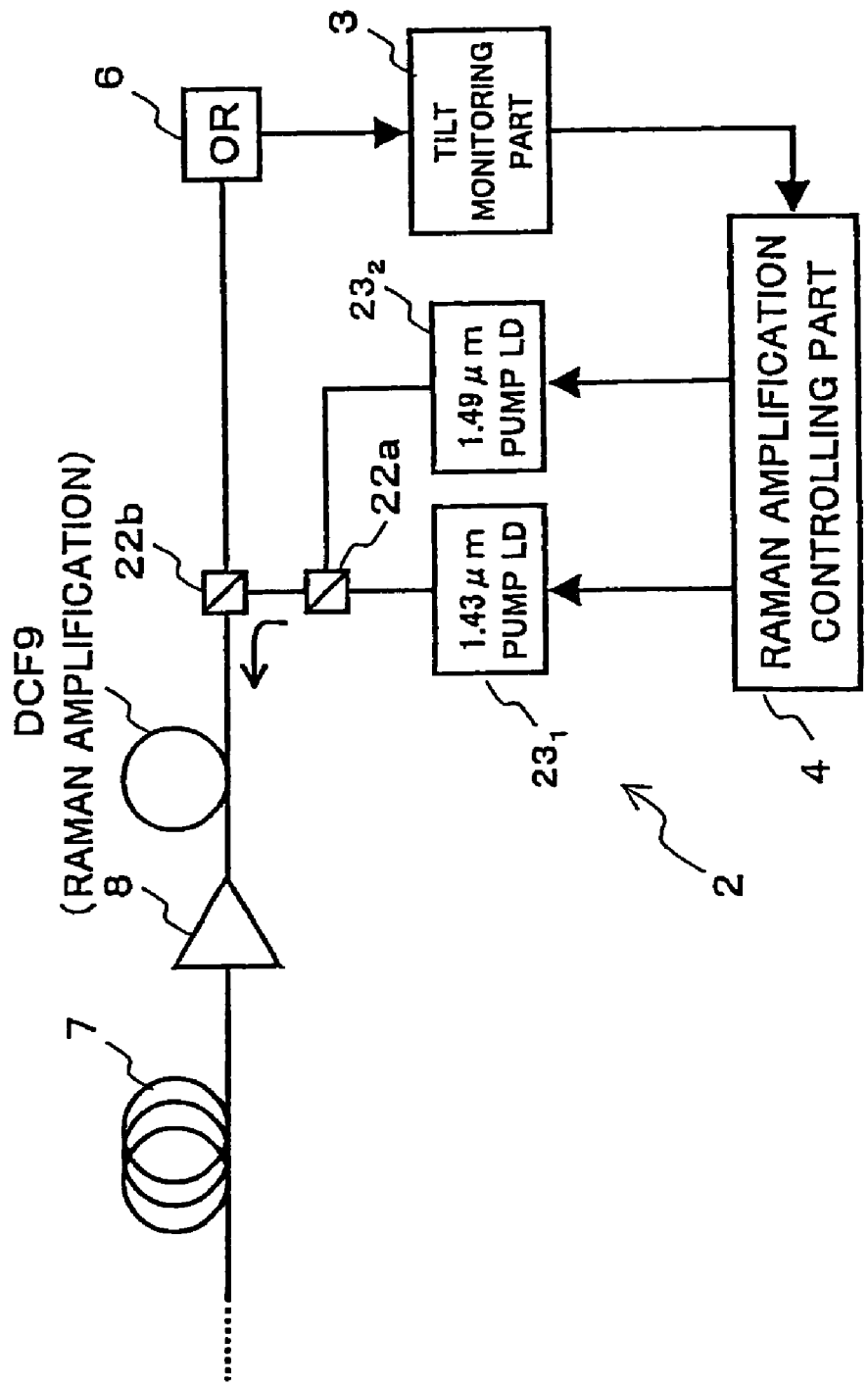
FIG. 28 is a block diagram showing an essential constitution of a WDM optical communication system according to a second embodiment of the present invention.

There will be described hereinafter a second embodiment. FIG. 28 is a block diagram showing an essential constitution of a WDM optical communication system according to the second embodiment of the present invention.

The system of FIG. 28 is applied with the aforementioned basic constitution by utilizing a dispersion compensation fiber (DCF) 9 as Raman amplification medium, for a WDM optical communication system in which wavelength dispersions caused in WDM signal light repeatingly transmitted through the optical transmission path 7 and optical amplifier 8 are compensated by the dispersion compensation fiber 9 inserted into a former stage of the optical receiver 6. Note, this type of system applied with the dispersion compensation fiber 9 as a part of transmission path is one which is being researched and developed for high-speed transmission of WDM signal light at 1.55 µm band making use of a transmission path comprising 1.3 µm zero-dispersion SMF. In the drawing, only the essential constitution of a receiving side is shown, and a constitution of transmission side is omitted.

Concretely, there is provided a WDM coupler 22b between an output end of the dispersion compensation fiber 9 and an input end of the optical receiver 6. Supplied via the WDM coupler 22b from the backward side of the dispersion compensation fiber 9 is pump light which is obtained by multiplexing by a WDM coupler 22a pump light of wavelength 1,430 nm output from a pump LD $23_1$ and pump light of wavelength 1,485 nm output from a pump LD $23_2$. In this case, there is provided a tilt monitoring part 3 for monitoring the wavelength characteristics of optical transmission powers, making use of WDM signal light received by the optical receiver 6. A monitored result of this tilt monitoring part 3 is sent to a Raman amplification controlling part 4, and then controlling signals are transmitted from the Raman amplification controlling part 4 to the respective pump LD's $23_1$ and $23_2$.

The dispersion compensation fiber 9 is an optical fiber having a wavelength dispersion (and dispersion slope) designed to be capable of compensating the wavelength dispersion (and dispersion slope) attributed to the optical transmission path 7. This dispersion compensation fiber 9 distinctively capable of generating Raman amplification by a smaller amount of pump light, since this fiber 9 has a mode field diameter such as of 4.4 µm which is smaller than such as 1.3 µm zero-dispersion SMF to be used as the optical transmission path 7.

In the second embodiment as described above, there is applied the Raman amplification generating part 2 having the constitution shown in FIG. 8, and the dispersion compensation fiber 9 corresponds to a Raman amplifying medium. Further, the optical transmission path 7, optical amplifier 8 and dispersion compensation fiber 9 collectively correspond to the tilt causing part 1.

In the second embodiment having such a constitution, the dispersion compensation fiber 9 is supplied with WDM signal light which has been transmitted from an optical sender (not shown) and then repeatingly transmitted via the optical transmission path 7 and optical amplifier 8, so that the wavelength dispersion caused by transmission is compensated, and simultaneously therewith, wavelength characteristics of optical transmission powers among respective channels are compensated by Raman amplification by supplying pump light. The WDM signal light passed through the dispersion compensation fiber 9 is received by the optical receiver 6 after passing through the WDM coupler 22b, and a part of received light is sent to the tilt monitoring part 3. The tilt monitoring part 3 monitors the wavelength characteristics of optical transmission powers of the received WDM signal light, and the monitored result is fed back to the Raman amplification controlling part 4 so that the driving conditions of pump LD's $23_1$ and $23_2$ are controlled.

According to the WDM optical communication system of the second embodiment, by supplying pump light to the dispersion compensation fiber 9 provided on the transmission path to thereby generate Raman amplification, and by providing the tilt monitoring part 3 to thereby control the gain wavelength characteristic of Raman amplification, it becomes also possible to automatically compensate the wavelength characteristics of optical transmission powers to thereby enable realization of a WDM optical communication system having an excellent transmission characteristic. Particularly, the pumping efficiency of Raman amplification is enhanced by utilizing the dispersion compensation fiber 9 as a Raman amplifying medium, so that the power of Raman pump light can be reduced.

Figure 29:
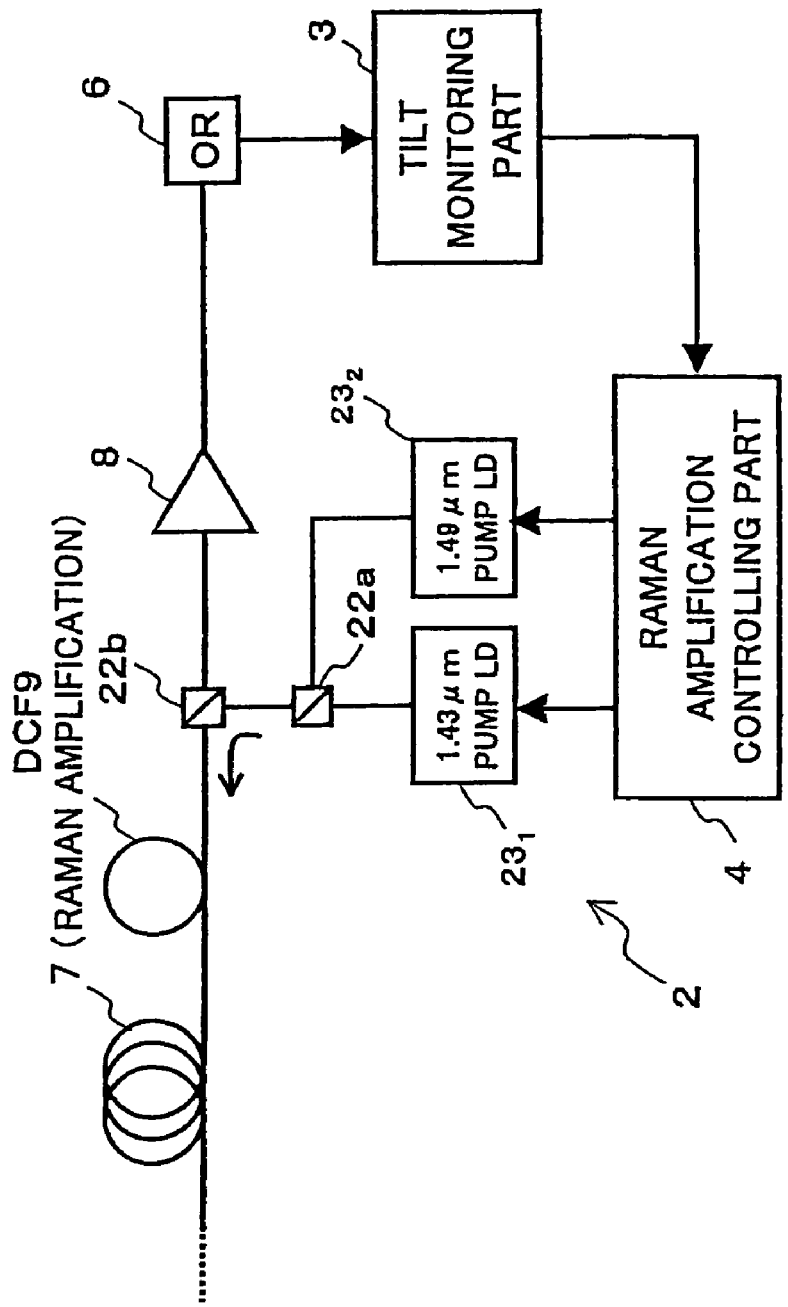
FIG. 29 is a block diagram showing another constitutional example for the second embodiment.

In the second embodiment, there has been shown a constitution including the dispersion compensation fiber 9 arranged between the optical amplifier 8 at the final repeater section and the optical receiver 6. However, the present invention is not limited thereto, and a dispersion compensation fiber arranged at any position on the transmission path can be utilized as a Raman amplifying medium. For example, as shown in FIG. 29, it is possible to supply Raman pump light to a dispersion compensation fiber 9 arranged between an output end of the optical transmission path 7 and an input end of the optical amplifier.

Figure 30:
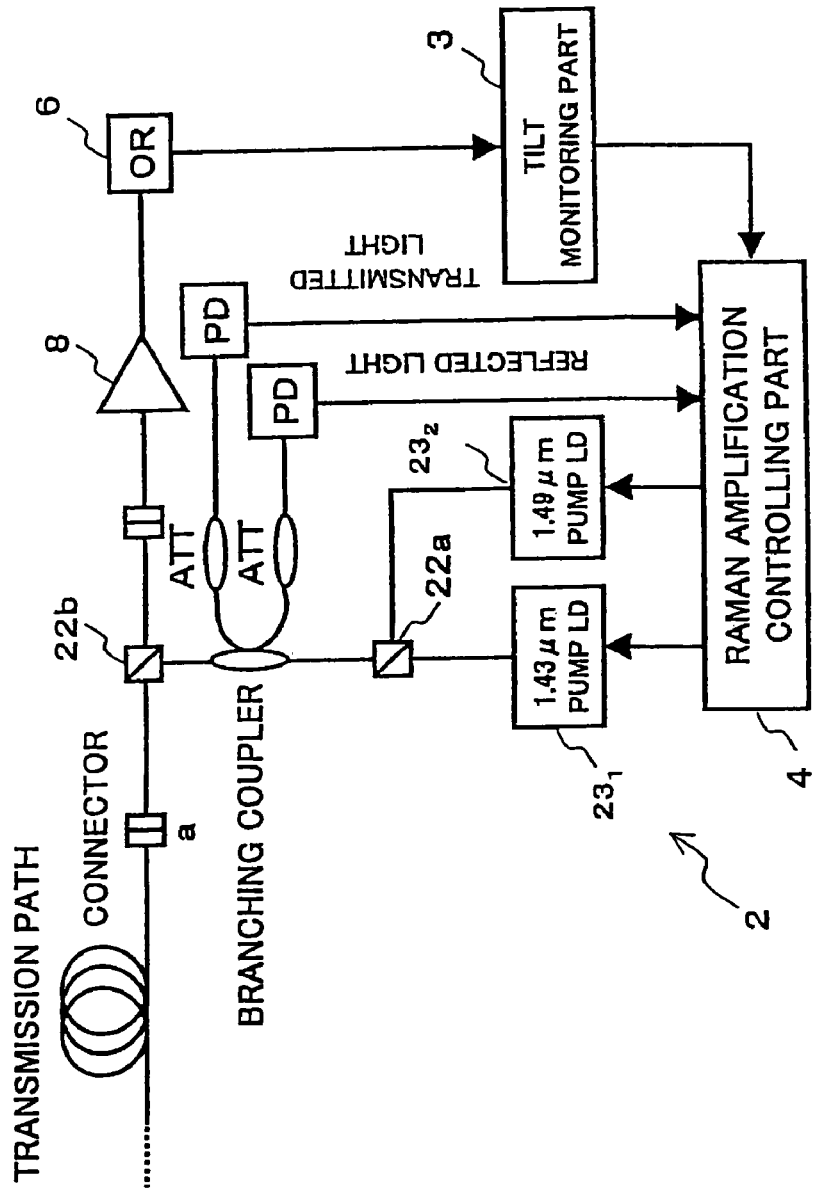
FIG. 30 is a block diagram showing a constitutional example in which connector disengagement is rendered to be detectable in case of Raman amplifying a transmission path.

Meanwhile, in case of Raman amplifying a transmission path in the aforementioned manner, the transmission path is input with pump light having a power of as large as several hundreds mW, giving importance to consider safety such as of a worker. Concretely, as shown in FIG. 30, it is required such as to provide a function for reducing a light power to a safety level when there is disconnected a connector (point "a") at a position where Raman pump light is input into a transmission path from the WDM coupler 22b. In the constitutional example of FIG. 30, there is provided a branching coupler between the WDM couplers 22a, 22b, so as to branch a light reflected back from the point "a" and lights transmitted from pump LD's, respectively, such that these lights are received by photodiodes (PD) such as via attenuators (ATT). Further, received light powers of respective photodiodes are sent to the Raman amplification controlling part 4. Upon judgment of disconnection of the connector at point "a" based on a ratio between the transmitted light and the reflected light, there is cut off a power source of the Raman pump LD's so that the light level at point "a" is reduced to a safety level.

There will be hereinafter described a third embodiment.

Figure 31:
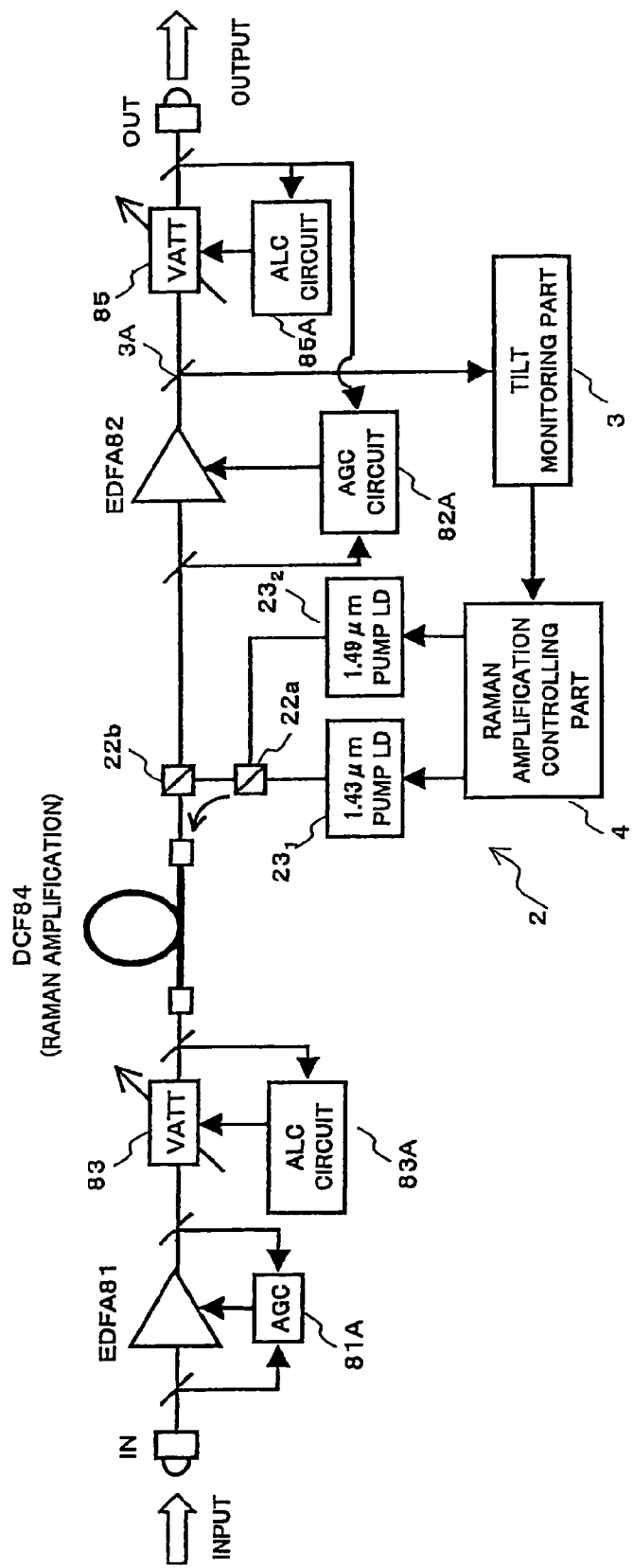
FIG. 31 is a block diagram showing a constitution of an optical amplifier according to a third embodiment of the present invention.

FIG. 31 is a block diagram showing a constitution of an optical amplifier according to a third embodiment applied with the aforementioned basic constitution.

The optical amplifier of FIG. 31 is applied with the aforementioned basic constitution by utilizing a dispersion compensation fiber (DCF) 84 as Raman amplification medium, for a known optical amplifier which includes a variable optical attenuator (VATT) 83 and the dispersion compensation fiber 84 both arranged between optical amplifying parts (EDFA) 81, 82 of two stage constitution.

Concretely, an input end of the former stage optical amplifying part 81 is connected to an input port IN of the present optical amplifier. Connected to an output end of the optical amplifying part 81 is an input end of latter stage optical amplifying part 82, via the variable optical attenuator 83 and dispersion compensation fiber 84. Connected to an output end of the optical amplifying part 82 is an output port OUT, via a variable optical attenuator 85.

There is provided a WDM coupler 22b between an output end of the dispersion compensation fiber 84 and the input end of the latter stage optical amplifying part 82. Supplied via the WDM coupler 22b from the backward side of the dispersion compensation fiber 84 is pump light which is obtained by multiplexing by a WDM coupler 22a pump light of wavelength 1,430 nm output from a pump LD $23_1$, and pump light of wavelength 1,485 nm output from a pump LD $23_2$.

There are further arranged an optical coupler 3A between the latter stage optical amplifying part 82 and the output port OUT, as well as a tilt monitoring part 3 for monitoring wavelength characteristics of optical transmission powers making use of the branched light from the optical coupler 3A. A monitored result of this tilt monitoring part 3 is sent to a Raman amplification controlling part 4, and controlling signals are transmitted from the Raman amplification controlling part 4 to the respective pump LD's $23_1$ and $23_2$.

As the former stage optical amplifying parts 81 and latter stage amplifying part 82, respectively, there are utilized optical fiber amplifiers utilizing rare earth element doped fiber such as Erbium doped fiber (EDF). At each of the optical amplifying parts 81, 82, WDM signal light is propagated within EDF which is rendered to be a pumped state by being supplied with pump light having wavelength such as 980 nm band or 1,480 nm band, so that the signal lights including respective wavelengths are collectively amplified. Here, the pump light wavelength of former stage optical amplifying part 81 is set at 980 nm band so as to realize lower noises of optical amplifier, while the pump light wavelength of latter stage optical amplifying part 82 is set at 1,480 nm band so as to realize higher power.

The optical amplifying parts 81, 82 are provided with AGC circuits 81A, 82A, respectively, for controlling gains to constant levels. The respective AGC circuits 81A, 82A will monitor light powers of optical amplifying parts 81, 82, respectively, by branching parts of input light and output light of optical amplifying parts 81, 82, and will automatically control pump light powers such that the gain at the corresponding optical amplifying part becomes a required constant value.

The variable optical attenuators 83, 85 provided at latter stages of optical amplifying parts 81, 82, respectively, are known optical attenuators capable of varying an optical attenuation amount based on a signal from the outside. The optical attenuation amounts of these variable optical attenuators 83, 85 are controlled by signals output from ALC circuits 83A, 85A, respectively. The ALC circuits 83A, 85A measure light powers by branching a part of output light of variable optical attenuators 83, 85, respectively, and generate signals for controlling optical attenuation amounts of the variable optical attenuators 83, 85, respectively, so that the output light powers are fixed to a constant level.

The dispersion compensation fiber 84 is an optical fiber having a wavelength dispersion (and dispersion slope) designed to compensate a wavelength dispersion (and dispersion slope) caused such as by an optical transmission path (not shown) to be connected to this optical amplifier. This dispersion compensation fiber 84 also has a small value of mode field diameter similarly to the dispersion compensation fiber 9 adopted in the second embodiment, and thus has a feature to facilitate generation of Raman amplification upon supplying pump light.

In this way, the third embodiment is applied with the Raman amplification generating part 2 having the constitution shown in FIG. 8, in which the dispersion compensation fiber 84 corresponds to the Raman amplifying medium 21. Further, the pump LD's $23_1$ and $23_2$ correspond to pump light generating parts, and the WDM couplers 22a, 22b correspond to pump light supplying parts. Moreover, such as optical transmission path to be connected to this optical amplifier corresponds to the tilt causing part 1.

In the optical amplifier having such a constitution, WDM signal light input into the input port IN is sent to the former stage optical amplifying part 81, and amplified thereby to a required level at a fixed gain under control of AGC circuit 81A. The WDM signal light output from the optical amplifying part 81 is sent to the variable optical attenuator 83, rendered thereby to be a required constant level under control of the ALC circuit 83A, and then sent to the dispersion compensation fiber 84. At the dispersion compensation fiber 84, wavelength dispersion such as caused in a transmission path which is connected to the optical amplifier of this embodiment is compensated, and simultaneously therewith, wavelength characteristics of optical transmission powers among respective channels are compensated by Raman amplification by supplying pump lights at wavelengths 1,430 nm and 1,485 nm.

The WDM signal light passed through the dispersion compensation fiber 84 is sent to the latter stage optical amplifying part 82 after passing through such as the WDM coupler 22b, and amplified by the optical amplifying part 82 up to a required level at a fixed gain under control of the AGC circuit 82A. The WDM signal light output from the optical amplifying part 82 is sent to the variable optical attenuator 85, while a part of this light is branched by the optical coupler 3A and sent to the tilt monitoring part 3.

The WDM signal light sent to the variable optical attenuator 85 is rendered to be a required constant level under control of ALC circuit 85A, and then output to the outside via the output port OUT. Meanwhile, at the tilt monitoring part 3, there are monitored wavelength characteristics of optical transmission powers for WDM signal light output from the latter stage optical amplifying part 82, and the monitored result is fed back to the Raman amplification controlling part 4 so as to control the driving conditions of the pump LD's $23_1$ and $23_2$.

Figure 32:
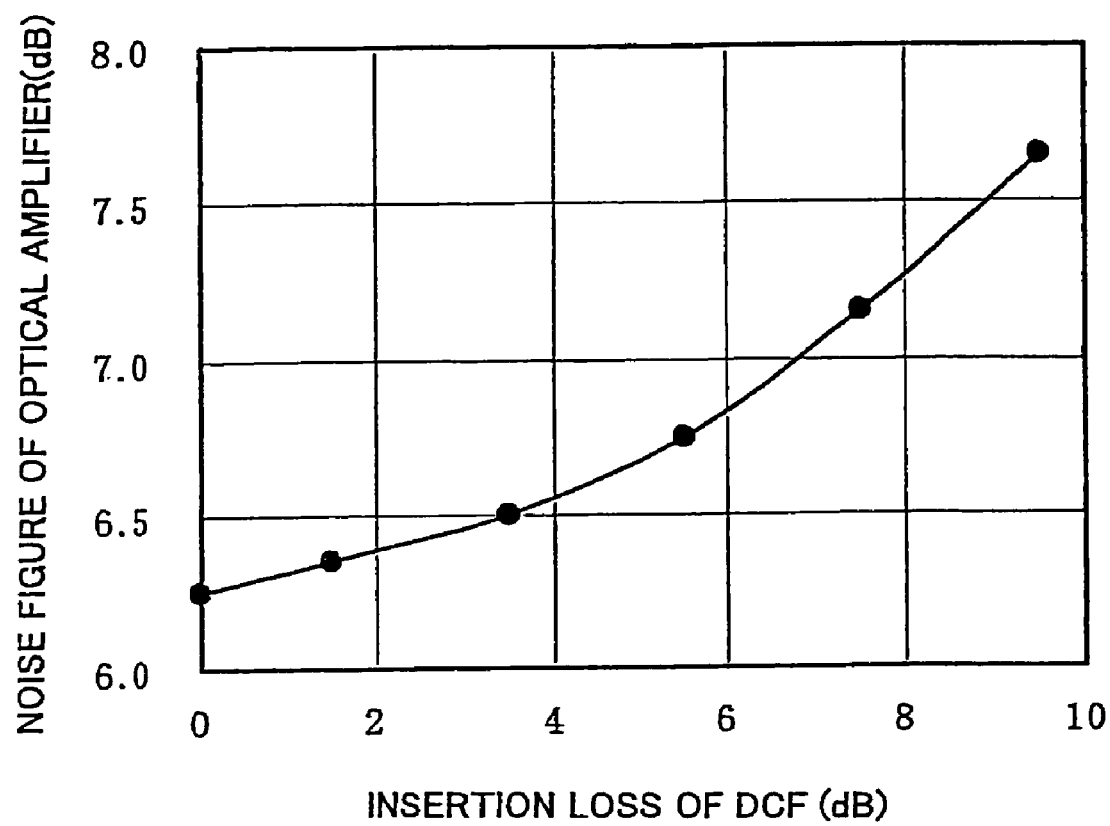
FIG. 32 is a graph showing an example of noise figure transition of optical amplifier relative to an insertion loss of dispersion compensation fiber, in the third embodiment.

In this way, according to the optical amplifier of the third embodiment, there is supplied pump light to the built-in dispersion compensation fiber 84 to thereby generate Raman amplification, and there is provided the tilt monitoring part 3 for controlling the gain wavelength characteristics of Raman amplification, thereby enabling automatic compensation of wavelength characteristics of optical transmission powers. Further, insertion loss of the dispersion compensation fiber 84 is compensated by the Raman amplification, thereby realizing reduction of noise figure of the optical amplifier of this embodiment. FIG. 32 shows an example of transition of noise figure of an optical amplifier, relative to an insertion loss of a dispersion compensation fiber. By constituting a WDM optical communication system making use of such an optical amplifier, it becomes possible to realize a WDM optical communication system having excellent transmission characteristics.

In the third embodiment, the variable optical attenuators 83, 85 for fixing a level of amplified WDM signal light are provided at the output sides of optical amplifying parts 81, 82, respectively. However, the present invention is not limited thereto.

Figure 33:
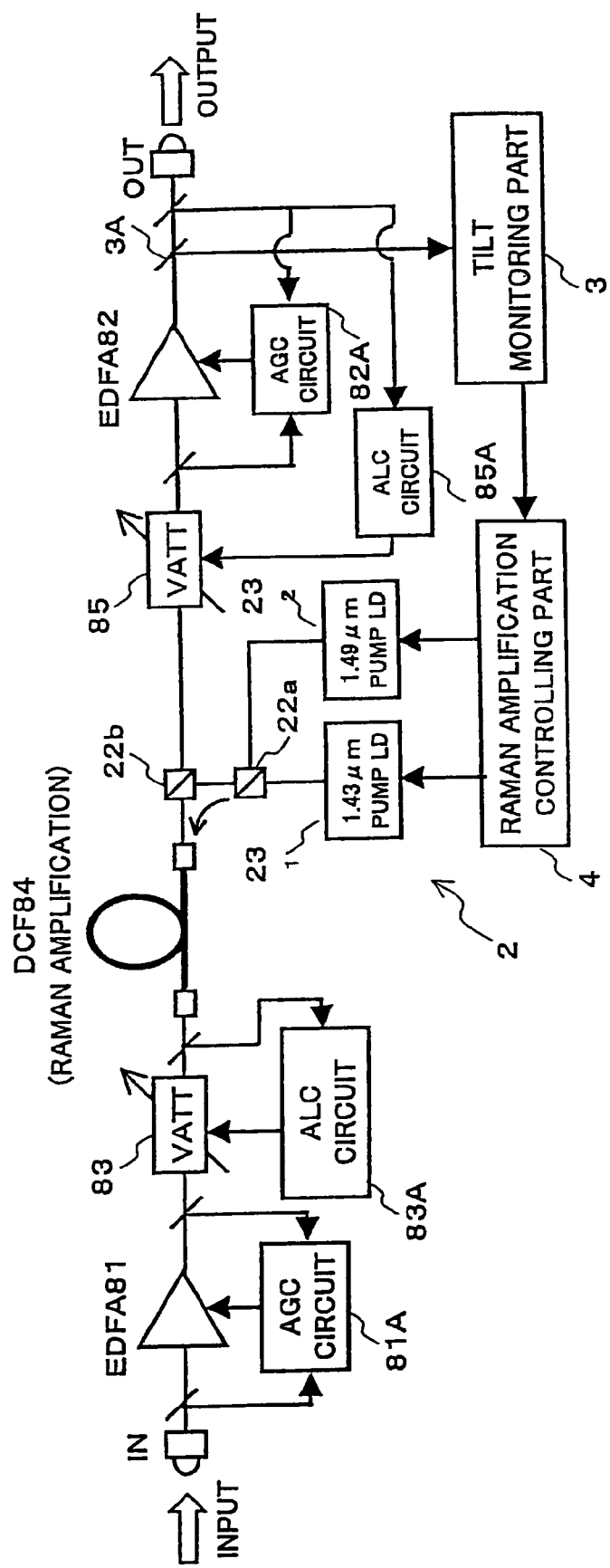
FIG. 33 is a block diagram showing another constitutional example for the third embodiment.

For example, as shown in FIG. 33, the latter stage variable optical attenuator 85 may be arranged between the WDM coupler 22b and the input end of optical amplifying part 82. In case of this constitution, improvement of pumping efficiency can be realized, though a noise characteristic is degraded as compared to a situation where the variable optical attenuator 85 is provided at the output side of optical amplifying part 82. Further, in each of constitutions of FIGS. 31 and 33, the variable optical attenuator 83 and ALC circuit 83A at the former stage side can be omitted.

Figure 34:
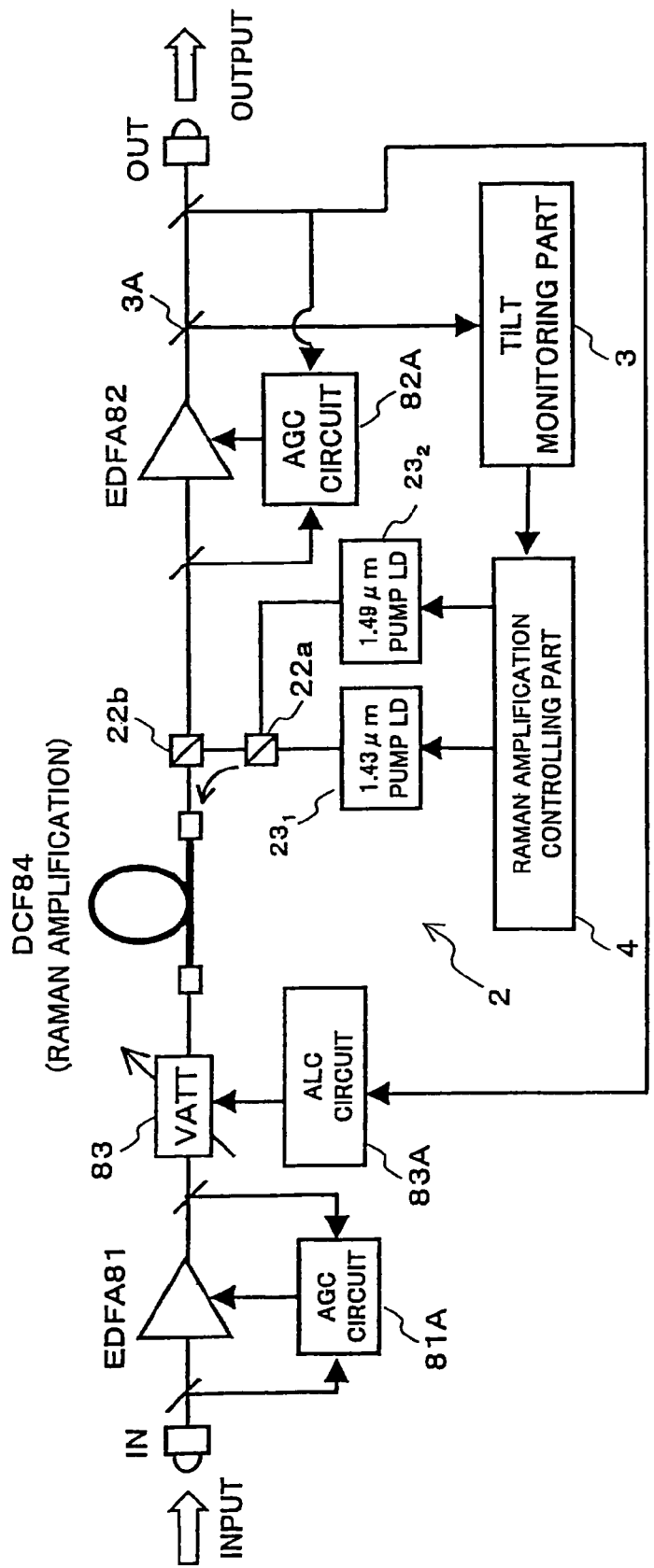
FIG. 34 is a block diagram showing yet another constitutional example for the third embodiment.

Moreover, such as shown in FIG. 34, it is also possible to provide the variable optical attenuator 83 only between the output end of former stage optical amplifying part 81 and the input end of the dispersion compensation fiber 84, such that WDM signal light power output from the latter stage optical amplifying part 82 is monitored by the ALC circuit 83A so as to control an optical attenuation amount of the variable optical attenuator 83 to thereby fix an output light level of this optical amplifier.

In the aforementioned first through third embodiments, the constitutional example of FIG. 8 is applied as the Raman amplification generating part 2. Without limited thereto, it is possible to apply other constitutional examples shown in FIGS. 4 and 9 through 17.

There will be described hereinafter a fourth embodiment.

Figure 35:
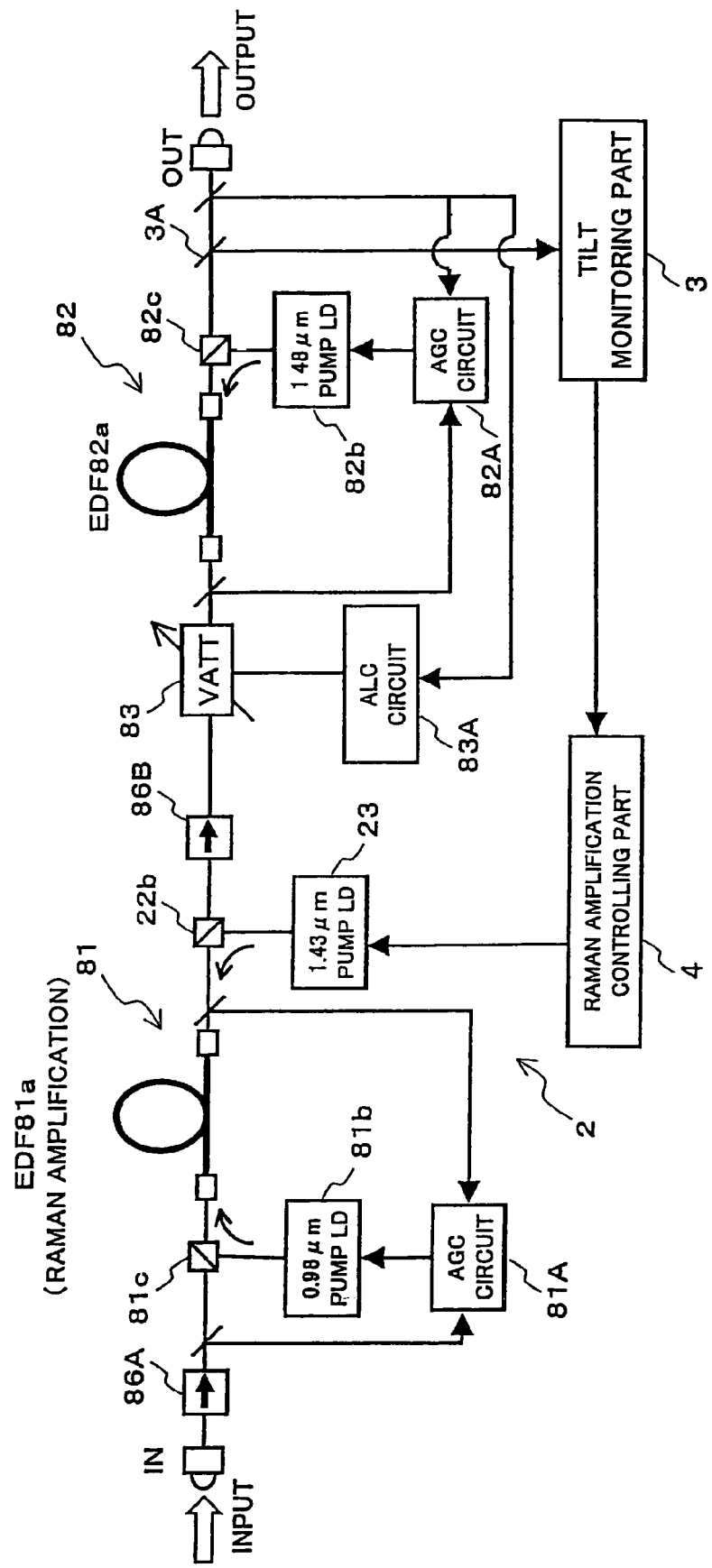
FIG. 35 is a block diagram showing a constitution of an optical amplifier according to a fourth embodiment of the present invention.

FIG. 35 is a block diagram showing a constitution of an optical amplifier according to the fourth embodiment applied with the aforementioned basic constitution.

The optical amplifier shown in FIG. 35 is applied with the aforementioned basic constitution, by realizing a Raman amplifying medium by an Erbium doped optical fiber (EDF) constituting the former stage optical amplifying part 81 in the third embodiment.

Concretely, an input end of the former stage optical amplifying part 81 is connected to an input port IN, via optical isolator 86A. This optical amplifying part 81 includes an EDF 81a, a pump LD 81b and a WDM coupler 81c. Pump light at 980 nm band generated at the pump LD 81b is supplied from a forward side of EDF 81a, via the WDM coupler 81c arranged between the optical isolator 86A and an input end of EDF 81a. Further, the pump LD 81b is automatically gain controlled by an AGC circuit 81A.

Connected to an output end of the former stage optical amplifying part 81 is an input end of a latter stage optical amplifying part 82, via an optical isolator 86B and variable optical attenuator (VATT) 83. This optical amplifying part 82 includes an EDF 82a, a pump LD 82b and a WDM coupler 82c. Pump light at 1,480 nm band generated at the pump LD 82b is supplied from a backward side of the EDF 82a, via the WDM coupler 82c arranged at an output end side of the EDF 82a. Further, the pump LD 82b is automatically gain controlled by an AGC circuit 82A.

Provided between an output end of former stage optical amplifying part 81 and the optical isolator 86B is a WDM coupler 22b, so that Raman pump light at wavelength 1,430 nm output from a pump LD 23 is supplied from the backward side of the EDF 81a, via the WDM coupler 22b.

There are arranged an optical coupler 3A between the latter stage optical amplifying part 82 and an output port OUT, as well as a tilt monitoring part 3 for monitoring wavelength characteristics of optical transmission powers making use of branched light of the optical coupler 3A. A monitored result of this tilt monitoring part 3 is sent to a Raman amplification controlling part 4 which transmits a controlling signal to the pump LD 23.

In this way, the fourth embodiment is applied with the Raman amplification generating part 2 having the constitution shown in FIG. 4, in which the EDF 81a corresponds to the Raman amplifying medium 21. Moreover, such as optical transmission path to be connected to this optical amplifier corresponds to the tilt causing part 1.

In the optical amplifier having such a constitution, WDM signal light input into the input port IN is sent to the former stage optical amplifying part 81 via the optical isolator 86A, and then propagated through the EDF 81a via the WDM coupler 81c. This EDF 81a is supplied from the forward side with pump light at 980 nm band generated at the pump LD 81b, and supplied from the backward side with Raman pump light of 1,430 nm generated at the pump LD 23. Thus, there are generated an amplification by stimulated emission effect of pumped Erbium and Raman amplification. By virtue of the Raman amplification at the EDF 81a, there can be compensated wavelength characteristics of optical transmission powers among respective channels.

The WDM signal light amplified to a required level by the optical amplifying part 81 is sent to the latter stage optical amplifying part 82 via the WDM coupler 22b, optical isolator 86B and variable optical attenuator 83, and then amplified to a required level by being propagated through the EDF 82a supplied with pump light of 1,480 nm band. The WDM signal light output from the optical amplifying part 82 is output to the outside from the output port OUT, and parts of the signal light are branched and sent to the ALC circuit 83A and tilt monitoring part 3, respectively.

At the ALC circuit 83A, there is generated a signal for controlling an optical attenuation amount of the variable optical attenuator 83 such that the power of WDM signal light output from the output port OUT becomes a required constant level, and this signal is transmitted to the variable optical attenuator 83. Further, at the tilt monitoring part 3, there are monitored wavelength characteristics of optical transmission powers for the WDM signal light output from the latter stage optical amplifying part 82, and the monitored result is fed back to the Raman amplification controlling part 4 to thereby control the driving condition of the pump LD 23.

In this way, according to the optical amplifier of the fourth embodiment, it is possible to automatically compensate the wavelength characteristics of optical transmission powers, by supplying Raman pump light to the EDF 81a to thereby generate Raman amplification, and by providing the tilt monitoring part 3 for controlling the gain wavelength characteristics of the Raman amplification. Only, there is required a larger power of Raman pump light so as to generate a required Raman amplification, since the EDF has a larger mode field diameter as compared to the third embodiment.

In the above fourth embodiment, there has been described a constitution including no dispersion compensation fibers in the optical amplifier. However, it is possible to provide a dispersion compensation fiber such as between the variable optical attenuator 83 and the input end of latter stage optical amplifying part 82, when it is required to compensate such as wavelength dispersion caused in such as an optical transmission path to be connected. Further, in the above constitution, the Raman pump light has been supplied to the former stage EDF 81a. However, it is possible to supply the Raman pump light to the latter stage EDF 82a. Moreover, it is possible to supply the Raman pump light from the forward side of the EDF 81a, though the Raman pump light has been supplied from the backward side.

There will be described hereinafter a fifth embodiment.

Figure 36:
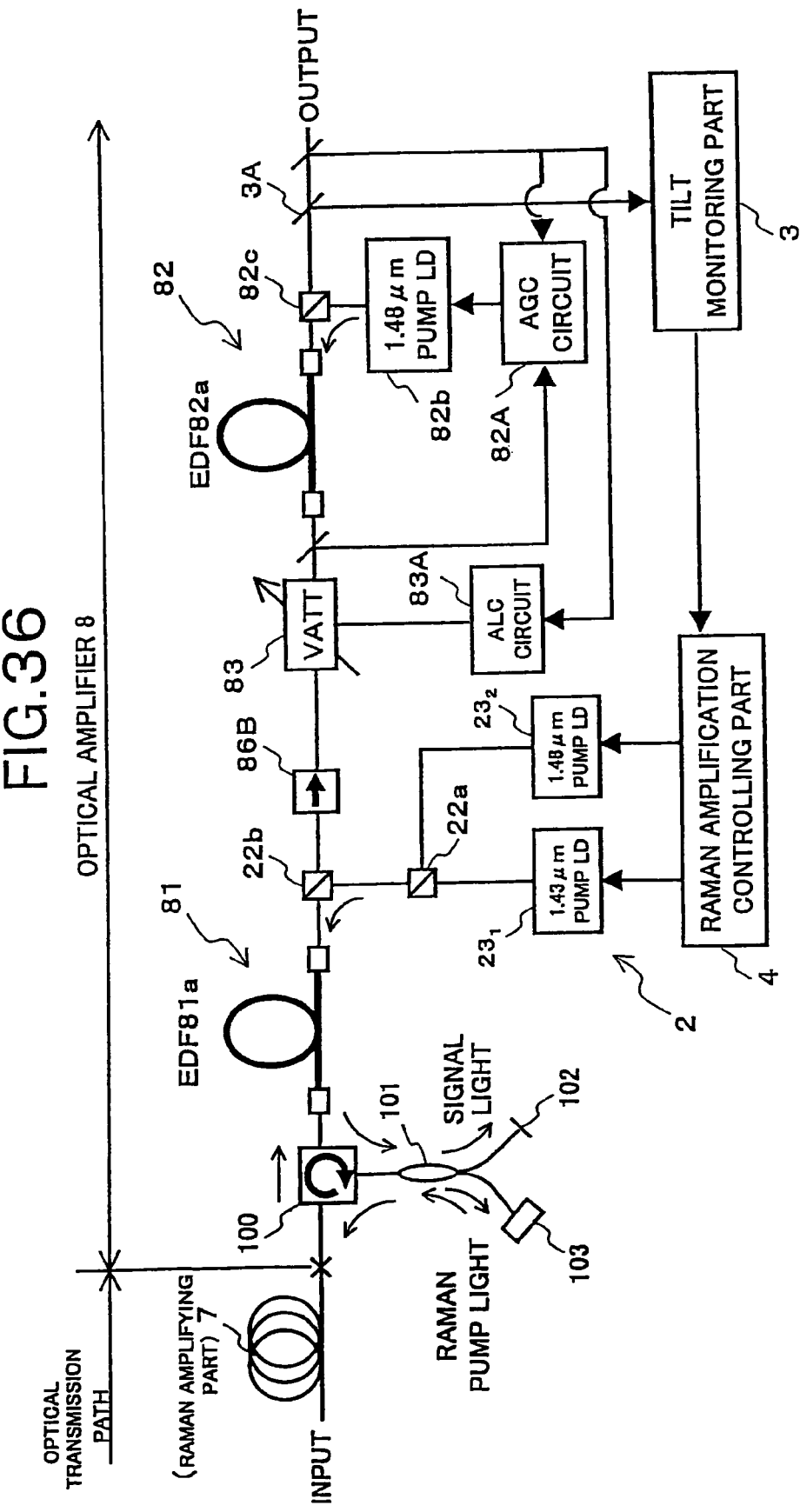
FIG. 36 is a block diagram showing an essential constitution of a WDM optical communication system according to a fifth embodiment of the present invention.

FIG. 36 is a block diagram showing an essential constitution of a WDM optical communication system according to a fifth embodiment applied with the aforementioned basic constitution.

The system of FIG. 36 has, in the fourth embodiment, such a constitution that: pump light for stimulated emission and pump light for Raman amplification are multiplexed and supplied to the EDF 81a from the backward side, and only the Raman pump light passed through the EDF 81a is sent to the optical transmission path 7 connected to the input side of the optical amplifier 8.

Concretely, there are multiplexed pump light of wavelength 1.43 μm output from the pump LD $23_1$ and pump light of wavelength 1.48 μm output from the pump LD $23_2$ by means of the WDM coupler 22a, and the multiplexed light is then supplied to the EDF 81a from its backward side via the WDM coupler 22b provided between the former stage EDF 81a and the optical isolator 86B. The driving conditions of the pump LD's $23_1$ and $23_2$ are controlled by the Raman amplification controlling part 4 according to a monitored result of the tilt monitoring part 3, similarly to the aforementioned embodiments.

At a preceding stage of the EDF 81a, there is provided an optical circulator 100 having three ports $P_1$, $P_2$ and $P_3$. This optical circulator 100 is a common optical element for transmitting light only in directions from port $P_1$ toward port $P_2$, from port $P_2$ toward port $P_3$, and from port $P_3$ toward port $P_1$. The port $P_1$ is connected with the optical transmission path 7 of the input side, such as via splice. Further, the port $P_2$ is connected with a signal light input end of the EDF 81a, and the port $P_3$ is connected with a WDM coupler 101. This WDM coupler 101 demultiplexes output light from the port $P_3$ of optical circulator 100 into signal light component and pump light component. The head of output port of the signal light component of the WDM coupler 101 is terminated by a terminator 102, while the head of output port of the pump light component is provided with a medium 103 having a higher reflectance such as mirror. Thus, the optical circulator 100, WDM coupler 101, terminator 102 and medium 103 cooperatively function as pump light transmitting device, here. Constitutions (such as latter stage optical amplifying part 82) of the optical amplifier 8 other than the above are identical with those in the fourth embodiment.

In the aforementioned system, WDM signal light propagated through the optical transmission path 7 is input into the port $P_1$ of optical circulator 100, and then sent from the port $P_2$ to the EDF 81a. To this EDF 81a, there are supplied pump light of wavelength 1.43 μm from the pump LD $23_1$ and pump light of wavelength 1.48 μm from the pump LD $23_2$ via the WDM couplers 22a, 22b. Thus, the WDM signal light is amplified by a stimulated emission effect of pumped Erbium, and simultaneously therewith, Raman amplification is also generated by pump lights of respective wavelengths. The WDM signal light amplified by the EDF 81a passes through the WDM coupler 22b and is then sent to the optical isolator 86B, while a part of the WDM signal light is reflected such as by connecting points of optical elements and is propagated in a reverse direction within the EDF 81a. This reflected backward light of the WDM signal light and the pump lights of respective wavelengths passed through the EDF 81a are input into the port $P_2$ of optical circulator 100 and then sent from the port $P_3$ to the WDM coupler 101. At the WDM coupler 101, the output light from the port $P_3$ is demultiplexed into a signal light component and a pump light component, and the thus demultiplexed signal light component is terminated thus suppressed. On the other hand, the pump light component is reflected by the medium 103 and sent back to the port $P_3$ of optical circulator 100 via the WDM coupler 101. The pump light component sent back to the port $P_3$ is sent to the optical transmission path 7, and generates Raman amplification within optical transmission path 7.

In this way, according to this embodiment, pump light for EDF 81a and pump light for Raman amplification are multiplexed, and supplied to the EDF 81a from its backward side via a single WDM coupler 22b inserted in a main signal route. Further, there is arranged the optical circulator 100 at the passing end of EDF 81a, so as to transmit only the pump light component to the optical transmission path 7. Thus, Raman amplification is generated within both of EDF 81a and optical transmission path 7, to thereby perform compensation of wavelength characteristics of optical transmission powers. According to the aforementioned constitution, it becomes possible to reduce the number of optical elements to be inserted in the main signal route. Further, instead of providing an optical isolator having a large insertion loss at an input stage of the optical amplifier 8, there is utilized the optical circulator 100 having a relatively low insertion loss (for example, there has been practiced an optical circulator having an insertion loss in the order of 0.8 dB), so that there can be realized a function identical to an optical isolator. Thus, there can be realized further improvement of optical SNR.

Figure 37:
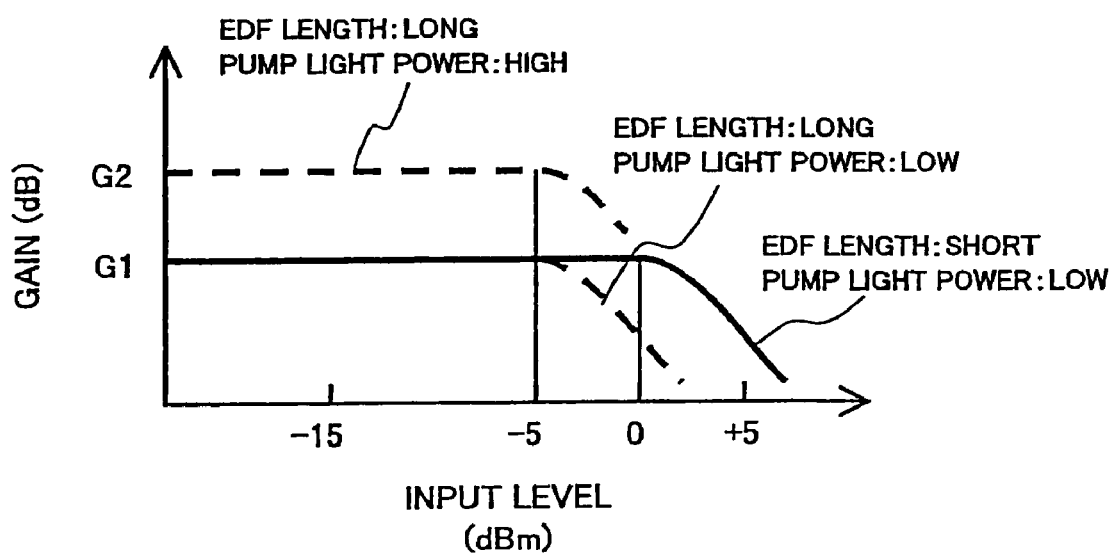
FIG. 37 is a graph for explaining a relationship between a length of EDF and a gain characteristic relative to input level, for the fifth embodiment.

In addition, since the loss at the input stage of optical amplifier 8 is reduced, the length of preceding EDF 81a can be shortened. Owing to this shortening of EDF 81a, it is not absolutely required to apply automatic gain control (AGC). This is because the gain characteristic relative to an input level to the EDF 81a varies depending on a length of EDF 81a, as shown in FIG. 37. Namely, as shown by a dotted line in FIG. 37, there is provided a relatively narrow range where gain becomes constant relative to input level, when the length of EDF 81a is relatively long. Conversely, as shown by a real line in FIG. 37, there is provided a relatively wide range where gain becomes constant relative to input level, when the length of EDF 81a is relatively short. Thus, as a result of shortening of EDF 81a, it becomes unnecessary to conduct AGC.

Furthermore, both of the pump light wavelength for Raman amplification and the pump light wavelength for EDF are equally set at 1.48 μm, so that both pump LD's are used in common. In this way, it becomes possible to simplify the constitution of optical amplifier 8 and to reduce its cost.

In the fifth embodiment, there has been shown such a constitution utilizing the optical circulator 100 to thereby transmit only the Raman pump light to the optical transmission path. However, as shown in FIG. 38, it is also possible to adopt such a constitution that an optical isolator commonly inserted in an input stage of the optical amplifier is utilized as it is, to thereby transmit only pump light to an optical transmission path.

Figure 38:
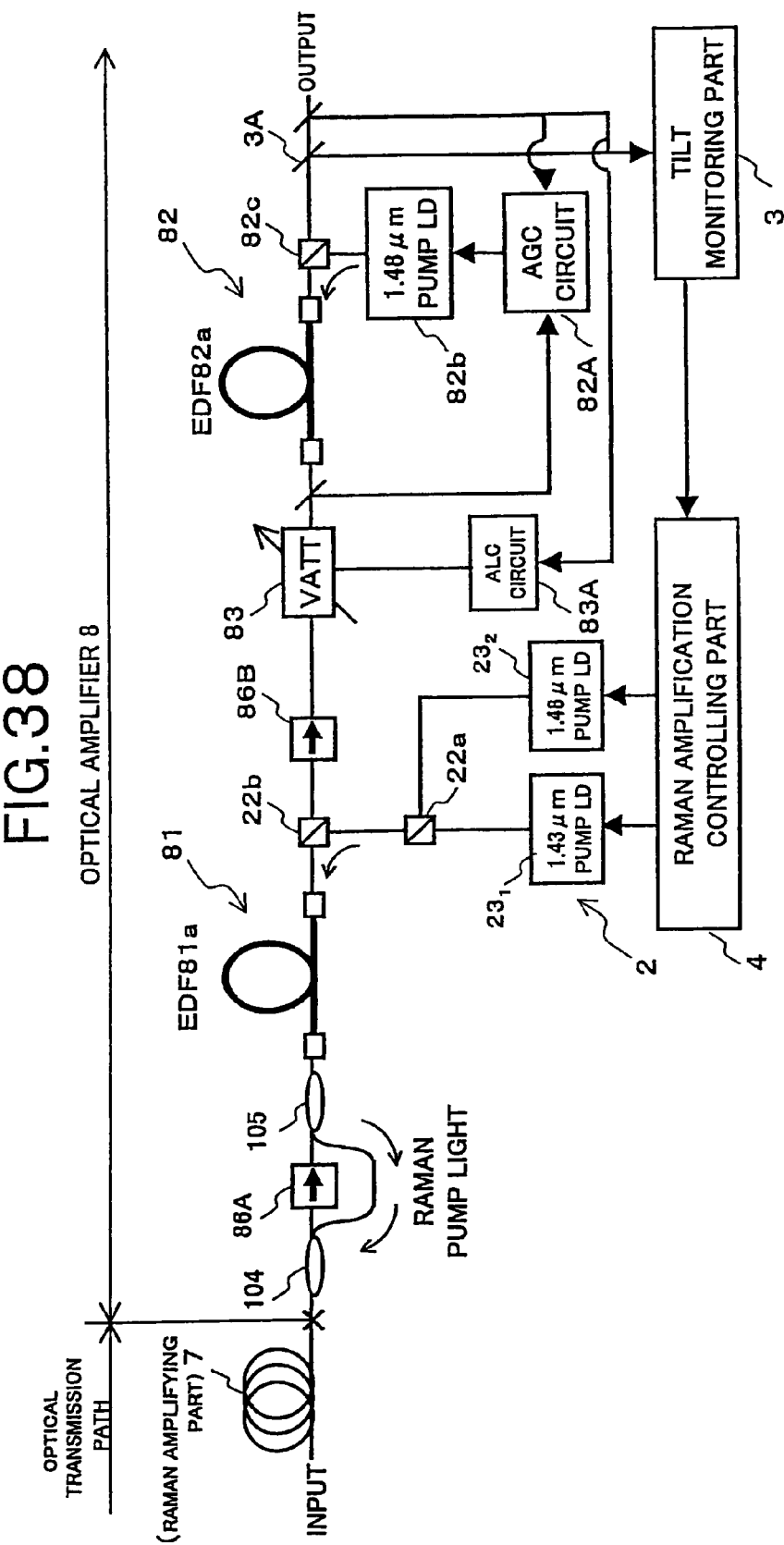
FIG. 38 is a block diagram showing a constitutional example where an optical isolator is used, for the fifth embodiment.

In the constitutional example of FIG. 38, the optical isolator 86A is provided at a position where the optical circulator 100 used in the fifth embodiment is inserted, and WDM couplers 104, 105 are inserted in front and in rear of the optical isolator 86A, respectively, so that Raman pump light is sent to the optical transmission path 7 while bypassing the optical isolator 86A. Each of WDM couplers 104, 105 is adapted to demultiplex the light input into a port at one side of the WDM coupler into a signal light component and a pump light component, and to output them to two ports at the other side of the WDM coupler, respectively. Here, the output ports for signal light component of both WDM couplers are connected to the optical isolator 86A, and output ports for the pump light component are connected to each other. In this way, WDM signal light input into the optical amplifier 8 from the optical transmission path 7 is sent to the EDF 81a, after serially passing through the WDM coupler 104, optical isolator 86A and WDM coupler 105. Further, Raman pump light and the reflected backward light of WDM signal light both passed through the EDF 81a are demultiplexed by the WDM coupler 105 into a signal light component and a pump light component, and the signal light component is sent to the optical isolator 86A and attenuated thereby. Contrary, the pump light component demultiplexed by the WDM coupler 105 is bypassed around the optical isolator 86A, and then sent to the optical transmission path 7 via the WDM coupler 104. Note, in case of adopting the above constitution, the number of optical elements to be inserted in the main signal route is increased. Thus, concerning optical SNR, the constitution utilizing an optical circulator is advantageous.

In the above described first through fifth embodiments, there have been illustrated situations where 1.43 μm or 1.49 μm is used as Raman pump wavelength for WDM signal light of the C-band. However, wavelength of Raman pump light and the number of wavelengths to be used in the present invention are not limited to the above. For example, as illustrated in the aforementioned FIG. 24, it is possible to obtain the best compensation characteristics by mutually combining pump lights of 1.43 μm and 1.47 μm at a required ratio to thereby generate Raman amplification, as the case may be.

Further, the gain wavelength characteristics of Raman amplification have been explained based on the assumption that a gain characteristic per unit wavelength at a wavelength region excluding a gain peak basically has a relatively excellent linearity. However, there has been confirmed an existence of "waviness" independent of Raman pump light power as shown in FIG. 39(a), when carefully considering the linearity of gain characteristic. This deviation in linearity can be considered as being in the order of ±0.5 dB as shown in FIG. 39(b).

In case of necessity for cancelling such waviness of gain wavelength characteristics of Raman amplification, it is effective to use such as an optical filter having fixed wavelength loss characteristics. As a specific example, in case of controlling tilt by Raman amplifying a dispersion compensation fiber within an optical amplifier such as described in the third embodiment, if an optical filter to be applied for negating the gain wavelength characteristics of EDF for the latter stage optical amplifying part (such an optical filter has not been used in the third embodiment, but frequently used generally) is designed with taking into account an amount of waviness of the gain wavelength characteristics of Raman amplification, it becomes possible to exile both of the gain wavelength characteristics of EDF and the waviness of gain wavelength characteristics of Raman amplification by means of a single optical filter. It is also a useful way to increase the number of pump wavelengths. For example, in FIG. 39, the gain at 1,550 nm is lower than those at other wavelengths. As such, the "waviness" can be reduced by Raman amplification by adding a pump wavelength (such as 1,450 nm) having its gain peak at this 1,550 nm.

Further, in the above described first through fifth embodiments, there have been illustrated situations where tilt compensation is conducted for signal light at the C-band. However, the present invention is not limited thereto, and such adaptation is also possible to conduct tilt compensation for a wider signal light band such as 1,535 to 1,605 nm (C-band+L-band). In this case, wavelength characteristics of Raman amplification may be controlled by combining a plurality of pump wavelengths with duly adjusting propagations of Raman pump light powers.

Figure 40:
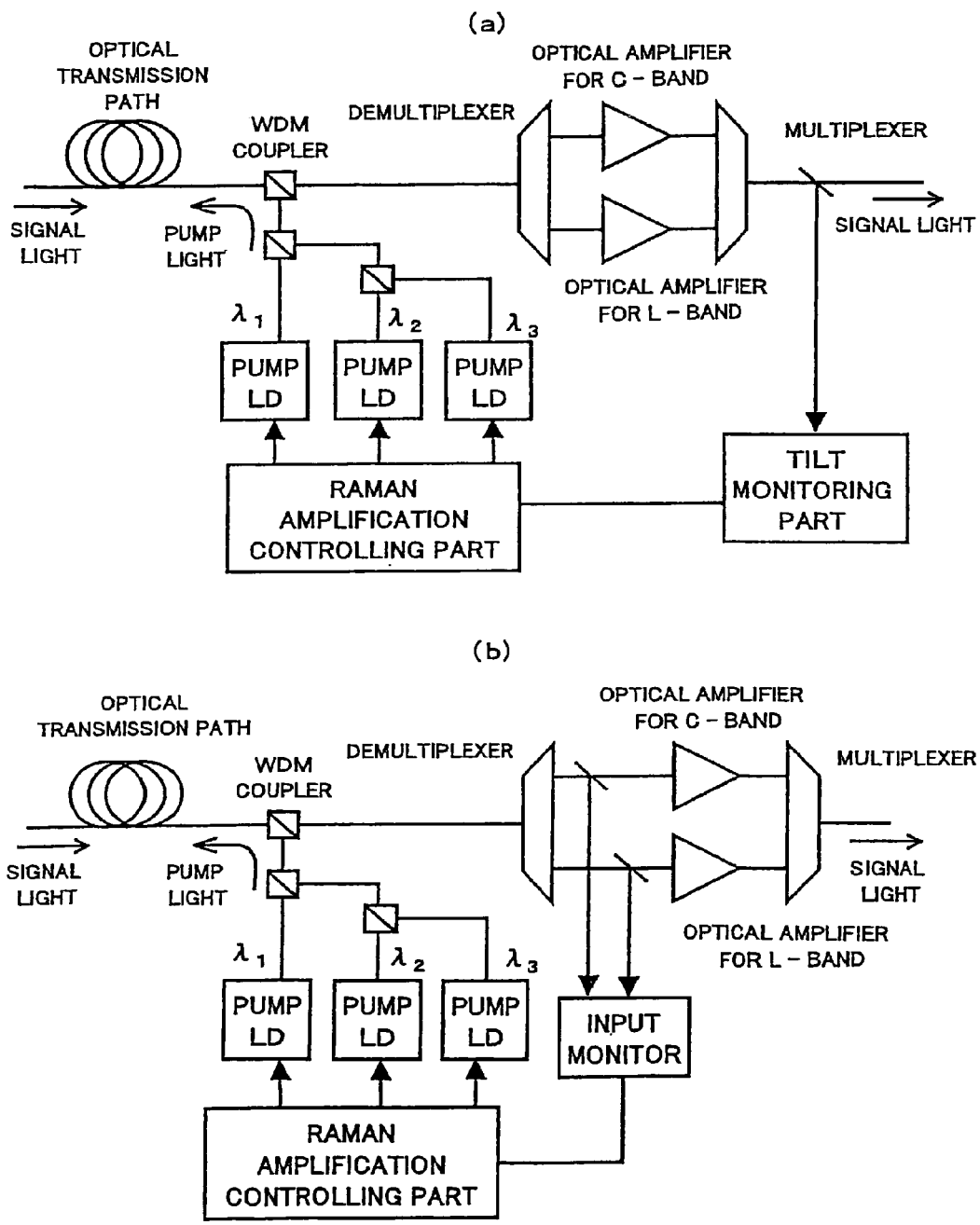
FIG. 40 is a block diagram showing an example of system constitution in case of conducting tilt compensations for C and L-bands, in which (a) is a constitution including a tilt monitor arranged at an output side of an optical amplifier and (b) is a constitution including an input monitor arranged at an input side of the optical amplifier.

Shown in FIG. 40 is an example of system constitution in case of conducting Raman pumping by combining three wavelengths for C-band+L-band.

FIG. 40(a) shows a constitutional example where an optical transmission path is used as a Raman amplifying medium similarly to the aforementioned first embodiment. Here, it is assumed that: WDM signal light from an optical transmission path is demultiplexed into C-band and L-band by a demultiplexer; signal lights at respective bands are amplified making use of C-band optical amplifier and L-band optical amplifier, and then multiplexed by a multiplexer; and Raman pump lights of three wavelengths $\lambda_1$, $\lambda_2$, $\lambda_3$ are multiplexed by a WDM coupler and supplied to the optical transmission path to thereby generate Raman amplification.

Further, in FIG. 40(b), there is provided an input monitoring part to be input with parts of input lights into the respective optical amplifying parts (C-band and L-band), and the Raman amplification controlling part receives the monitored results of the input monitoring part to thereby adjust proportions of Raman pump light powers such that input levels at amplifying parts become predetermined values, respectively, so as to control wavelength characteristics of Raman amplification. Concretely, input light levels of respective amplifying parts are controlled to be equalized.

FIG. 41 shows a setting example of Raman gains in case of compensating a tilt in which Raman gain is degraded by 3 dB at a shorter wavelength side. FIG. 41(a) shows a situation where pumping is conducted by combining two wavelengths of 1.43 μm and 1.47 μm, while FIG. 41(b) shows a situation where pumping is conducted by combining three wavelengths, i.e., by adding 1.465 μm to 1.43 μm and 1.47 μm. FIG. 42 shows a setting example of Raman gains for compensating a tilt in which Raman gain is degraded by 5 dB or more at a shorter wavelength side. FIG. 42(a) shows a situation where pumping is conducted by combining two wavelengths of 1.43 μm and 1.45 μm, while FIG. 42(b) shows a situation where pumping is conducted by combining three wavelengths, i.e., by adding 1.49 μm to 1.43 μm and 1.45 μm. By adding 1.49 μm to thereby establish pump light wavelengths of three waves, there can be increased a gain of an entire signal light band while maintaining an inclination corresponding to a caused tilt, so that an optical S/N ratio can be improved. In this example, the pump light of 1.49 μm contributes to improvement of gain, and the pump lights of 1.43 μm and 1.45 μm contribute to compensation of degraded tilt at a shorter wavelength side. Note, since tilt compensation and gain increase are simultaneously conducted, the situation (b) requires a pump light power larger than that of situation (a).

As shown in respective figures, as the number of combined pump wavelengths is increased, the number of configurations of compensatable wavelength characteristics is increased, so that compensation precision of tilt can be further improved. Further, when the driving conditions of Raman pump lights are controlled corresponding to monitored results by a tilt monitoring part in the above case, it is also possible to effectively compensate rightwardly-upward tilt of wavelength characteristics of optical transmission powers, by fixing pump light at a longer wavelength side and by changing pump light of one wave or two waves at a shorter wavelength side. At this time, to largely compensate a signal at a shorter wavelength side, it is enough to increase a light power of pump light at a shorter wavelength side.

In the above described first through fifth embodiments, there have been adjusted the proportions of Raman pump light powers or respective wavelength lights. However, it is additionally possible to control the wavelength characteristics of Raman gains, such as by adjusting a temperature for controlling a Raman pump LD. Concretely, when a temperature of pump LD is controlled such as to be 10□ higher, pump light wavelength is shifted to a longer wavelength side by about 5 nm. Thus, the controlled temperature of Raman pump LD can be adopted as one of parameters for changing wavelength characteristics of Raman gains.

There will be now described a specific constitution in case that an output light power from a Raman amplifying medium is monitored and the monitored result is reflected to Raman amplification control.

Figure 43:
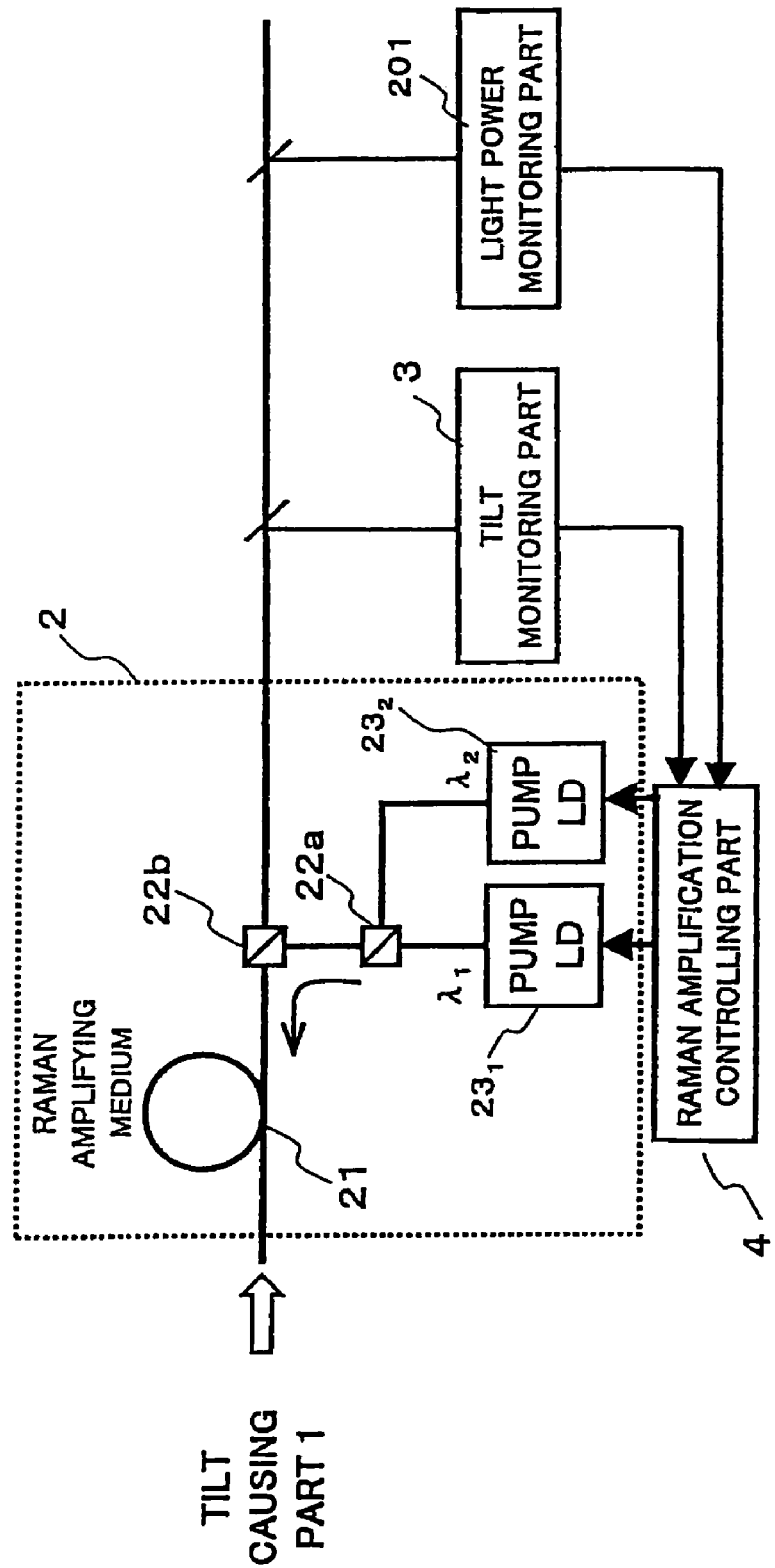
FIG. 43 is a block diagram showing a basic constitution of an apparatus, to which a controlling method added with a monitoring stage for an output light power according to the present invention is applied.

FIG. 43 is a block diagram showing a basic constitution of an apparatus, to which a controlling method added with a monitoring step for an output light power according to the present invention is applied.

The constitution of FIG. 43 is realized by providing a light power monitoring part 201 for monitoring an output light power of a Raman amplifying medium, in the basic constitution such as shown in the aforementioned FIG. 8. Monitored results of the light power monitoring part 201 and the tilt monitoring part 3 are sent to the Raman amplification controlling part 4, and controlling signals are transmitted to respective pump LD's from this Raman amplification controlling part 4. Namely, by adjusting proportions of Raman pump lights of respective wavelength bands (equal to or more than two wavelengths; situation of two wavelengths are shown in the figure), it is realized to maintain an output light power of the Raman amplifying medium 21 at a predetermined value and to flatten the wavelength characteristics of optical transmission powers.

Figure 44:
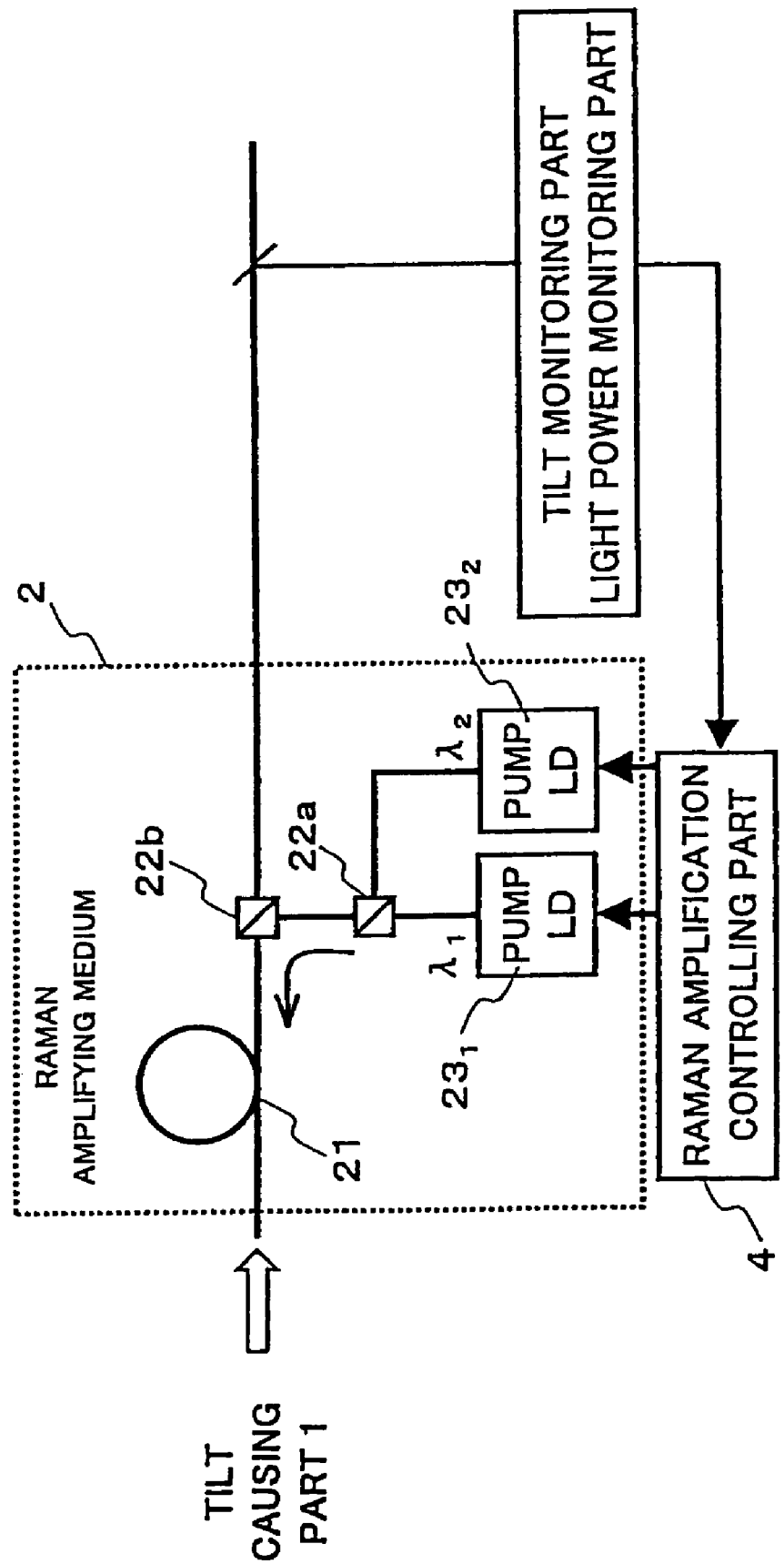
FIG. 44 is a block diagram showing a constitution in which a tilt monitoring part and a light power monitoring part are integrated, for the basic constitution of FIG. 43.

In FIG. 43, there has been shown a situation where the tilt monitoring part 3 and light power monitoring part 201 are provided separately. However, it is possible to provide a constitution integrating a tilt monitoring part and a light power monitoring part such as shown in FIG. 44.

Figure 45:
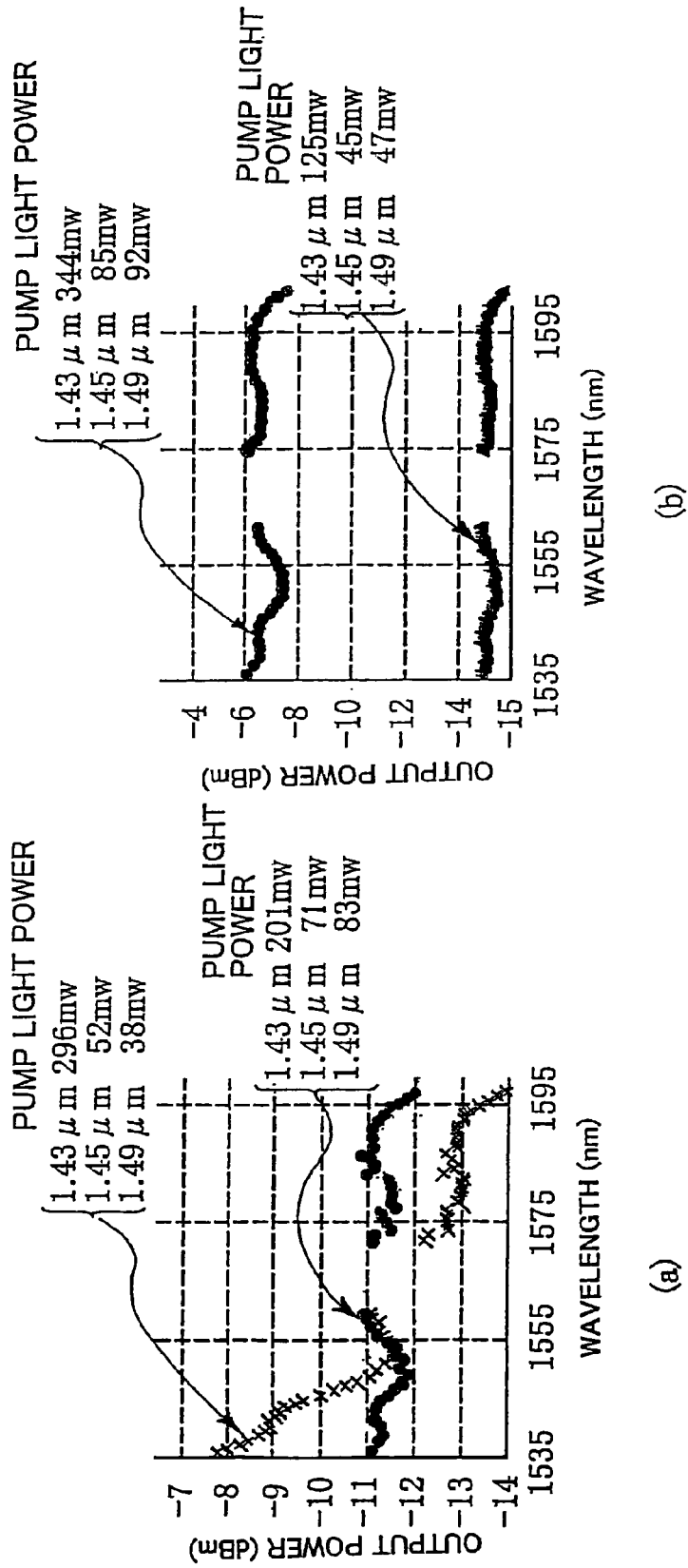
FIG. 45 is a graph showing experimental results in case of conducting a tilt compensation and an output fixing control by Raman amplification, in which (a) shows a situation where an output light power is fixed and (b) shows a situation where a predetermined gain wavelength characteristic is maintained.

FIG. 45 shows experimental results in case that an output light power from a Raman amplifying mediums is controlled to a desired level, simultaneously with tilt compensation by Raman amplification. In these experimentations, transmission path (Raman amplifying medium) of 100 km was pumped from a backward side and then to Raman amplified, and three wavelengths (1.43 μm, 1.45 μm, and 1.49 μm) were adopted as pump lights. Input signal light included 64 waves from 1,535 nm to 1,600 nm, and was input into a transmission path at a fixed light power of 2 dBm/ch. FIG. 45(a) shows a result of an output spectrum of transmission path, where a gain wavelength characteristic is varied by adjusting pump light powers of respective wavelengths while fixing an output power of the transmission path (measured by a light power meter). FIG. 45(b) shows a result, where an output power of transmission path is varied by adjusting pump light powers of respective wavelengths while maintaining a predetermined gain wavelength characteristic.

Meanwhile, it is demanded for an optical amplifier applied to a WDM optical communication system, that a gain wavelength characteristic and an output light level be constant even if an input light level is changed. This demand is required for rendering respective optical amplifiers to compensate fluctuation of input light level into the respective optical amplifiers such as depending on a length of transmission path, to thereby constitute a system by a fewer types of optical amplifiers. In order to satisfy the above demand, it is a useful way to adopt a plurality of optical amplifying parts, to automatically gain control the respective optical amplifying parts, and to apply variable optical attenuators between respective stages to thereby conduct output fixing control, such as disclosed in Japanese Unexamined Patent Publication No. 8-248455 and Japanese Unexamined Patent Publication No. 6-169122. However, this constitution leaves such a problem that: degradation of noise characteristic is caused depending on optical attenuation amounts of variable optical attenuators, and control is complicated.

The controlling method according to the present invention is useful as one way to solve the aforementioned problem of the known optical amplifiers. Namely, by fixingly controlling an input or output of an optical amplifier while conducting tilt compensation by Raman amplification, there is unrequired a variable optical attenuator for an optical amplifier which attenuator has been required up to now for an input dynamic range, to thereby enable realization of improvement of optical SNR of optical communication system, lower cost and simplification of constitution.

Figure 46:
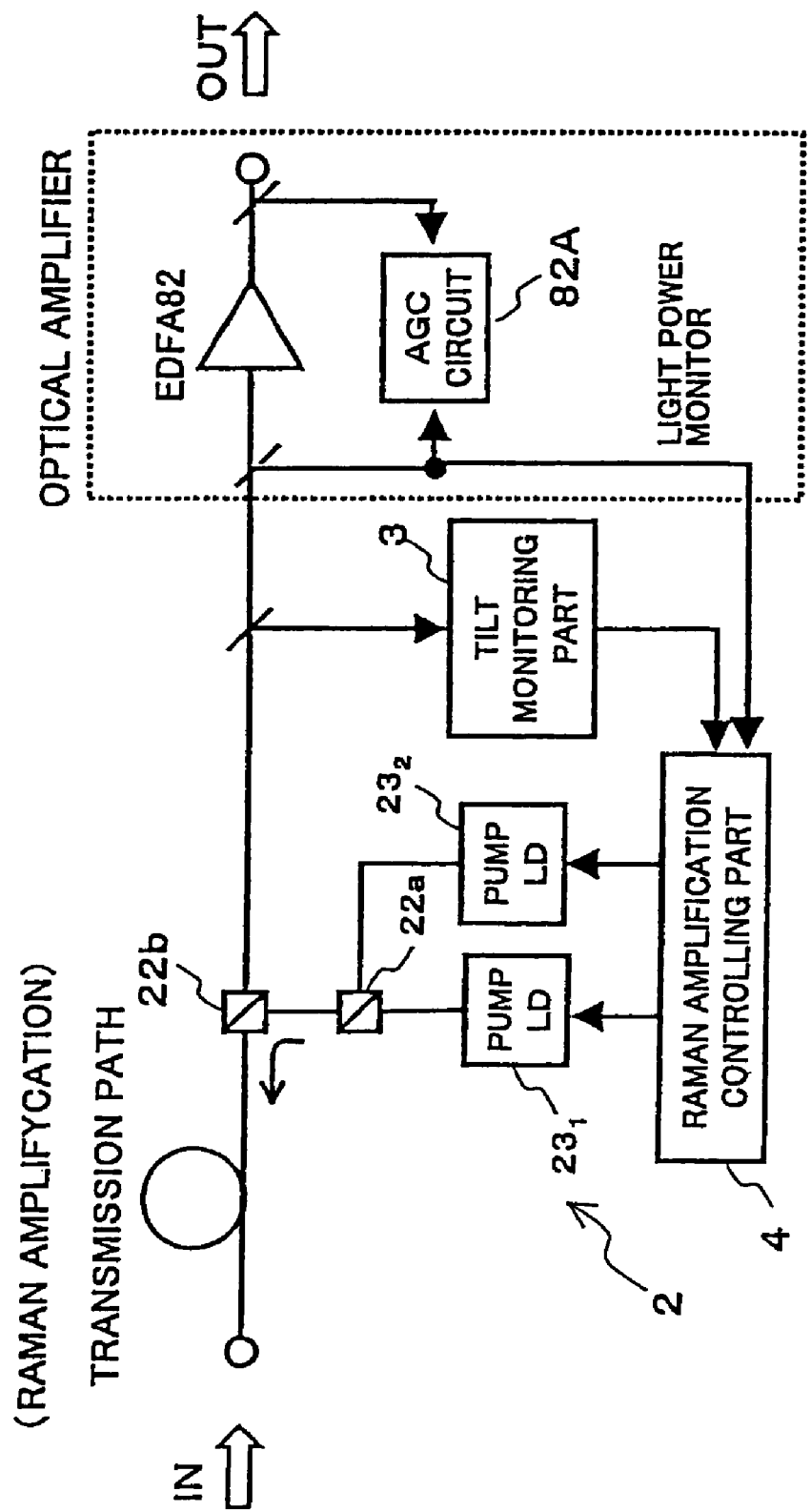
FIG. 46 is a block diagram showing a basic constitution of an optical amplifier, applied with a tilt compensation and an output fixing control by Raman amplification in the present invention.

FIG. 46 is a block diagram showing a basic constitution of an optical amplifier, applied with the aforementioned controlling method according to the present invention.

Figure 47:
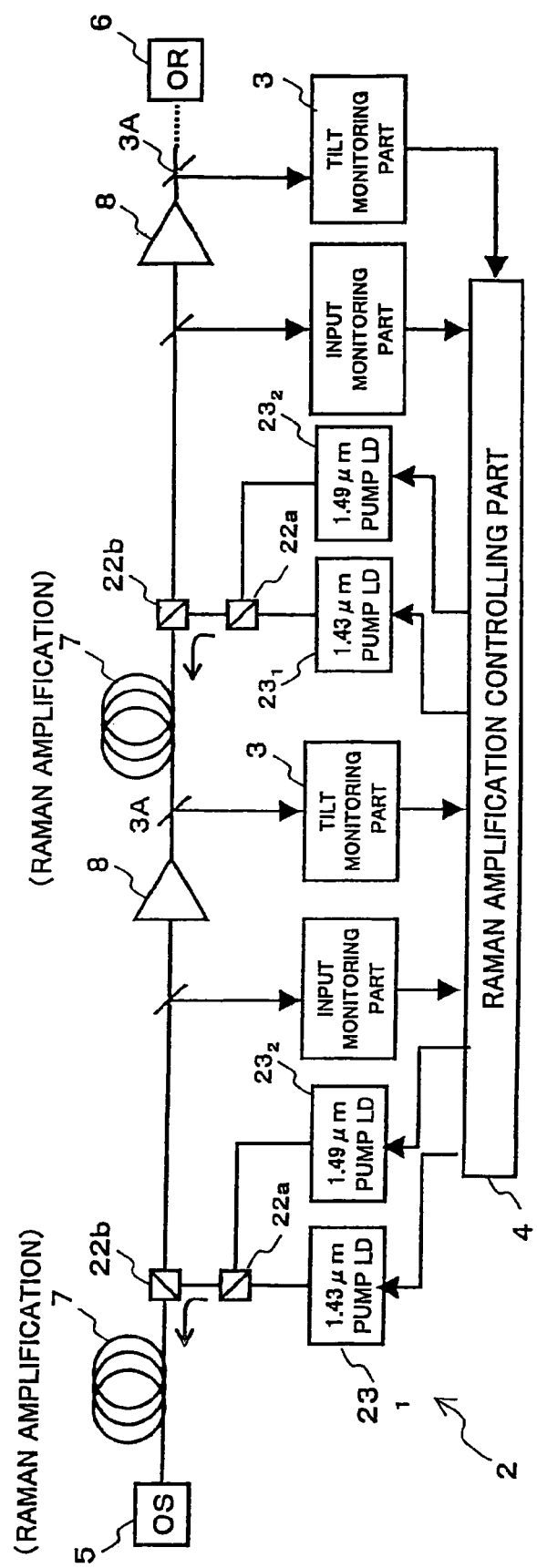
FIG. 47 is a diagram showing an example of entire constitution of an optical communication system applied with the optical amplifier of FIG. 46.

The optical amplifier of FIG. 46 is constituted by utilizing a function for monitoring input light power and output light power, which function is installed in advance in a general optical amplifier. FIG. 46 shows a constitution where a tilt monitoring part and a light power monitor are both applied to an input side of an optical amplifier, as an example. FIG. 47 shows an example of an entire structure of optical communication system applied with such a constitution.

Figure 48:
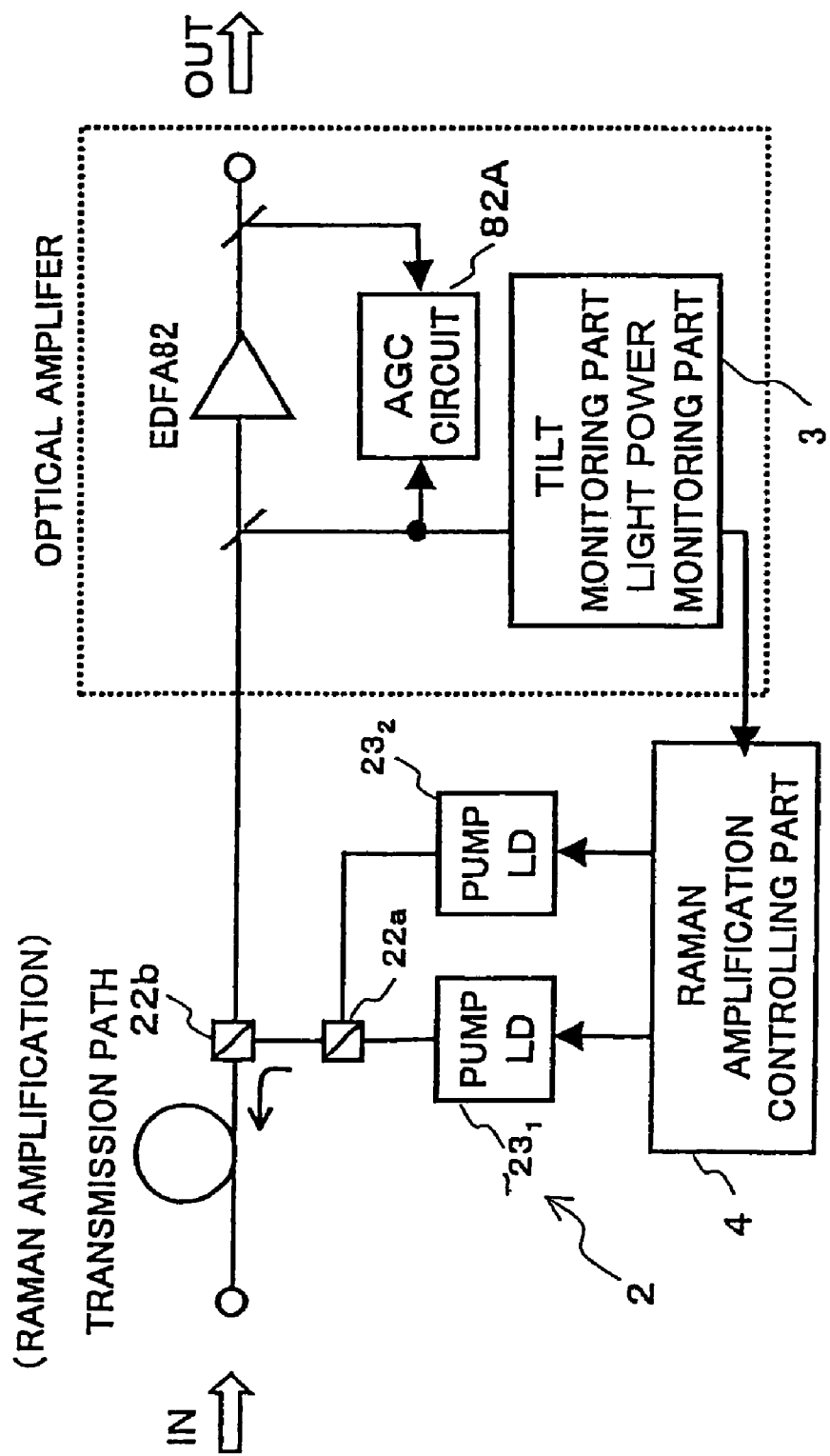
FIG. 48 is a block diagram showing a constitution in which a tilt monitoring part and a light power monitoring part are integrated, for the basic constitution of FIG. 46.
Figure 49:
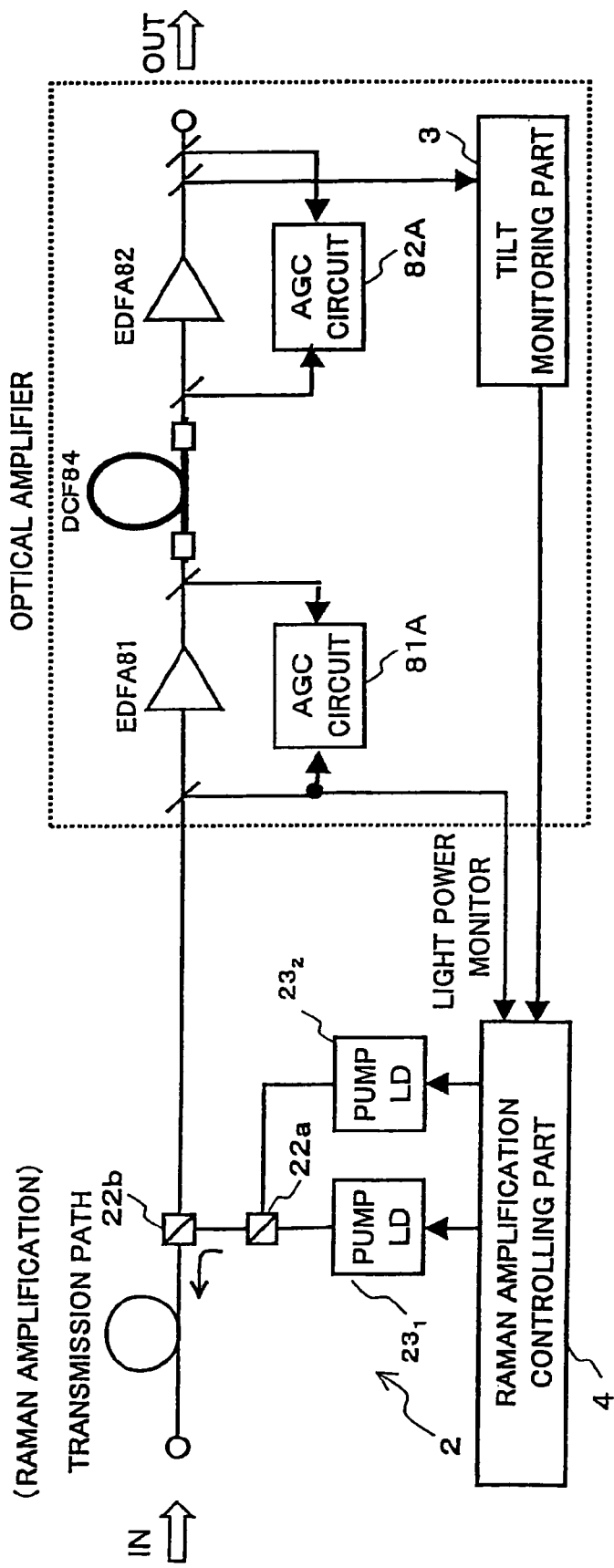
FIG. 49 is a block diagram showing an exemplary constitution where a controlling method according to the present invention is applied to an optical amplifier having a dispersion compensation fiber, in which light power monitoring and tilt monitoring are conducted at input and output sides, respectively.
Figure 50:
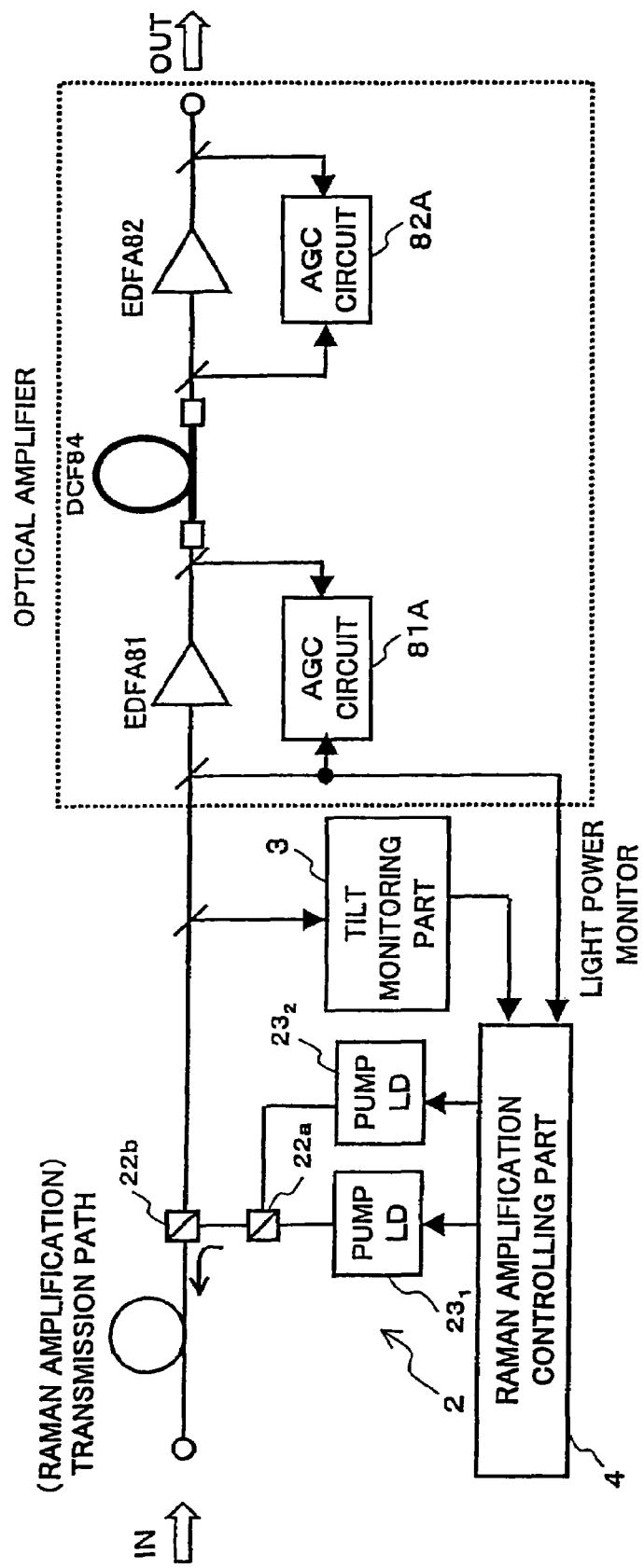
FIG. 50 is a block diagram showing an exemplary constitution where a controlling method according to the present invention is applied to an optical amplifier having a dispersion compensation fiber, in which light power monitoring and tilt monitoring are conducted at an input side.
Figure 51:
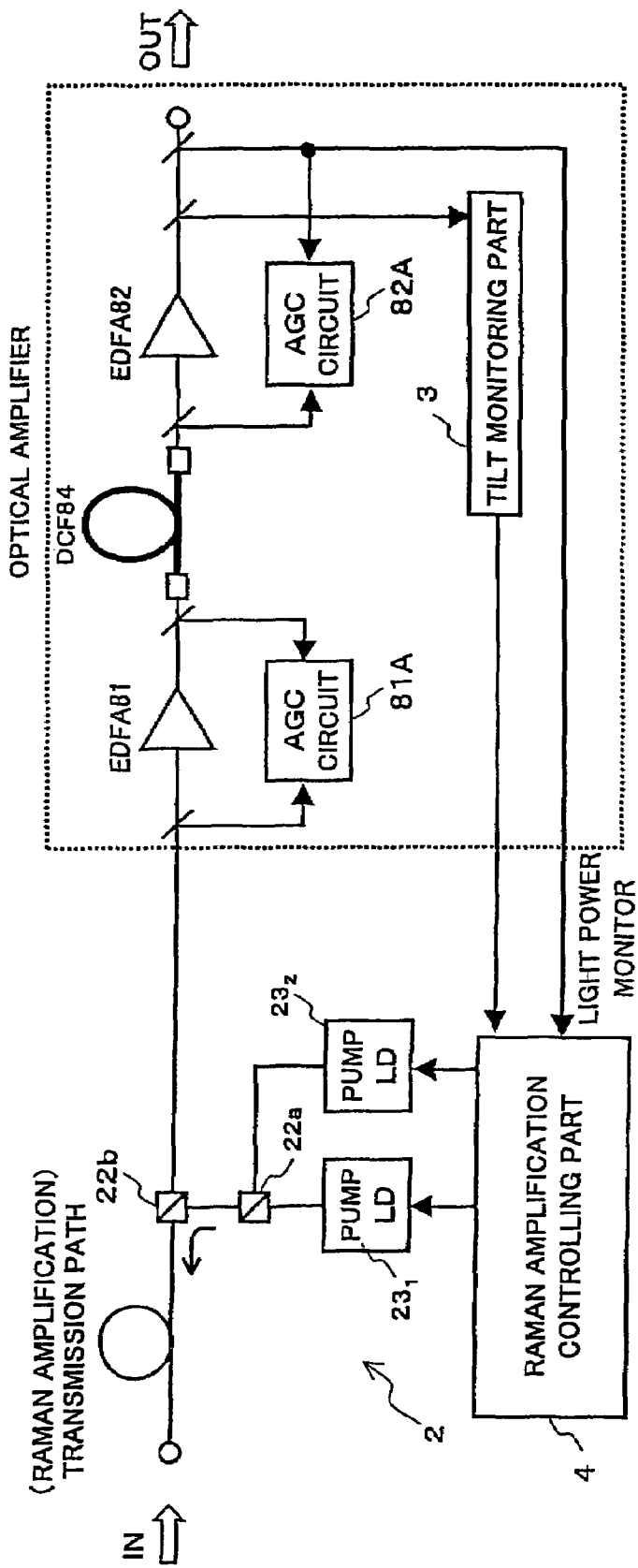
FIG. 51 is a block diagram showing an exemplary constitution where a controlling method according to the present invention is applied to an optical amplifier having two-staged dispersion compensation fibers, in which light power monitoring and tilt monitoring are conducted at an output side.
Figure 52:
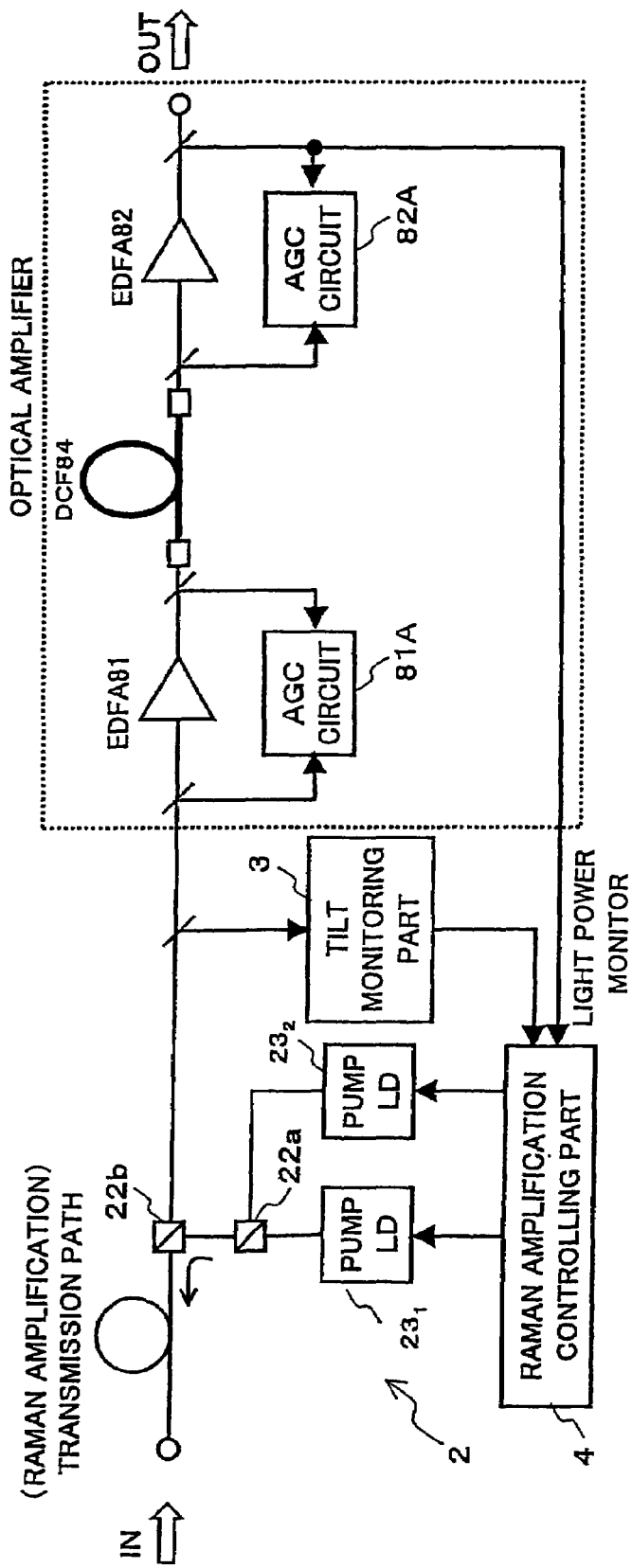
FIG. 52 is a block diagram showing an exemplary constitution where a controlling method according to the present invention is applied to an optical amplifier having two-staged dispersion compensation fibers, in which light power monitoring and tilt monitoring are conducted at output and input sides, respectively.

Note, the tilt monitoring part and light power monitor are not limited to the aforementioned arrangement, and may be arranged together at an output side of optical amplifier, or separately arranged at input and output sides. FIG. 46 shows a constitution for separately arranging the tilt monitoring part and light power monitor. However, both functions can be integrated as shown in FIG. 48.

As a specific constitution, there will be now considered a situation where the controlling method of the present invention is applied to an optical amplifier in which a dispersion compensation fiber is arranged between stages of two-staged optical amplifying part.

FIGS. 49 through 52 are block diagrams illustrating constitutions of the aforementioned optical amplifiers.

Figure 53:
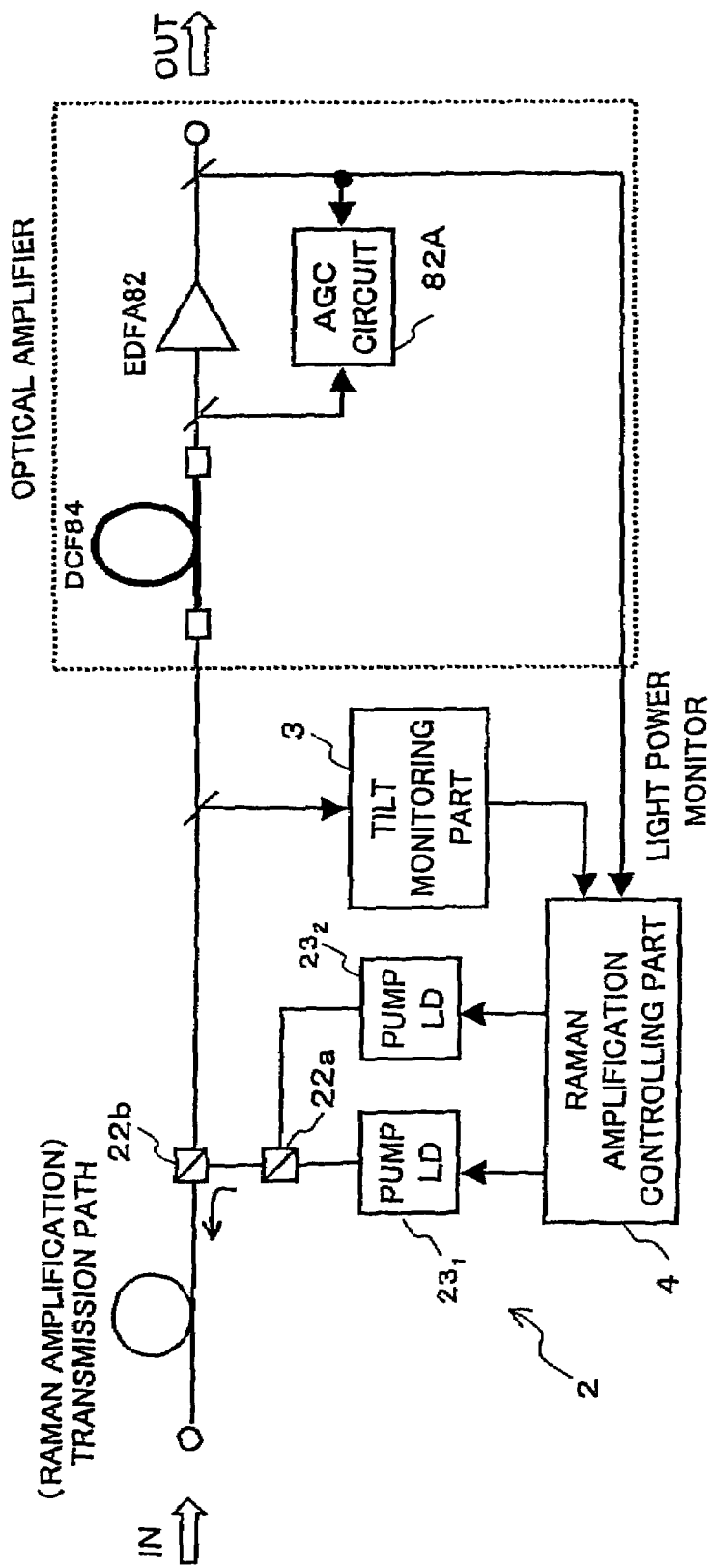
FIG. 53 is a block diagram showing a constitution in case of omitting a former stage optical amplifying part, for the constitutional example of FIG. 52.

By adopting the constitutions as shown in these figures, there is unrequired a variable optical attenuator for an optical amplifier which attenuator has been conventionally required for an input dynamic range, to thereby enable realization of simplification of constitution of optical amplifier and control. Further, if a gain amount having been required at a former stage optical amplifying part can be burdened by Raman amplification, it becomes possible even to omit the former stage optical amplifying part. FIG. 53 shows a constitution in case of omitting a former stage optical amplifying part. In this case, there is required a large pump light power for Raman amplification such that an input level of dispersion compensation fiber satisfies a predetermined value.

Figure 54:
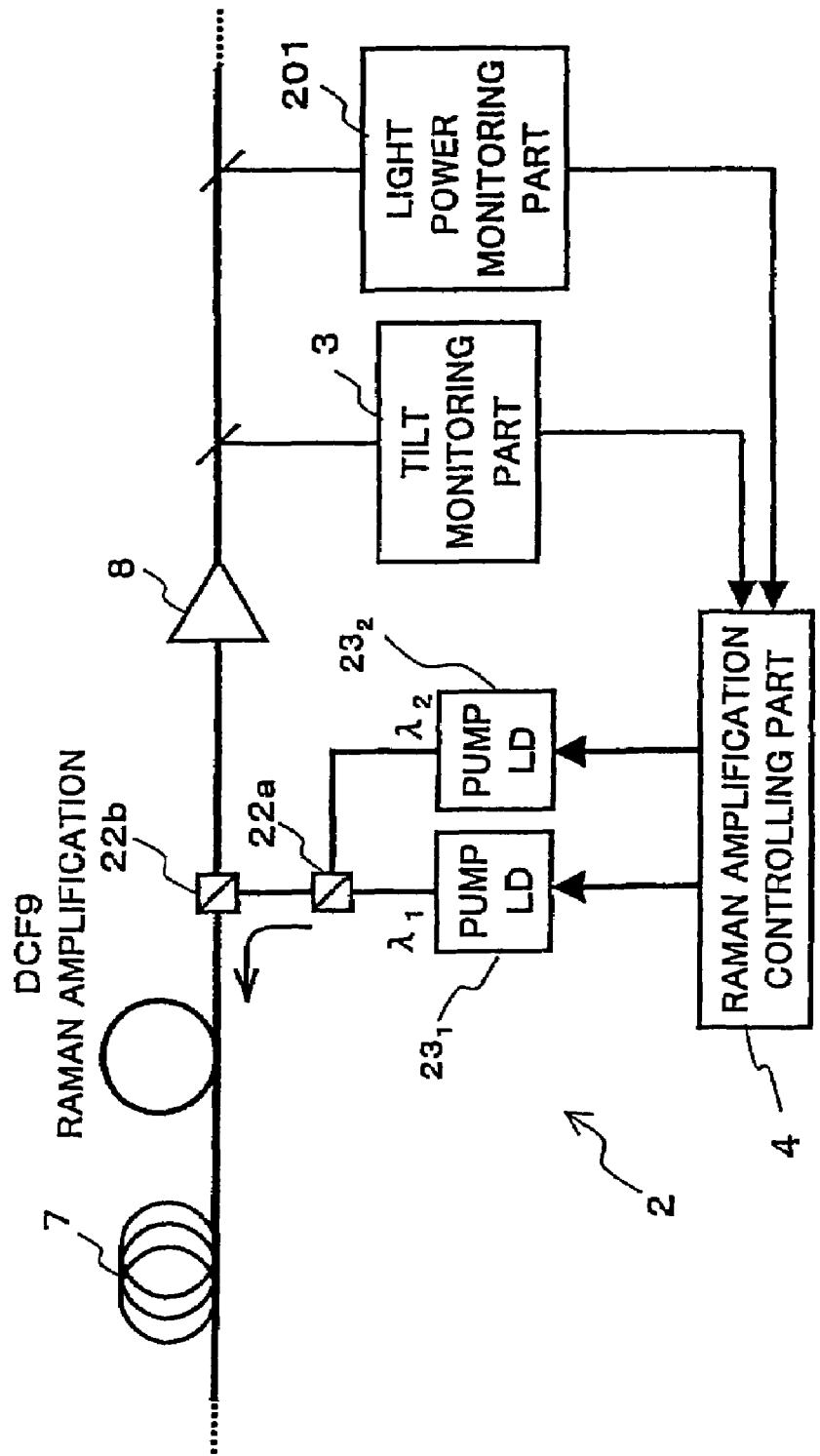
FIG. 54 is a block diagram showing a constitutional example where a dispersion compensation fiber is utilized as a Raman amplifying medium, for FIG. 53.

Further, it is also possible to utilize the dispersion compensation fiber as a Raman amplifying medium. A constitutional example of this case is shown in FIG. 54. Note, the dispersion compensation fiber has a relatively small mode field diameter, and nonlinear effect appears remarkably, so that a desired Raman gain can be obtained even by a small pump light power. However, it is required to design a gain value of Raman amplification, with paying attention to an optical SNR and nonlinear effect of system. Further, in FIG. 54, both of tilt monitoring part 3 and light power monitoring part 101 are arranged at an output side of the optical amplifier 8 as an example. However, they may be both arranged at an input side of the optical amplifier 8, or separately arranged at input side and output side. A constitution integrating the tilt monitoring part 3 and light power monitoring part 201 is also possible.

There will be now briefly explained a controlling method of Raman amplification controlling part, in case that the number of signals (number of wavelengths) of an optical communication system is changed.

Raman amplification has such a feature to have a wide non-saturated range in which identical gains are presented even with change of input power under a condition of fixed pump light power (see FIG. 6). Making use of this characteristic of Raman amplification, there is conducted Raman amplification control in case of change of the number of signals (number of wavelengths) in an optical communication system.

Figure 55:
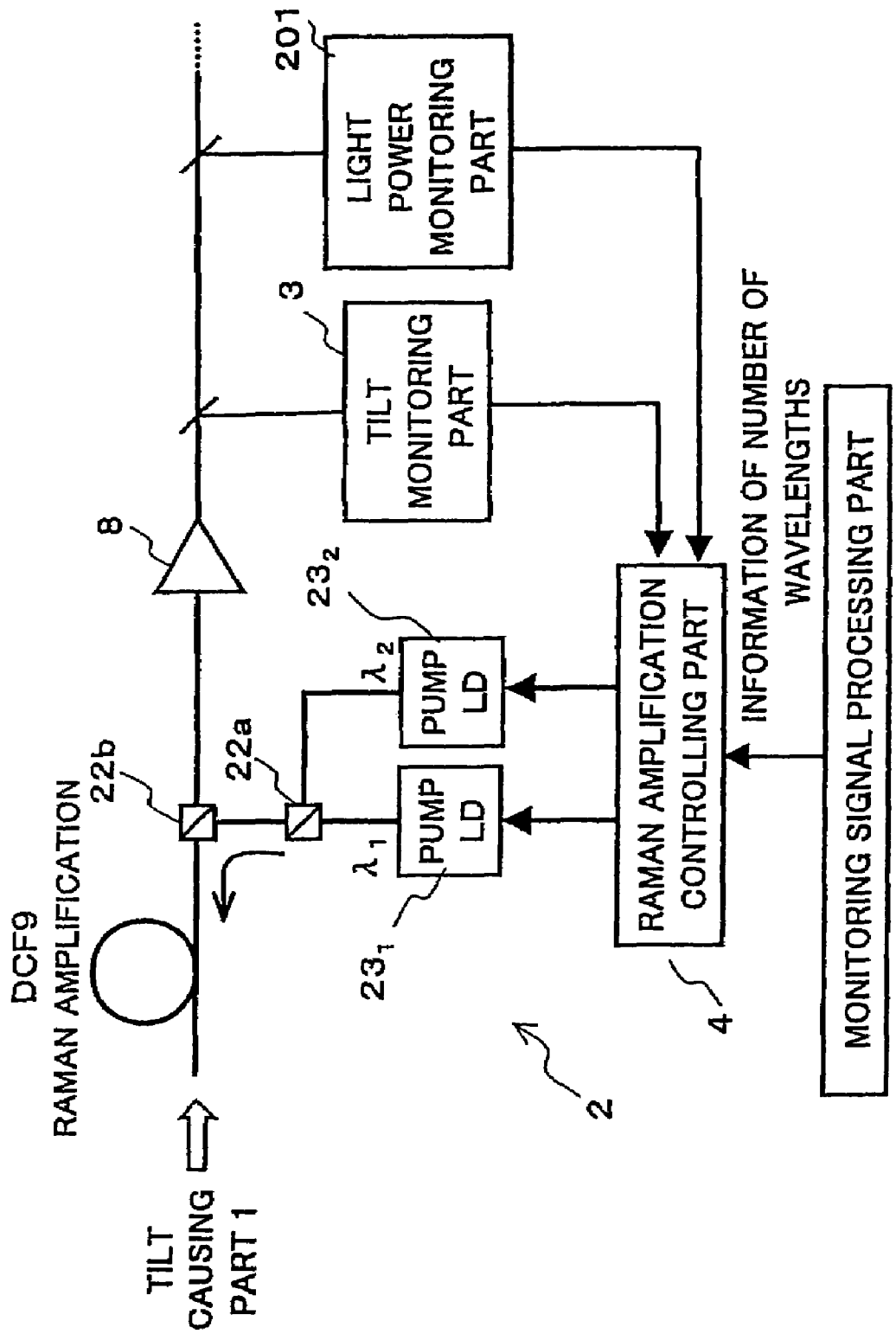
FIG. 55 is a block diagram for explaining a control operation where the number of signals (number of wavelengths) of an optical communication system is changed, in the controlling method according to the present invention.

Concretely, in a constitution such as shown in FIG. 55, upon receiving, from a monitoring signal processing part, such information that the number of wavelengths will be changed, the Raman amplification controlling part 4 firstly switches: from a condition of tilt control and output fixing control; to a condition of pump light power fixing control held at the present value of pump light power. In this way, the gain wavelength characteristic is kept constant even when the number of wavelengths is changed, so that output levels at respective wavelengths are kept constant. Further, after change of number of wavelengths, there are resumed normal tilt control and output fixing control. Note, at this time, there are calculated predetermined output levels based on information on the number of wavelengths, and the result is reflected to output fixing control.

What we claimed are:

1. An optical apparatus connected to an optical transmission path, comprising:
    a plurality of pump light sources with different wavelength, supplying a pump light to the optical transmission path
    an input light monitor unit monitoring an input light from the optical transmission path and outputting an input light monitor signal;
    an optical amplifying unit amplifying the input light and outputting amplified light;
    an output light monitor unit monitoring the amplified light and outputting an amplified light monitor signal; and
    a control unit controlling the plurality of pump light sources based on the input light monitor signal and the amplified light monitor signal.

2. The optical apparatus according to claim 1, wherein the input light monitor unit monitors light power of the input light at a plurality of wavelengths.

3. The optical apparatus according to claim 2, wherein,
    the input light includes a plurality of optical signals with different wavelengths, and
    the input light monitor unit monitors the light power of the plurality of optical signals.

4. The optical apparatus according to claim 2, wherein,
    the input light includes a plurality of optical signals with different wavelengths, and
    the input light monitor unit monitors wavelength characteristics of the input light.

5. The optical apparatus according to claim 1, wherein the amplified light monitor unit monitors light power of the amplified light at a plurality of wavelengths.

6. The optical apparatus according to claim 5, wherein,
    the input light includes a plurality of optical signals with different wavelengths, and
    the amplified light monitor unit monitors the light power of the plurality of optical signals.

7. The optical apparatus according to claim 2, wherein,
    the input light includes a plurality of optical signals with different wavelengths, and
    the amplified light monitor unit monitors wavelength characteristics of the amplified light.

* * * * *